(12) United States Patent
Akhondi et al.

(10) Patent No.: US 12,297,520 B2
(45) Date of Patent: May 13, 2025

(54) PROCESSES AND SYSTEMS FOR PURIFYING AND RECYCLING LITHIUM-ION BATTERY WASTE STREAMS

(71) Applicant: GREEN LI-ION PTE. LTD., Singapore (SG)

(72) Inventors: Ebrahim Akhondi, Singapore (SG); Reza Katal, Singapore (SG)

(73) Assignee: GREEN LI-ION PTE. LTD., Singapore (SG)

( * ) Notice: Subject to any disclaimer, the term of this patent is extended or adjusted under 35 U.S.C. 154(b) by 0 days.

(21) Appl. No.: 18/112,676

(22) Filed: Feb. 22, 2023

(65) Prior Publication Data
US 2023/0304128 A1  Sep. 28, 2023

Related U.S. Application Data

(60) Provisional application No. 63/312,978, filed on Feb. 23, 2022.

(51) Int. Cl.
*C22B 26/12* (2006.01)
*B01D 15/18* (2006.01)
(Continued)

(52) U.S. Cl.
CPC ......... *C22B 26/12* (2013.01); *B01D 15/1864* (2013.01); *B01D 15/203* (2013.01);
(Continued)

(58) Field of Classification Search
CPC .. C22B 3/42; C22B 26/12; C22B 7/02; C22B 7/04; C22B 7/006; C22B 7/007; C22B 7/008; C22B 7/009; H01M 10/54
See application file for complete search history.

(56) References Cited

U.S. PATENT DOCUMENTS 3,690,844 A   9/1972 Flint et al.
3,852,044 A   12/1974 Neitzel et al.
(Continued)

FOREIGN PATENT DOCUMENTS

AU  2018276326 B2  7/2021
CA  3085965-D1   2/2020
(Continued)

OTHER PUBLICATIONS

Sina Shakibania, Alireza Mahmoudi, Mohammad Mokmeli, Fereshteh Rashchi, The effect of the chloride ion on chemical degradation of LIX 984N extractant, 2020, Minerals Engineering (Year: 2020).*
(Continued)

*Primary Examiner* — Keith D. Hendricks
*Assistant Examiner* — Nikolas Takuya Pullen
(74) *Attorney, Agent, or Firm* — Harness, Dickey & Pierce, P.L.C.

(57) ABSTRACT

Processes and systems for recovering metals from a lithium-ion battery waste stream include optionally conducting a leaching process to form a leachate stream, purifying the leachate stream in a first reactor to remove fluorine (F), phosphate (P), and one or more impurity metals selected from the group consisting of: copper (Cu), aluminum (Al), iron (Fe), and titanium (Ti), separating nickel (Ni), manganese (Mn), and cobalt (Co) from the purified filtrate liquid stream by passing the purified filtrate liquid stream into (i) a reactor for conducting a co-precipitation process by increasing pH or (ii) one or more chromatographic columns to generate an intermediate liquid stream comprising lithium (Li) and one or more recovered products comprising one or more of nickel (Ni), manganese (Mn), and cobalt (Co). The intermediate liquid stream can be introduced into a lithium precipitation reactor to precipitate at least one compound comprising lithium (Li).

30 Claims, 15 Drawing Sheets

(51) Int. Cl.
  *B01D 15/20* (2006.01)
  *C22B 3/00* (2006.01)
  *C22B 3/08* (2006.01)
  *C22B 3/22* (2006.01)
  *C22B 3/30* (2006.01)
  *C22B 3/42* (2006.01)
  *C22B 15/00* (2006.01)
  *C22B 23/00* (2006.01)
  *C22B 47/00* (2006.01)
  *H01M 10/54* (2006.01)

(52) U.S. Cl.
  CPC ............ *C22B 3/08* (2013.01); *C22B 3/22* (2013.01); *C22B 3/30* (2021.05); *C22B 3/42* (2013.01); *C22B 15/008* (2013.01); *C22B 23/0461* (2013.01); *C22B 47/00* (2013.01); *H01M 10/54* (2013.01); *Y02P 10/20* (2015.11); *Y02W 30/84* (2015.05)

(56) References Cited

U.S. PATENT DOCUMENTS

| | | | |
|---|---|---|---|
| 4,723,962 | A | 2/1988 | Mehta |
| 5,160,631 | A | 11/1992 | Frost et al. |
| 9,834,827 | B2 | 12/2017 | Wang et al. |
| 10,023,464 | B2 | 7/2018 | Cohen et al. |
| 10,522,884 | B2 | 12/2019 | Wang et al. |
| 10,807,879 | B2 | 6/2020 | Ito et al. |
| 10,741,890 | B2 | 8/2020 | Wang et al. |
| 11,127,992 | B2 | 9/2021 | Wang et al. |
| 11,430,997 | B2 | 8/2022 | Howe |
| 11,502,345 | B2 | 11/2022 | Wang et al. |
| 11,508,999 | B2 | 11/2022 | Morin et al. |
| 11,769,916 | B2 | 9/2023 | Wang et al. |
| 11,827,998 | B2 | 11/2023 | Wang et al. |
| 11,876,196 | B2 | 1/2024 | Katal |
| 2007/0098609 | A1* | 5/2007 | McConnell ............ C01G 3/12 423/101 |
| 2007/0196725 | A1 | 8/2007 | Tedjar et al. |
| 2012/0328494 | A1* | 12/2012 | Dreisinger ............ C22B 11/04 423/94 |
| 2013/0302226 | A1 | 11/2013 | Wang et al. |
| 2013/0312254 | A1 | 11/2013 | Kim et al. |
| 2016/0115563 | A1 | 4/2016 | Kotiranta et al. |
| 2017/0077564 | A1* | 3/2017 | Wang ............ C01G 53/50 |
| 2019/0123402 | A1 | 4/2019 | Wang et al. |
| 2021/0032721 | A1 | 2/2021 | Hanisch et al. |
| 2021/0078013 | A1* | 3/2021 | Kochhar ............ C22B 47/00 |
| 2021/0123119 | A1* | 4/2021 | Oosterhof ............ C22B 26/12 |
| 2021/0324495 | A1* | 10/2021 | Rohde ............ C22B 23/0415 |
| 2021/0344058 | A1 | 11/2021 | Liu et al. |
| 2021/0372001 | A1 | 12/2021 | Wang et al. |
| 2021/0384563 | A1 | 12/2021 | Gratz et al. |
| 2021/0391606 | A1 | 12/2021 | Wang et al. |
| 2022/0017991 | A1 | 1/2022 | Lee et al. |
| 2022/0131204 | A1 | 4/2022 | Wang et al. |
| 2022/0136084 | A1 | 5/2022 | Rohde et al. |
| 2022/0166079 | A1 | 5/2022 | Liu et al. |
| 2022/0205064 | A1 | 6/2022 | Szolga, Jr. et al. |
| 2022/0285750 | A1 | 9/2022 | Li et al. |
| 2022/0311068 | A1 | 9/2022 | Wang et al. |
| 2022/0325378 | A1 | 10/2022 | Wang et al. |
| 2022/0416325 | A1 | 12/2022 | Gratz et al. |
| 2023/0038978 | A1 | 2/2023 | Gratz et al. |
| 2023/0044374 | A1 | 2/2023 | Wang et al. |
| 2023/0059571 | A1 | 2/2023 | Arsenault et al. |
| 2023/0147371 | A1 | 5/2023 | Wang et al. |
| 2023/0198040 | A1 | 6/2023 | Wang et al. |
| 2023/0304128 | A1 | 9/2023 | Akhondi et al. |
| 2023/0332272 | A1 | 10/2023 | Katal et al. |
| 2023/0344030 | A1 | 10/2023 | Sun et al. |
| 2024/0102127 | A1 | 3/2024 | Alemrajabi et al. |
| 2024/0120565 | A1 | 4/2024 | Katal |
| 2024/0347803 | A1 | 10/2024 | Chen et al. |

FOREIGN PATENT DOCUMENTS

| | | | |
|---|---|---|---|
| CA | 3109084 A1 | 2/2020 | |
| CN | 101450815 A | 6/2009 | |
| CN | 101847663 A | 9/2010 | |
| CN | 102157726 A | 8/2011 | |
| CN | 102892708 A | 1/2013 | |
| CN | 104953200 A | 9/2015 | |
| CN | 103280610 B | 11/2015 | |
| CN | 105274332 A | 1/2016 | |
| CN | 106505225 A | 3/2017 | |
| CN | 106505272 A | 3/2017 | |
| CN | 107653378 A | 2/2018 | |
| CN | 107871912 A | 4/2018 | |
| CN | 107946687 A | 4/2018 | |
| CN | 109075407 A | 12/2018 | |
| CN | 109231181 A | 1/2019 | |
| CN | 110527836 A * | 12/2019 | |
| CN | 110563021 A | 12/2019 | |
| CN | 111003736 A | 4/2020 | |
| CN | 109402394 B | 6/2020 | |
| CN | 111304441 A | 6/2020 | |
| CN | 111471864 A | 7/2020 | |
| CN | 111675203 A | 9/2020 | |
| CN | 112126783 A | 12/2020 | |
| CN | 112441572 A | 3/2021 | |
| CN | 112701372 A | 4/2021 | |
| CN | 113073194 A | 7/2021 | |
| CN | 113957252 A | 1/2022 | |
| CN | 115058605 A | 9/2022 | |
| EP | 2532759 A1 * | 12/2012 | ........ C22B 23/0453 |
| EP | 2450991 B1 | 7/2013 | |
| EP | 2480696 B1 | 7/2018 | |
| EP | 3381080 A1 | 10/2018 | |
| GB | 2611158 A | 3/2023 | |
| JP | 2011157604 A | 8/2011 | |
| JP | 2011184764 A | 9/2011 | |
| JP | 5161361 B1 * | 3/2013 | |
| JP | 2014156648 A | 8/2014 | |
| JP | 2014156649 A | 8/2014 | |
| JP | 2016003382 A | 1/2016 | |
| JP | 2016060926 A | 4/2016 | |
| JP | 2020522617 A | 7/2020 | |
| JP | 2021507111 A | 2/2021 | |
| JP | 2021512215 A | 5/2021 | |
| KR | 20110062307 A | 6/2011 | |
| KR | 20190009771 A | 1/2019 | |
| KR | 102202646 B1 | 1/2021 | |
| KR | 20210120669 A | 10/2021 | |
| RU | 2604082 C2 | 12/2016 | |
| TW | 202105823 A | 2/2021 | |
| TW | 202107764 A | 2/2021 | |
| TW | 202111131 A | 3/2021 | |
| WO | WO-2012026061 A1 * | 3/2012 | ............ C22B 26/12 |
| WO | 2013160754 A1 | 10/2013 | |
| WO | 2017091562 A1 | 6/2017 | |
| WO | 2018209164 A1 | 11/2018 | |
| WO | 2018227237 A1 | 12/2018 | |
| WO | WO-2018223193 A1 | 12/2018 | |
| WO | WO-2019149698 A1 | 8/2019 | |
| WO | WO-2019150403 A1 | 8/2019 | |
| WO | 2020109045 A1 | 6/2020 | |
| WO | WO-2020124130 A1 | 6/2020 | |
| WO | WO-2020220559 A1 | 11/2020 | |
| WO | 2021069822 A1 | 4/2021 | |
| WO | WO-2021161316 A1 | 8/2021 | |
| WO | 2021177537 A1 | 9/2021 | |
| WO | 21252433 A1 | 12/2021 | |
| WO | 2021242831 A2 | 12/2021 | |
| WO | 21252433 A9 | 1/2022 | |
| WO | WO-2022045973 A1 | 3/2022 | |
| WO | WO-2022062675 A1 | 3/2022 | |
| WO | WO-2022127117 A1 | 6/2022 | |
| WO | WO-2022167662 A1 | 8/2022 | |
| WO | 2022221285 A1 | 10/2022 | |
| WO | WO-2022219221 A1 | 10/2022 | |
| WO | WO-2022219222 A1 | 10/2022 | |
| WO | WO-2022219223 A1 | 10/2022 | |
| WO | 202272162 A1 | 12/2022 | |

(56) References Cited

FOREIGN PATENT DOCUMENTS

| WO | 2022258939 | A1 | 12/2022 |
|---|---|---|---|
| WO | 2023015171 | A1 | 2/2023 |
| WO | WO-2023010969 | A1 | 2/2023 |
| WO | 2023034556 | A1 | 3/2023 |
| WO | WO-2023024599 | A1 | 3/2023 |
| WO | WO-2023036726 | A1 | 3/2023 |
| WO | 2023136773 | A1 | 7/2023 |
| WO | 2023163658 | A2 | 8/2023 |

OTHER PUBLICATIONS

CN111003736A machine translation, originally document published Apr. 14, 2020, translated Oct. 4, 2023, (Year: 2020).*
Ahwadmin, What is Deionized Water, and What is it Used For?, Oct. 21, 2021, American Home Water & Air (Year: 2021).*
Chao Peng, Fupeng Liu, Zulin Wang, Benjamin P. Wilson, Mari Lundstrom, Selective extraction of lithium (Li) and preparation of battery grade lithium carbonate (Li2CO3) from spent Li-ion batteries in nitrate system, Journal of Power Sources, vol. 415, 2019, pp. 179-188 (Year: 2019).*
Bing Han, Rana Anwar Ul Haq, Marjatta Louhi-Kultanen, Lithium carbonate precipitation by homogeneous and heterogeneous reactive crystallization, 2020, Hydrometallurgy, vol. 195, (Year: 2020).*
O. Sitando, P.L. Crouse, Processing of a Zimbabwean petalite to obtain lithium carbonate, 2012, International Journal of Mineral Processing, vols. 102-103 (Year: 2012).*
Ulusoy Erol HB, Hestekin CN, Hestekin JA. Effects of Resin Chemistries on the Selective Removal of Industrially Relevant Metal Ions Using Wafer-Enhanced Electrodeionization. 2021. Membranes. 11(1):45. https://doi.org/10.3390/membranes11010045 (Year: 2021).*
Gao et al. Lithium Carbonate Recovery from Cathode Scrap of Spent Lithium-Ion Battery A Closed-Loop Process, Jan. 12, 2017, Environmental Science & Technology 51 (3), 1662-1669, (Year: 2017).*
Xu, J., et al., "A review of the processes and technologies for the recycling of lithium-ion secondary batteries," Journal of Power Sources, 177: 512-527 (2008).
Freitas, M.B.J.G. & Garcia, E.M., "Electrochemical recycling of cobalt from cathodes of spent lithium-ion batteries," Journal of Power Sources, 171: 953-959 (2007).
Castillo, S., et al., "Advances in the recovering of spent lithium battery compounds," Journal of Power Sources, 112: 247-254 (2002).
Contestabile, M., et al., "A laboratory-scale lithium battery recycling process," Journal of Power Sources, 83: 75-78 (1999).
Zou, H., et al., "A novel method to recycle mixed cathode materials for lithium ion batteries," Green Chem, 15: 1183-1191 (2013).
Office Action from corresponding US Application No. U.S. Appl. No. 18/112,818 dated Jun. 22, 2023.
Wang, H., et al., "Hydrometallurgical processing of Li-Ion battery scrap from electric vehicles," European Metallurgical Conference, 2011, p. 1-26.
International Search Report from PCT Application No. PCT/SG2021/050496 dated Nov. 10, 2021.
Written Opinion from PCT Application No. PCT/SG2021/050496 dated Nov. 10, 2021.
Gratz, E., et al., "A closed loop process for recycling spent lithium ion batteries," Journal of Power Sources, 262: 255-262 (2014).
Office Action from Chinese Application No. 2021800522141 dated Aug. 28, 2023.
Office Action from Russian Application No. 2023106877 dated Sep. 12, 2023.
Search Report from Russian Application No. 2023106877 dated Sep. 11, 2023.
Search Report and Office Action from Taiwan Application No. 112114238 dated Nov. 8, 2023.
Search Report and Office Action from Taiwan application No. 112106545 dated Oct. 16, 2023.
Office Action from Chinese Application No. 2021800522141 dated Dec. 4, 2023.
Examination Report from Australian Application No. 2021330014 dated Apr. 19, 2023.
Examination Report from Australian Application No. 2021330014 dated Nov. 22, 2023.
International Search Report from PCT Application No. PCT/SG2023/050108 dated Aug. 16, 2023.
Written Opinion from PCT Application No. PCT/SG2023/050108 dated Aug. 16, 2023.
International Search Report from PCT Application No. PCT/SG2023/050257 dated Aug. 2, 2023.
Written Opinion from PCT Application No. PCT/SG2023/050257 dated Aug. 2, 2023.
Ooi et al., (2017), "Recovery of lithium from salt-brine eluates by direct crystallization as lithium sulfate", Hydrometallurgy, 174, 123-130.
Rosales et al., (2014), "Novel process for the extraction of lithium from ?—spodumene by leaching with HF", Hydrometallurgy, 147-148.
Non-Final Office Action issued in U.S. Appl. No. 18/379,807 dated Dec. 5, 2023.
Larouche, F. et al. (2020). Progress and Status of Hydrometallurgical and Direct Recycling of Li-Ion Batteries and Beyond. Materials 13:801.
Forte, F. et al. (2020). Lithium iron phosphate batteries recycling: An assessment of current status. Critical Reviews in Environmental Science and Technology, 1064:3389.
Yan et al. (2020). High-efficiency method for recycling lithium from spent $LiFePO_4$ cathode. Nanotechnology Reviews, 9: 1586-1593.
Tasaki K. et al. (2003). Decomposition of $LiPF_6$ and Stability of $PF_5$ in Li-Ion Battery Electrolytes: Density Functional Theory and Molecular Dynamics Studies. Journal of the Electrochemical Society 150.12, A1628.
Office Action from Korean Application No. KR 10-2023-7010188 dated Jan. 17, 2024.
International Search Report and Written Opinion from PCT Application No. PCT/SG2024/050258 dated Jul. 22, 2024.
Search Report and Written Opinion from Singapore Application No. 11202301039V dated Feb. 26, 2024.
Examination Report from Australian Application No. 2021330014 dated Feb. 23, 2024.
Search Report from European Application No. 22893999.7 dated Mar. 11, 2024.
Examination Report from Australian Application No. 2023223959 dated Mar. 13, 2024.
Press et al. (2020). A Process for Recovering Metals From Recycled Rechargeable Batteries.
Extended European Search Report from European Application No. 21862212.4 dated May 3, 2024.
Examination Report from Canadian Application No. 3188399 dated May 22, 2024.
International Search Report and Written Opinion from PCT Application No. PCT/SG2024/050542 mailed Dec. 20, 2024.
Pavon et al. (2022) Recovery of Al, Co, Cu, Fe, Mn, and Ni from Spent LIBs after Li Selective Separation by COOL-Process—Part 2: Solvent Extraction from Sulphate Leaching Solution, Oct. 1, 2022, Chemie IngenieurTechnik, 93, p. 1842.
Vittore et al. (2019) Edge-Oxidation of Graphites by Hydrogen Peroxide, Langmuir, 35, p. 2244.
Non-Final Office Action from U.S. Appl. No. 18/640,456 dated Jul. 12, 2024.
International Search Report and Written Opinion from PCT Application No. PCT/SG2024/050259 dated Jul. 22, 2024.
Office Action from Japanese Application No. 2024-513842 dated Jan. 7, 2025.
First Office Action for Japanese Patent Application No. 2024513841 issued Mar. 18, 2025.
First Office Action for Taiwan Patent Application No. 113119542 issued Feb. 10, 2025.

(56) References Cited

OTHER PUBLICATIONS

Second Examination Report for Canadian Patent Application No. 3,224,303 issued Feb. 25, 2025.

* cited by examiner

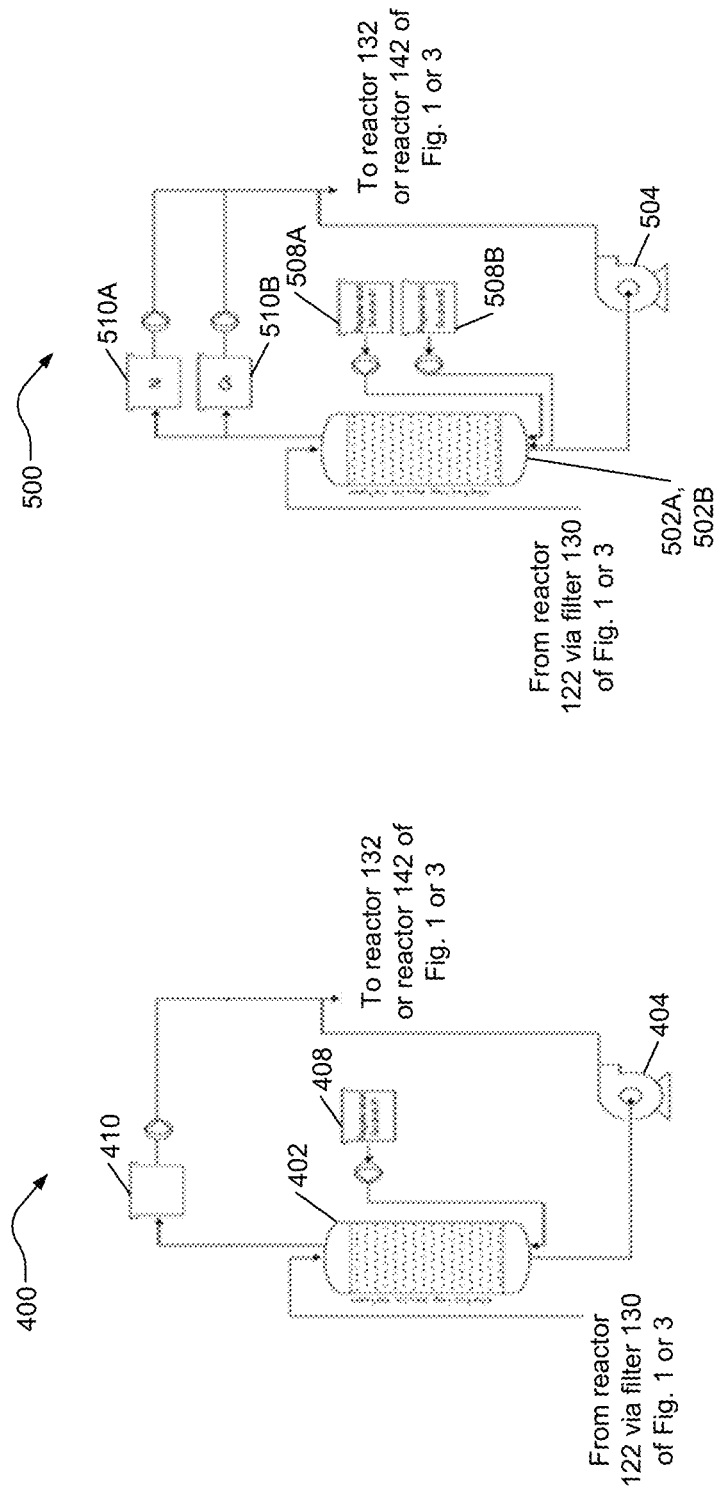

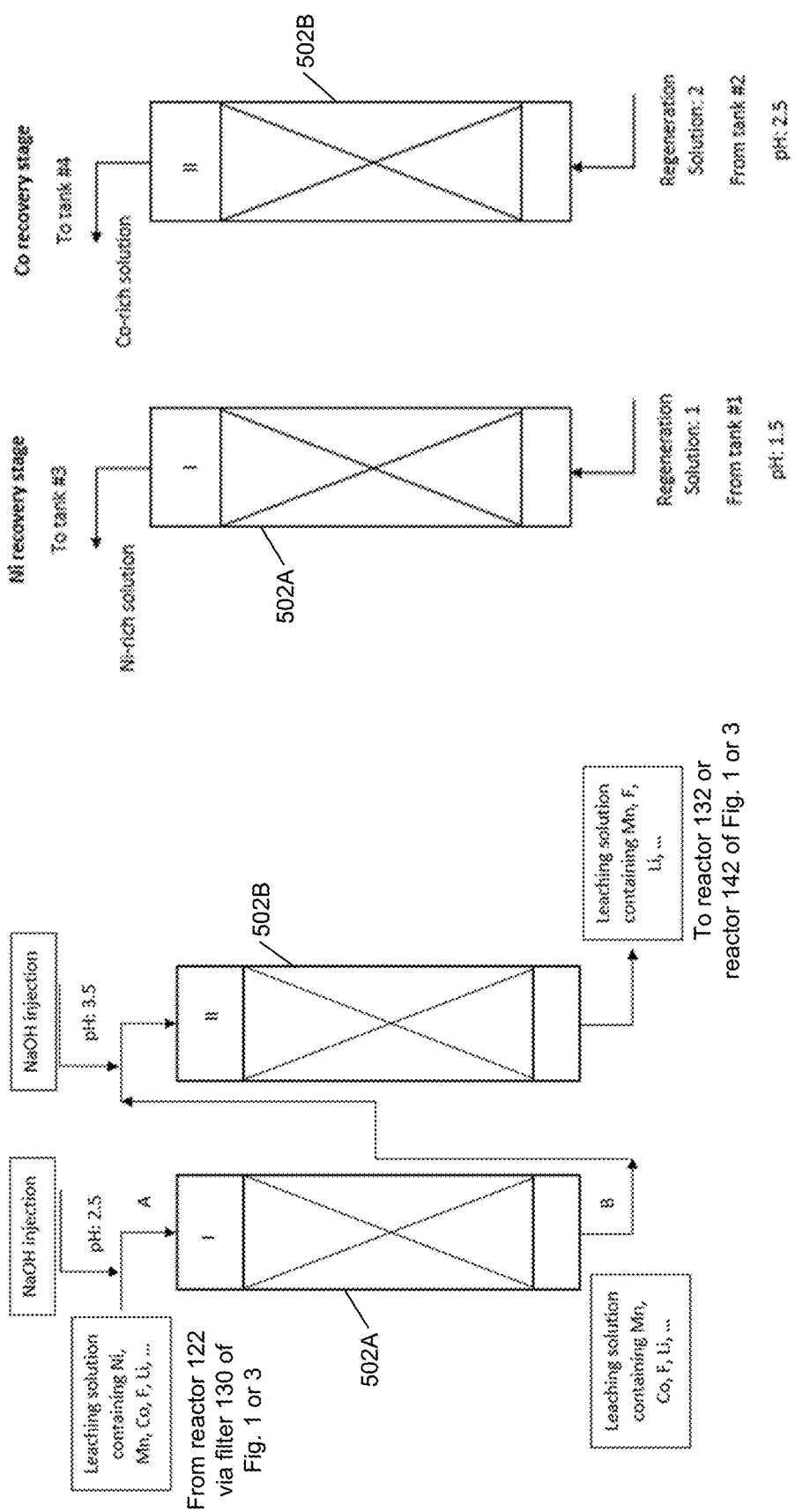

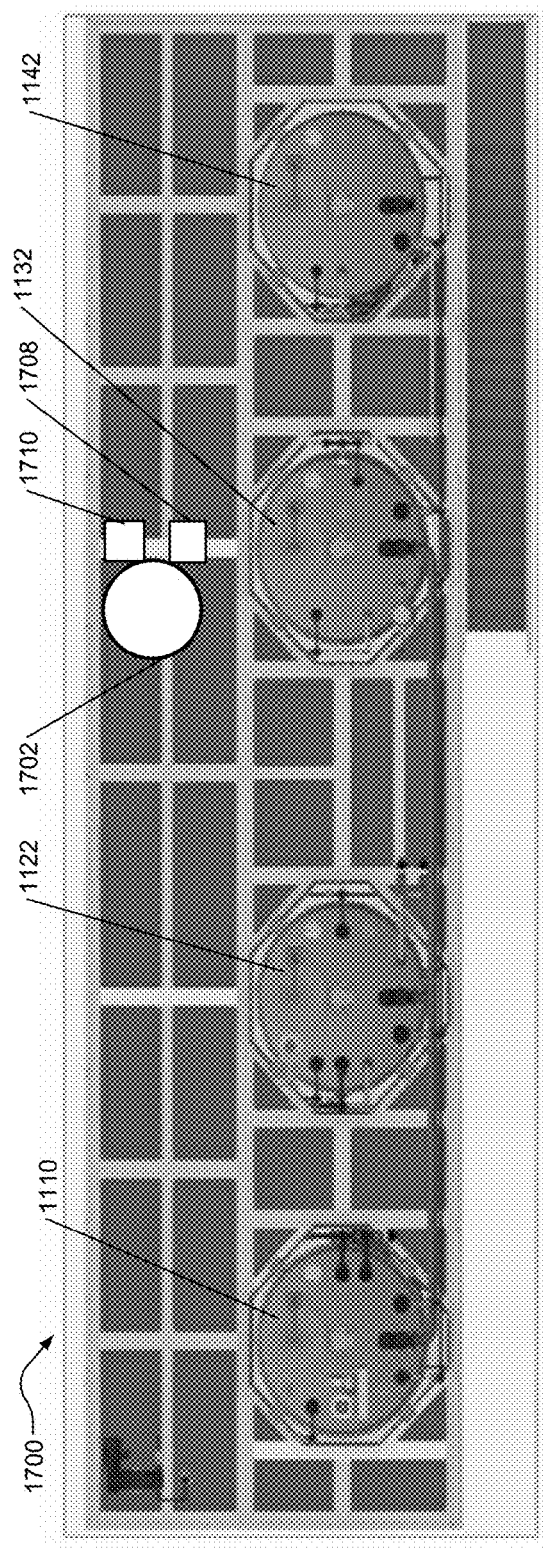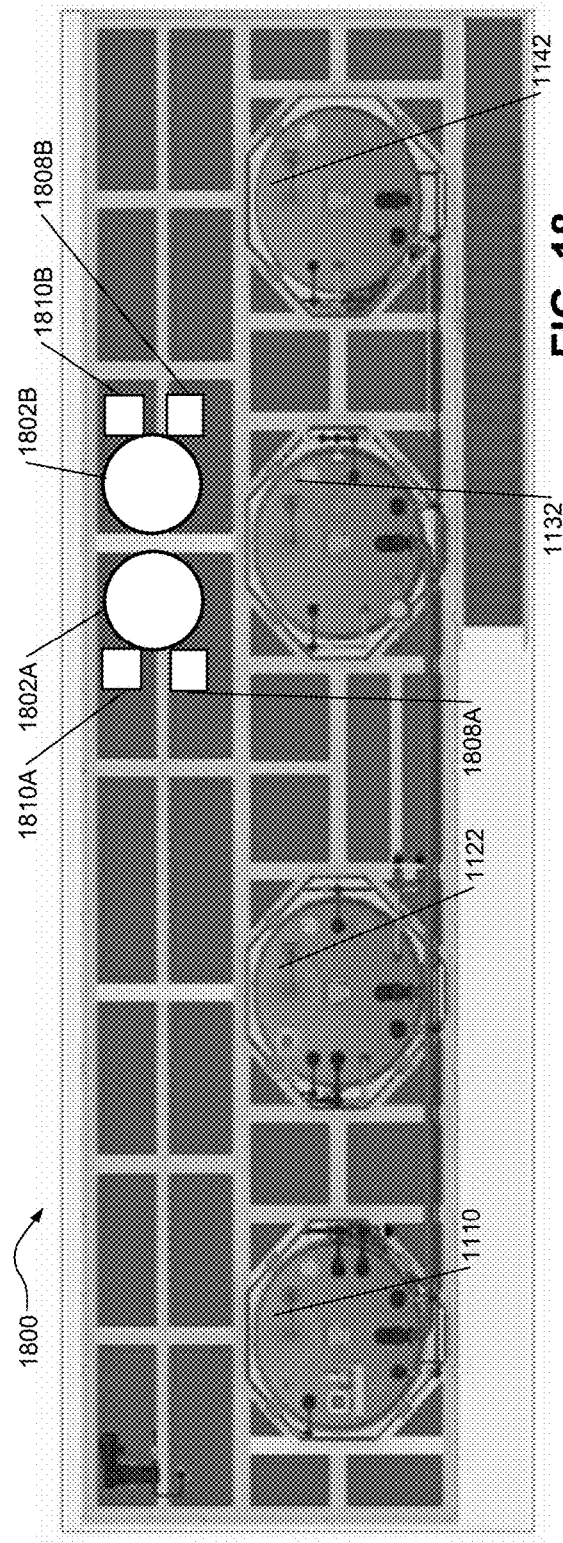

US 12,297,520 B2

PROCESSES AND SYSTEMS FOR PURIFYING AND RECYCLING LITHIUM-ION BATTERY WASTE STREAMS

CROSS-REFERENCE TO RELATED APPLICATIONS

This application claims the benefit of U.S. Provisional Application No. 63/312,978, filed on Feb. 23, 2022. The entire disclosure of the above application is incorporated herein by reference.

FIELD

The present disclosure relates to processes and systems for purifying and recycling lithium-ion battery waste streams.

BACKGROUND

This section provides background information related to the present disclosure which is not necessarily prior art.

Electrochemical cells, such as rechargeable secondary lithium-ion batteries, are widely used in a variety of applications including consumer products and vehicles. However, at the end of a battery's life, spent batteries may be discarded. Thus, lithium-ion batteries often contain valuable metals that go to waste. Efforts are ongoing to recycle materials from spent lithium-ion batteries. In some instances, for recycling purposes spent lithium-ion batteries are dismantled, crushed, and/or shredded to form a lithium-ion battery waste stream known as black mass. The black mass typically includes all battery active materials, so may contain negative electrode/anodic active materials mixed with positive electrode/cathodic active materials, as well as electrolytic constituents. As such, the presence of multiple complex compounds in the black mass make recycling and recovery of the metals of greatest interest challenging.

Conventional recycling efforts of such spent lithium-ion batteries focus on the recovery of cobalt and lithium from lithium cobalt oxide ($LiCoO_2$) cathode material in the black mass due to their high value, as well as their existence as the predominant material in the waste streams. However, as lithium-ion batteries evolve into newer generations, new cathode active materials may contain less cobalt and nickel, while including additional elements/metals. In some examples, $LiCoO_2$ cathode electroactive material is estimated to account for only about 37% of a total lithium-ion batteries market. Other prevalent cathode materials may now include, for example, lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$, abbreviated NMC, for example, $LiMn_{0.33}Ni_{0.33}Co_{0.33}O_2$) that makes up about 29% of the current market, lithium manganese oxide (LMO—$LiMn_2O_4$—about 21%), lithium nickel oxide (LNO—$LiNiO_2$—about 7%), and lithium iron phosphate (LFP—$LiFePO_4$—about 5%). As such, black mass waste streams have increasingly complex metal mixtures that make recycling more challenging.

Additionally, the black mass may include impurities from spent battery anodes and/or cathode, which may further complicate conventional recycling efforts. For example, such impurities may include carbon (e.g., graphite), iron, copper, fluorine, phosphorous, titanium, aluminum, and the like depending on the particular types of lithium-ion batteries. It would be desirable to develop methods and systems that can purify waste streams from lithium-ion batteries, like black mass, by optimizing recovery of additional metals beyond solely nickel and cobalt, while efficiently separating out various impurities.

SUMMARY

This section provides a general summary of the disclosure and is not a comprehensive disclosure of its full scope or all of its features.

According to one aspect of the present disclosure, a process for recovering metals from a lithium-ion battery waste stream is provided. The process may comprise purifying a lithium-ion battery waste liquid stream comprising sulfuric acid ($H_2SO_2$) in a first reactor to remove fluorine (F), phosphate (P), and one or more impurity metals selected from the group consisting of: copper (Cu), aluminum (Al), iron (Fe), and titanium (Ti). The purifying may include removing copper (Cu) from the waste liquid stream, and removing fluorine (F), which may involve adding a source of calcium oxide and an oxidant to generate calcium fluoride ($CaF_2$) that precipitates out of the waste liquid stream. The purifying may also include adding a first inorganic base to increase pH of the waste liquid stream to generate one or more metal precipitate compounds selected from the group consisting of: aluminum hydroxide ($Al(OH)_3$), titanium hydroxide ($Ti(OH)_4$), iron phosphate ($FePO_4$), and one or more iron hydroxides ($Fe(OH)_3$ and $Fe(OH)_2$). The process also comprises passing the waste liquid stream exiting the first reactor through a filter to generate a purified filtrate liquid stream and a second retentate comprising the one or more metal precipitate compounds, copper (Cu), and calcium fluoride ($CaF_2$). Next, the process includes separating nickel (Ni), manganese (Mn), and cobalt (Co) from the purified filtrate liquid stream by passing the purified filtrate liquid stream into one or more of: a second reactor for conducting a co-precipitation process by increasing pH and/or into one or more chromatographic columns or packed-bed columns/reactors. In this manner, an intermediate liquid stream comprising lithium (Li) and one or more recovered products comprising one or more of nickel (Ni), manganese (Mn), and cobalt (Co) is generated. The one or more recovered products are removed from the intermediate liquid stream. The process also comprises introducing the intermediate liquid stream into a lithium precipitation reactor to precipitate at least one compound comprising lithium (Li).

In one aspect, the purifying may include precipitating copper (Cu) via a cementation reaction or a sulfidation reaction.

In one aspect, the removing copper (Cu) from the waste liquid stream comprises precipitating copper (Cu) by adding a source of iron (Fe) and a second inorganic base to the waste liquid stream to precipitate copper (Cu) via a cementation reaction.

In one further aspect, the source of iron (Fe) comprises iron powder, the first inorganic base and the second inorganic base each comprise sodium hydroxide (NaOH), the source of calcium oxide is selected from the group consisting of: lime (CaO), calcium hydroxide ($Ca(OH)_2$), and combinations thereof, and the oxidant is selected from the group consisting of: hydrogen peroxide ($H_2O_2$), ozone ($O_3$), sodium hypochlorite (NaClO), and combinations thereof.

In one further aspect, the second inorganic base is added until pH is about 5, the first organic base is added until pH is about 10.5, and the oxidant comprises hydrogen peroxide ($H_2O_2$) which is added at a concentration of greater than or equal to about 4% by volume to less than or equal to about 6% by volume of total liquid contents (waste liquid stream).

In one further aspect, the adding the source of iron (Fe) and the second inorganic base to the waste liquid stream is conducted at a pH of greater than or equal to about 1 to less than or equal to about 2 while mixing for a duration of greater than or equal to about 15 minutes at a temperature of greater than or equal to about 55° C. to less than or equal to about 65° C.

In one further aspect, about 2.5 g of iron powder is added for each liter (L) of the waste liquid stream.

In one aspect, the removing copper (Cu) from the waste liquid stream comprises precipitating copper (Cu) by adding a source of sodium sulfide ($Na_2S$) to the waste liquid stream to precipitate copper (Cu) via a sulfidation reaction.

In one aspect, the removing copper (Cu) from the waste liquid stream comprises subjecting the waste liquid stream to a solvent-extraction process by mixing the waste liquid stream with an extractant and an organic phase to remove copper (Cu).

In one further aspect, the extractant comprises 2-hydroxy-5-nonylbenzaldehyde oxime and the organic phase comprises kerosene.

In one further aspect, the solvent-extraction process further removes iron (Fe) from the waste liquid stream.

In one aspect, the purifying further includes introducing a source of phosphate to the waste liquid stream prior to the (iii) adding the first inorganic base to increase pH of the waste liquid stream so as to generate aluminum phosphate ($AlPO_4$) precipitate.

In one further aspect, the source of phosphate comprises sodium phosphate ($Na_3PO_4$).

In one aspect, the adding the source of calcium oxide and the oxidant to generate calcium fluoride ($CaF_2$) is conducted at a pH of greater than or equal to about 1 to less than or equal to about 2 while mixing for a duration of greater than or equal to about 30 minutes at a temperature of greater than or equal to about 55° C. to less than or equal to about 65° C.

In one aspect, the adding of the first inorganic base increases the pH of the waste liquid stream to greater than or equal to about 4 to less than or equal to about 5.

In one aspect, the adding of the first inorganic base to increase pH is conducted while mixing for a duration of greater than or equal to about 60 minutes at a temperature of greater than or equal to about 55° C. to less than or equal to about 65° C.

In one aspect, the purified filtrate liquid stream comprises nickel sulfate ($NiSO_4$), manganese sulfate ($MnSO_4$), and cobalt sulfate ($CoSO_4$) and the separating nickel (Ni), manganese (Mn), and cobalt (Co) from the purified filtrate liquid stream occurs by passing the purified filtrate liquid stream into the second reactor. In the second reactor, the co-precipitation process is conducted that comprises increasing the pH of the purified filtrate liquid stream to greater than or equal to about 11 in an inert environment to form nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$) that concurrently precipitate from the purified filtrate liquid stream to generate the one or more recovered products.

In one further aspect, the increasing the pH of the purified filtrate liquid stream further comprises first adding ammonia to the purified liquid stream that comprises nickel sulfate ($NiSO_4$), manganese sulfate ($MnSO_4$), and cobalt sulfate ($CoSO_4$).

In one aspect, the one or more recovered products is an electroactive material precursor having a stoichiometry of $Ni_xMn_yCo_{1-x-y}(OH)_2$, where x is <1 and y is <1.

In one aspect, the one or more recovered products has a stoichiometry of about

$$\tfrac{1}{3}Ni(OH)_2 + \tfrac{1}{3}Mn(OH)_2 + \tfrac{1}{3}Co(OH)_2 \rightarrow Ni_{0.33}Mn_{0.33}Co_{0.33}(OH)_2.$$

In one aspect, the process further comprises determining a first ratio of Ni:Mn:Co in the purified filtrate liquid stream prior to the co-precipitation process. The first ratio is then compared to a target stoichiometric ratio of Ni:Mn:Co for the one or more recovered products. Thus, the process may include adding one or more of nickel sulfate ($NiSO_4$), manganese sulfate ($MnSO_4$), and cobalt sulfate ($CoSO_4$) to the purified filtrate liquid stream to adjust an amount of nickel sulfate ($NiSO_4$), manganese sulfate ($MnSO_4$), and cobalt sulfate ($CoSO_4$) prior to adjusting the pH. In this manner, the one or more recovered products has a second ratio corresponding to the target stoichiometric ratio.

In one aspect, the separating occurs by passing the purified filtrate liquid stream in a first direction in a chromatographic column or packed-bed column/reactor comprising a chelating resin to conduct a chromatographic separation process at a pH of less than or equal to about 4.5 that generates a raffinate stream comprising at least one manganese (Mn)-containing species and at least one lithium (Li)-containing species that exits the packed-bed column/reactor, while nickel (Ni) ions and cobalt (Co) ions are retained on the chelating resin in the packed-bed column/reactor. The process further includes regenerating the packed-bed column/reactor by passing a regeneration liquid having a pH of less than or equal to about 1.5 in the packed-bed column/reactor to form an extract stream comprising the nickel (Ni) ions and cobalt (Co) ions. The process also includes precipitating nickel hydroxide ($Ni(OH)_2$) and cobalt hydroxide ($Co(OH)_2$) from the extract.

In one aspect, the method further comprises forming a precursor of $LiNiCoAlO_2$ electroactive material by combining the nickel hydroxide ($Ni(OH)_2$) and cobalt hydroxide ($Co(OH)_2$) with the aluminum hydroxide ($Al(OH)_3$) and at least one compound comprising lithium (Li).

In certain aspects, manganese in the raffinate stream/purified filtrate liquid stream may be precipitated, for example, as a manganese oxide (e.g., manganese dioxide $MnO_2$) or manganese hydroxide ($Mn(OH)_2$). In one variation, the manganese removal via precipitation to form manganese oxide (e.g., manganese dioxide ($MnO_2$)) may be achieved by conducting one or more of the following processes: by adding sodium permanganate, potassium permanganate, or by subjecting the raffinate to an ozonation process. In certain aspects, a combination of these manganese removal processes provides maximum manganese precipitation levels.

In another variation, the process may further comprise adjusting the pH of the purified filtrate liquid stream to be greater than or equal to about 4 to less than or equal to about 5 as it enters the packed-bed column/reactor. The process further comprises precipitating manganese hydroxide ($Mn(OH)_2$) by adjusting pH to be greater than or equal to about 8 to less than or equal to about 10 and separating the manganese hydroxide ($Mn(OH)_2$).

In one aspect, the at least one compound comprising lithium (Li) comprises lithium carbonate ($Li_2CO_3$) that is combined with manganese hydroxide ($Mn(OH)_2$) to form $LiMnO_4$ electroactive material.

In one aspect, the adjusting the pH comprises adding sodium hydroxide (NaOH) to the purified filtrate liquid stream.

In one aspect, a stationary phase in the packed-bed column/reactor comprises a macroporous styrene divinylbenzene having functional groups comprising iminodiacetic acid.

In one aspect, the separating occurs by passing the purified filtrate liquid stream in a first direction in a first packed-bed column/reactor comprising a first chelating resin to conduct a chromatographic separation process at a pH of less than or equal to about 1.5. This generates a first raffinate stream comprising at least one manganese (Mn)-containing species, at least one cobalt (Co)-containing species, and at least one lithium (Li)-containing species that exits the first packed-bed column/reactor, while nickel (Ni) ions are retained on the first chelating resin in the first packed-bed column/reactor. The process also comprises passing the first raffinate stream in a first direction in a second packed-bed column/reactor comprising a second chelating resin to conduct a chromatographic separation process at a pH of less than or equal to about 2.5 that generates a second raffinate stream comprising at least one manganese (Mn)-containing species and at least one lithium (Li)-containing species that exits the second packed-bed column/reactor, while cobalt (Co) ions are retained on the second chelating resin in the second packed-bed column/reactor. The process further comprises regenerating the first packed-bed column/reactor by passing a first regeneration liquid having a pH of less than or equal to about 1.5 in the first packed-bed column/reactor to form a first extract stream comprising the nickel (Ni) ions. Next, nickel hydroxide ($Ni(OH)_2$) may be precipitated from the first extract stream. The process also includes regenerating the second packed-bed column/reactor by passing a second regeneration liquid having a pH of less than or equal to about 2.5 in the second packed-bed column/reactor to form a second extract stream comprising the cobalt (Co) ions. This is followed by precipitating cobalt hydroxide ($Co(OH)_2$) from the second extract stream.

In one aspect, the process further comprises forming a precursor of $LiNiCoAlO_2$ electroactive material by combining the nickel hydroxide ($Ni(OH)_2$) and cobalt hydroxide ($Co(OH)_2$) with the aluminum hydroxide ($Al(OH)_3$) and the at least one compound comprising lithium (Li).

In one aspect, the process further comprises precipitating manganese hydroxide ($Mn(OH)_2$) from the second raffinate stream by adjusting pH to be greater than or equal to about 8 to less than or equal to about 10 thus forming the intermediate liquid stream. The manganese hydroxide ($Mn(OH)_2$) is then separated from the intermediate liquid stream.

In one aspect, the at least one compound comprising lithium (Li) comprises lithium carbonate ($Li_2CO_3$) that is combined with manganese hydroxide ($Mn(OH)_2$) to form $LiMnO_4$ electroactive material.

In one aspect, the process further comprises adjusting the pH of the purified filtrate liquid stream by adding sodium hydroxide (NaOH) to the purified filtrate liquid stream to have a pH of about 2.5 and adjusting the pH of the first raffinate stream by adding sodium hydroxide (NaOH) to the first raffinate stream to have a pH of about 3.5.

In one aspect, a stationary phase in the first packed-bed column/reactor comprises macroporous styrene divinylbenzene having functional groups comprising iminodiacetic acid and a stationary phase in the second packed-bed column/reactor comprises macroporous styrene divinylbenzene having functional groups comprising iminodiacetic acid.

In one aspect, the lithium-ion battery waste stream is black mass. Prior to the purifying, the method further comprises generating the lithium-ion battery waste liquid stream by subjecting the black mass to a leaching process that comprises mixing an inorganic acid with the black mass to form an acidic admixture. An oxidant may be mixed with the acidic admixture. The process may further include adding deionized water to the acidic admixture. Then, a leachate stream is passed through a second filter to generate a filtrate liquid stream comprising one or more metal sulfates and a first retentate comprising graphite.

In one further aspect, both the mixing of the inorganic acid and the mixing of the oxidant are conducted at a temperature of less than or equal to about 100° C.

In one further aspect, the inorganic acid comprises sulfuric acid ($H_2SO_4$), the oxidant comprises hydrogen peroxide ($H_2O_2$), and a pH of the acidic admixture is less than or equal to about 2.5.

In one further aspect, the mixing the inorganic acid comprises adding black mass to the sulfuric acid ($H_2SO_4$) having a molarity of about 4M, the mixing the oxidant comprises adding about 30% by mass hydrogen peroxide ($H_2O_2$) to the acidic admixture so that the acidic admixture has a solid/liquid ratio of 100 g/L, followed by mixing for greater than or equal to about 2 hours, and then the adding of the deionized water dilutes the sulfuric acid ($H_2SO_4$) to a molarity of about 2M, followed by mixing for greater than or equal to about 30 minutes.

In one aspect, the one or more recovered products has a purity level of greater than or equal to about 95% and comprises less than or equal to about 5% by mass of a total cumulative amount of impurities comprising aluminum (Al), copper (Cu), iron (Fe), phosphorus (P), titanium (Ti) and fluorine (F).

In one aspect, the one or more recovered products has a purity level of greater than or equal to about 98% and comprises less than or equal to about 2% by mass of a total cumulative amount of impurities comprising aluminum (Al), copper (Cu), iron (Fe), phosphorus (P), titanium (Ti) and fluorine (F).

In one aspect, the separating recovers greater than or equal to about 80% by mass of each of nickel (Ni), manganese (Mn), and cobalt (Co) from the purified filtrate liquid stream.

In one aspect, prior to the separating nickel (Ni), manganese (Mn), and cobalt (Co) from the purified filtrate liquid stream, the method further includes passing the purified filtrate liquid stream through a solvent extraction reactor and mixing with an extractant and an organic phase to further remove impurities (e.g., copper (Cu), iron (Fe), and optionally aluminum (Al)) from the intermediate liquid stream.

In one further aspect, a total cumulative concentration of impurities comprising a metal selected from the group consisting of: copper (Cu), iron (Fe), aluminum (Al), and combinations thereof is less than or equal to about 20 ppm.

In one further aspect, the extractant comprises bis-(2-ethylhexyl) phosphoric acid and the organic phase comprises kerosene.

In one aspect, the introducing the intermediate liquid stream into a lithium precipitation reactor comprises adding sodium carbonate ($Na_2CO_3$) and a second inorganic base to the lithium precipitation reactor. The intermediate liquid stream has a temperature of greater than or equal to about 80° C. to less than or equal to about 90° C. for greater than or equal to about 90 minutes to generate lithium carbonate ($Li_2CO_3$) precipitate.

In one aspect, the intermediate liquid stream comprises lithium sulfate ($Li_2SO_4$) and sodium sulfate ($Na_2SO_4$). Prior to the introducing, the intermediate liquid stream is subjected to a thermal shock process so that a temperature is greater than or equal to about 0° C. to less than or equal to about 30° C. followed by ionization in an electrode ionization unit to facilitate precipitation of sodium sulfate ($Na_2SO_4$) from the intermediate liquid stream, followed by adding sodium carbonate ($Na_2CO_3$) into the lithium precipitation reactor to generate lithium carbonate ($Li_2CO_3$) precipitate.

In one aspect, a separation efficiency for each of copper (Cu), aluminum (Al), titanium (Ti), and iron (Fe) is respectively greater than or equal to about 95% and a separation efficiency for fluorine is greater than or equal to about 80%.

In a further aspect, a separation efficiency for each of copper (Cu), aluminum (Al), titanium (Ti), and iron (Fe) is respectively greater than or equal to about 99.5% and a separation efficiency for fluorine is greater than or equal to about 99%.

According to another aspect of the present disclosure, a process for recovering metals from a lithium-ion battery waste stream is provided. The process may comprise purifying a lithium-ion battery waste liquid stream comprising sulfuric acid ($H_2SO_2$) in a first reactor to remove fluorine (F), phosphate (P), and one or more impurity metals selected from the group consisting of: copper (Cu), aluminum (Al), iron (Fe), and titanium (Ti). The purifying may include adding a source of iron (Fe) and a first inorganic base to the waste liquid stream to precipitate copper (Cu) via a cementation reaction, followed by adding a source of calcium oxide and an oxidant to generate calcium fluoride ($CaF_2$) that precipitates out of the waste liquid stream. The purifying may also include adding a second inorganic base to increase pH of the waste liquid stream to generate one or more metal precipitate compounds selected from the group consisting of: aluminum hydroxide ($Al(OH)_3$), titanium hydroxide ($Ti(OH)_4$), iron phosphate ($FePO_4$), and one or more iron hydroxides ($Fe(OH)_3$ and $Fe(OH)_2$). The process also comprises passing the waste liquid stream exiting the first reactor through a filter to generate a purified filtrate liquid stream and a second retentate comprising the one or more metal precipitate compounds, copper (Cu), and calcium fluoride ($CaF_2$). Next, the process includes separating nickel (Ni), manganese (Mn), and cobalt (Co) from the purified filtrate liquid stream by passing the purified filtrate liquid stream into either a second reactor for conducting a co-precipitation process by increasing pH or one or more chromatographic columns or packed-bed columns/reactors. In this manner, an intermediate liquid stream comprising lithium (Li) and one or more recovered products comprising one or more of nickel (Ni), manganese (Mn), and cobalt (Co) is generated. The one or more recovered products are removed from the intermediate liquid stream. The process also comprises introducing the intermediate liquid stream into a lithium precipitation reactor to precipitate at least one compound comprising lithium (Li).

In one aspect, the source of iron (Fe) comprises iron powder, the first inorganic base and the second inorganic base each comprise sodium hydroxide (NaOH), the source of calcium oxide is selected from the group consisting of: lime (CaO), calcium hydroxide ($Ca(OH)_2$), and combinations thereof, and the oxidant is selected from the group consisting of: hydrogen peroxide ($H_2O_2$), ozone ($O_3$), sodium hypochlorite (NaClO), and combinations thereof.

In one aspect, the first base is added until pH is about 5, the second base is added until pH is about 10.5, and the oxidant comprises hydrogen peroxide ($H_2O_2$) which is added at a concentration of greater than or equal to about 4% by volume to less than or equal to about 6% by volume of total liquid contents (waste liquid stream).

In one aspect, the adding the source of iron (Fe) and the first inorganic base to the waste liquid stream is conducted at a pH of greater than or equal to about 1 to less than or equal to about 2 while mixing for a duration of greater than or equal to about 15 minutes at a temperature of greater than or equal to about 55° C. to less than or equal to about 65° C.

In one aspect, about 2.5 g of iron powder is added for each liter (L) of the waste liquid stream.

In one aspect, the adding the source of calcium oxide and the oxidant to generate calcium fluoride ($CaF_2$) is conducted at a pH of greater than or equal to about 1 to less than or equal to about 2 while mixing for a duration of greater than or equal to about 30 minutes at a temperature of greater than or equal to about 55° C. to less than or equal to about 65° C.

In one aspect, the adding of the second inorganic base increases the pH of the waste liquid stream to greater than or equal to about 4 to less than or equal to about 5.

In one aspect, the adding of the second inorganic base to increase pH is conducted while mixing for a duration of greater than or equal to about 60 minutes at a temperature of greater than or equal to about 55° C. to less than or equal to about 65° C.

In one aspect, the purified filtrate liquid stream comprises nickel sulfate ($NiSO_4$), manganese sulfate ($MnSO_4$), and cobalt sulfate ($CoSO_4$) and the separating nickel (Ni), manganese (Mn), and cobalt (Co) from the purified filtrate liquid stream occurs by passing the purified filtrate liquid stream into the second reactor. In the second reactor, the co-precipitation process is conducted that comprises increasing the pH of the purified filtrate liquid stream to greater than or equal to about 11 in an inert environment to form nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$) that concurrently precipitate from the purified filtrate liquid stream to generate the one or more recovered products.

In one further aspect, the increasing the pH of the purified filtrate liquid stream further comprises first adding ammonia to the purified liquid stream that comprises nickel sulfate ($NiSO_4$), manganese sulfate ($MnSO_4$), and cobalt sulfate ($CoSO_4$).

In one aspect, the one or more recovered products is an electroactive material precursor having a stoichiometry of $Ni_xMn_yCo_{1-x-y}(OH)_2$, where x is <1 and y is <1.

In one aspect, the one or more recovered products has a stoichiometry of about

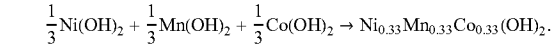

$$\frac{1}{3}Ni(OH)_2 + \frac{1}{3}Mn(OH)_2 + \frac{1}{3}Co(OH)_2 \rightarrow Ni_{0.33}Mn_{0.33}Co_{0.33}(OH)_2.$$

In one aspect, the process further comprises determining a first ratio of Ni:Mn:Co in the purified filtrate liquid stream prior to the co-precipitation process. The first ratio is then compared to a target stoichiometric ratio of Ni:Mn:Co for the one or more recovered products. Thus, the process may include adding one or more of nickel sulfate ($NiSO_4$), manganese sulfate ($MnSO_4$), and cobalt sulfate ($CoSO_4$) to the purified filtrate liquid stream to adjust an amount of nickel sulfate ($NiSO_4$), manganese sulfate ($MnSO_4$), and cobalt sulfate ($CoSO_4$) prior to adjusting the pH. In this manner, the one or more recovered products has a second ratio corresponding to the target stoichiometric ratio.

In one aspect, the separating occurs by passing the purified filtrate liquid stream in a first direction in a packed-bed column/reactor comprising a chelating resin to conduct a chromatographic separation process at a pH of less than or equal to about 4.5 that generates a raffinate stream comprising at least one manganese (Mn)-containing species and at least one lithium (Li)-containing species that exits the packed-bed column/reactor, while nickel (Ni) ions and cobalt (Co) ions are retained on the chelating resin in the packed-bed column/reactor. The process further includes regenerating the packed-bed column/reactor by passing a regeneration liquid having a pH of less than or equal to about 1.5 in the packed-bed column/reactor to form an extract stream comprising the nickel (Ni) ions and cobalt (Co) ions. The process also includes precipitating nickel hydroxide ($Ni(OH)_2$) and cobalt hydroxide ($Co(OH)_2$) from the extract.

In one aspect, the method further comprises forming a precursor of $LiNiCoAlO_2$ electroactive material by combining the nickel hydroxide ($Ni(OH)_2$) and cobalt hydroxide ($Co(OH)_2$) with the aluminum hydroxide ($Al(OH)_3$) and at least one compound comprising lithium (Li).

In one aspect, the process further comprises adjusting the pH of the purified filtrate liquid stream to be greater than or equal to about 4 to less than or equal to about 5 as it enters the packed-bed column/reactor. The process further comprises precipitating manganese hydroxide ($Mn(OH)_2$) by adjusting pH to be greater than or equal to about 8 to less than or equal to about 10 and separating the manganese hydroxide ($Mn(OH)_2$).

In one aspect, the at least one compound comprising lithium (Li) comprises lithium carbonate ($Li_2CO_3$) that is combined with manganese hydroxide ($Mn(OH)_2$) to form $LiMnO_4$ electroactive material.

In one aspect, the adjusting the pH comprises adding sodium hydroxide (NaOH) to the purified filtrate liquid stream.

In one aspect, a stationary phase in the packed-bed column/reactor comprises a macroporous styrene divinylbenzene having functional groups comprising iminodiacetic acid.

In one aspect, the separating occurs by passing the purified filtrate liquid stream in a first direction in a first packed-bed column/reactor comprising a first chelating resin to conduct a chromatographic separation process at a pH of less than or equal to about 1.5. This generates a first raffinate stream comprising at least one manganese (Mn)-containing species, at least one cobalt (Co)-containing species, and at least one lithium (Li)-containing species that exits the first packed-bed column/reactor, while nickel (Ni) ions are retained on the first chelating resin in the first packed-bed column/reactor. The process also comprises passing the first raffinate stream in a first direction in a second packed-bed column/reactor comprising a second chelating resin to conduct a chromatographic separation process at a pH of less than or equal to about 2.5 that generates a second raffinate stream comprising at least one manganese (Mn)-containing species and at least one lithium (Li)-containing species that exits the second packed-bed column/reactor, while cobalt (Co) ions are retained on the second chelating resin in the second packed-bed column/reactor. The process further comprises regenerating the first packed-bed column/reactor by passing a first regeneration liquid having a pH of less than or equal to about 1.5 in the first packed-bed column/reactor to form a first extract stream comprising the nickel (Ni) ions. Next, nickel hydroxide ($Ni(OH)_2$) may be precipitated from the first extract stream. The process also includes regenerating the second packed-bed column/reactor by passing a second regeneration liquid having a pH of less than or equal to about 2.5 in the second packed-bed column/reactor to form a second extract stream comprising the cobalt (Co) ions. This is followed by precipitating cobalt hydroxide ($Co(OH)_2$) from the second extract stream.

In one aspect, the process further comprises forming a precursor of $LiNiCoAlO_2$ electroactive material by combining the nickel hydroxide ($Ni(OH)_2$) and cobalt hydroxide ($Co(OH)_2$) with the aluminum hydroxide ($Al(OH)_3$) and the at least one compound comprising lithium (Li).

In one aspect, the process further comprises precipitating manganese hydroxide ($Mn(OH)_2$) from the second raffinate stream by adjusting pH to be greater than or equal to about 8 to less than or equal to about 10 thus forming the intermediate liquid stream. The manganese hydroxide ($Mn(OH)_2$) is then separated from the intermediate liquid stream.

In one aspect, the at least one compound comprising lithium (Li) comprises lithium carbonate ($Li_2CO_3$) that is combined with manganese hydroxide ($Mn(OH)_2$) to form $LiMnO_4$ electroactive material.

In one aspect, the process further comprises adjusting the pH of the purified filtrate liquid stream by adding sodium hydroxide (NaOH) to the purified filtrate liquid stream to have a pH of about 2.5 and adjusting the pH of the first raffinate stream by adding sodium hydroxide (NaOH) to the first raffinate stream to have a pH of about 3.5.

In one aspect, a stationary phase in the first packed-bed column/reactor comprises macroporous styrene divinylbenzene having functional groups comprising iminodiacetic acid and a stationary phase in the second packed-bed column/reactor comprises macroporous styrene divinylbenzene having functional groups comprising iminodiacetic acid.

In one aspect, the lithium-ion battery waste stream is black mass. Prior to the purifying, the method further comprises generating the lithium-ion battery waste liquid stream by subjecting the black mass to a leaching process that comprises mixing an inorganic acid with the black mass to form an acidic admixture. An oxidant may be mixed with the acidic admixture. The process may further include adding deionized water to the acidic admixture. Then, a leachate stream is passed through a second filter to generate a filtrate liquid stream comprising one or more metal sulfates and a first retentate comprising graphite.

In one further aspect, both the mixing of the inorganic acid and the mixing of the oxidant are conducted at a temperature of less than or equal to about 100° C.

In one further aspect, the inorganic acid comprises sulfuric acid ($H_2SO_4$), the oxidant comprises hydrogen peroxide ($H_2O_2$), and a pH of the acidic admixture is less than or equal to about 2.5.

In one further aspect, the mixing the inorganic acid comprises adding black mass to the sulfuric acid ($H_2SO_4$) having a molarity of about 4M, the mixing the oxidant comprises adding about 30% by mass hydrogen peroxide ($H_2O_2$) to the acidic admixture so that the acidic admixture has a solid/liquid ratio of 100 g/L, followed by mixing for greater than or equal to about 2 hours, and then the adding of the deionized water dilutes the sulfuric acid ($H_2SO_4$) to a molarity of about 2M, followed by mixing for greater than or equal to about 30 minutes.

In one aspect, the one or more recovered products has a purity level of greater than or equal to about 95% and comprises less than or equal to about 5% by mass of a total cumulative amount of impurities comprising aluminum (Al), copper (Cu), iron (Fe), phosphorus (P), titanium (Ti) and fluorine (F).

In one aspect, the one or more recovered products has a purity level of greater than or equal to about 98% and comprises less than or equal to about 2% by mass of a total cumulative amount of impurities comprising aluminum (Al), copper (Cu), iron (Fe), phosphorus (P), titanium (Ti) and fluorine (F).

In one aspect, the separating recovers greater than or equal to about 80% by mass of each of nickel (Ni), manganese (Mn), and cobalt (Co) from the purified filtrate liquid stream.

In one aspect, the introducing the intermediate liquid stream into a lithium precipitation reactor comprises adding sodium carbonate ($Na_2CO_3$) and a second inorganic base to the lithium precipitation reactor. The intermediate liquid stream has a temperature of greater than or equal to about 80° C. to less than or equal to about 90° C. for greater than or equal to about 90 minutes to generate lithium carbonate ($Li_2CO_3$) precipitate.

In one aspect, the intermediate liquid stream comprises lithium sulfate ($Li_2SO_4$) and sodium sulfate ($Na_2SO_4$). Prior to the introducing, the intermediate liquid stream is subjected to a thermal shock process so that a temperature is greater than or equal to about 0° C. to less than or equal to about 30° C. followed by ionization in an electrode ionization unit to facilitate precipitation of sodium sulfate ($Na_2SO_4$) from the intermediate liquid stream, followed by adding sodium carbonate ($Na_2CO_3$) into the lithium precipitation reactor to generate lithium carbonate ($Li_2CO_3$) precipitate.

In one aspect, a separation efficiency for each of copper (Cu), aluminum (Al), titanium (Ti), and iron (Fe) is respectively greater than or equal to about 95% and a separation efficiency for fluorine is greater than or equal to about 80%.

In a further aspect, a separation efficiency for each of copper (Cu), aluminum (Al), titanium (Ti), and iron (Fe) is respectively greater than or equal to about 99.5% and a separation efficiency for fluorine is greater than or equal to about 99%.

According to yet another aspect of the present disclosure, a system for recovering metals from a lithium-ion battery waste stream is provided. The system may comprise a leaching reactor unit comprising a first heated reactor tank having an agitator, a source of sulfuric acid ($H_2SO_4$), a source of hydrogen peroxide ($H_2O_2$), and a source of deionized water ($H_2O$), and a first filter downstream of the first heated reactor tank. The first heated reactor tank has a plurality of inlets that receive the lithium-ion battery waste liquid stream comprising black mass, sulfuric acid ($H_2SO_4$), hydrogen peroxide ($H_2O_2$), and deionized water ($H_2O$) and an outlet through which a leachate stream exits to enter the first filter for separation into a first filtrate liquid stream and a first retentate comprising graphite. The system also comprises an impurity reactor removal unit comprising a second heated reactor tank having an agitator, a source of hydrogen peroxide ($H_2O_2$), a source of calcium oxide, and a second filter downstream of the second heated reactor tank. The second heated reactor tank has a plurality of inlets that receive the first filtrate liquid stream, iron (Fe) powder, sodium hydroxide (NaOH), hydrogen peroxide ($H_2O_2$), calcium oxide, and an outlet through which a first intermediate liquid exits the second reactor tank to enter the second filter for separation into a purified filtrate liquid stream and a second retentate comprising a plurality of precipitated compounds comprising fluorine (F), phosphate (P), copper (Cu), aluminum (Al), iron (Fe), and titanium (Ti). The system also comprises a metal recovery unit for separating nickel (Ni), manganese (Mn), and cobalt (Co) from the purified filtrate liquid stream by in a separation unit. The separation unit may comprise one or more of: a co-precipitation unit and/or one or more chromatographic columns or packed-bed columns/reactors. Where the separation unit is a co-precipitation unit, it comprises a third heated reactor tank for conducting a co-precipitation process by increasing pH, a source of nickel sulfate ($NiSO_4$), a source of manganese sulfate ($MnSO_4$), a source of cobalt sulfate ($CoSO_4$), a source of sodium hydroxide (NaOH), the third heated reactor tank having an agitator and a plurality of inlets that receive the purified filtrate liquid stream, a source of nickel sulfate ($NiSO_4$), a source of manganese sulfate ($MnSO_4$), a source of cobalt sulfate ($CoSO_4$), a source of sodium hydroxide (NaOH), and an outlet through which a second intermediate liquid exits the third heated reactor tank and enters a third filter downstream of the separation unit for separation. Alternatively, the separation unit may be one or more chromatographic columns or packed-bed columns/reactors that generate the second intermediate liquid stream that enters a third filter downstream of the one or more chromatographic columns or packed-bed columns/reactors. There is also a third filter downstream of the separation unit through which the second intermediate liquid stream passes for separation into a third intermediate liquid stream and a third retentate comprising one or more recovered products comprising nickel (Ni), manganese (Mn), and cobalt (Co). Finally, the system comprises a lithium recovery unit that includes a lithium precipitation reactor to precipitate at least one compound comprising lithium (Li) and a fourth filter downstream of the fourth heated reactor tank. The lithium precipitation reactor has an outlet through which a fourth intermediate stream exits to enter a fourth filter for separation into a waste stream and a fourth retentate comprising the at least one compound comprising lithium (Li). In one aspect, the impurity reactor removal unit further comprises a source of iron (Fe) powder and a source of sodium hydroxide (NaOH) and wherein the plurality of inlets of the second heated reactor tank further receives the iron (Fe) powder and sodium hydroxide (NaOH).

In one aspect, the impurity reactor removal unit further comprises a source of sodium phosphate ($Na_3PO_4$).

In one aspect, the lithium precipitation reactor is a fourth heated reactor tank having an agitator and the lithium recovery unit further comprises a source of sodium hydroxide (NaOH), a source of sodium carbonate ($Na_2CO_3$). The fourth heated reactor tank has a plurality of inlets that receive the third intermediate liquid stream, sodium hydroxide (NaOH), and sodium carbonate ($Na_2CO_3$), and an outlet through which the fourth intermediate stream exits to enter the fourth filter.

In one aspect, the lithium recovery unit further comprises a thermal shock unit and an electrode ionization unit upstream of the lithium precipitation reactor.

In one aspect, the metal recovery unit is the co-precipitation unit that further comprises an analyzer to determine a content of nickel (Ni), manganese (Mn), and cobalt (Co) in the purified filtrate liquid stream upstream of the third heated reactor. The co-precipitation unit also comprises a controller and one or more metering pumps to regulate flow of a nickel sulfate ($NiSO_4$), manganese sulfate ($MnSO_4$), and cobalt sulfate ($CoSO_4$) into the plurality of inlets of the third heated reactor. The controller receives input from the analyzer and controls the one or more metering pumps.

In one aspect, the metal recovery unit comprises one chromatographic column or packed-bed column/reactor comprising a chelating resin to conduct a chromatographic separation process at a pH of less than or equal to about 4.5. The metal recovery unit also comprises one or more precipitation reactors for precipitating compounds comprising nickel (Ni), manganese (Mn), and cobalt (Co).

In one aspect, a stationary phase in the packed-bed column/reactor comprises a macroporous styrene divinylbenzene having functional groups comprising iminodiacetic acid.

In one aspect, the metal recovery unit comprises a first chromatographic column or packed-bed column/reactor comprising a first chelating resin to conduct a chromatographic separation process at a pH of less than or equal to about 2.5, a second chromatographic column or packed-bed column/reactor comprising a second chelating resin to conduct a chromatographic separation process at a pH of less than or equal to about 3.5, and one or more precipitation reactors for precipitating compounds comprising nickel (Ni), manganese (Mn), and cobalt (Co).

In one aspect, the system further comprises an evaporator downstream of the metal recovery unit and upstream of the lithium recovery unit.

According to another aspect of the present disclosure, a system for recovering metals from a lithium-ion battery waste stream is provided. The system may comprise a leaching reactor unit comprising a first heated reactor tank having an agitator, a source of sulfuric acid ($H_2SO_4$), a source of hydrogen peroxide ($H_2O_2$), and a source of deionized water ($H_2O$), and a first filter downstream of the first heated reactor tank. The first heated reactor tank has a plurality of inlets that receive the lithium-ion battery waste liquid stream comprising black mass, sulfuric acid ($H_2SO_4$), hydrogen peroxide ($H_2O_2$), and deionized water ($H_2O$) and an outlet through which a leachate stream exits to enter the first filter for separation into a first filtrate liquid stream and a first retentate comprising graphite. The system also comprises an impurity reactor removal unit comprising a second heated reactor tank having an agitator, a source of iron (Fe) powder, a source of sodium hydroxide (NaOH), a source of hydrogen peroxide ($H_2O_2$), a source of calcium oxide, and a second filter downstream of the second heated reactor tank. The second heated reactor tank has a plurality of inlets that receive the first filtrate liquid stream, iron (Fe) powder, sodium hydroxide (NaOH), hydrogen peroxide ($H_2O_2$), calcium oxide (e.g., CaO, Ca(OH)$_2$), and an outlet through which a first intermediate liquid exits the second reactor tank to enter the second filter for separation into a purified filtrate liquid stream and a second retentate comprising a plurality of precipitated compounds comprising fluorine (F), phosphate (P), copper (Cu), aluminum (Al), iron (Fe), and titanium (Ti). The system also comprises a metal recovery unit for separating nickel (Ni), manganese (Mn), and cobalt (Co) from the purified filtrate liquid stream by in a separation unit. The separation unit may comprise either a co-precipitation unit or one or more chromatographic columns or packed-bed columns/reactors. Where the separation unit is a co-precipitation unit, it comprises a third heated reactor tank for conducting a co-precipitation process by increasing pH, a source of nickel sulfate ($NiSO_4$), a source of manganese sulfate ($MnSO_4$), a source of cobalt sulfate ($CoSO_4$), a source of sodium hydroxide (NaOH), the third heated reactor tank having an agitator and a plurality of inlets that receive the purified filtrate liquid stream, a source of nickel sulfate ($NiSO_4$), a source of manganese sulfate ($MnSO_4$), a source of cobalt sulfate ($CoSO_4$), a source of sodium hydroxide (NaOH), and an outlet through which a second intermediate liquid exits the third heated reactor tank and enters a third filter downstream of the separation unit for separation. Alternatively, the separation unit may be one or more chromatographic columns or packed-bed column/reactor that generate the second intermediate liquid stream that enters a third filter downstream of the one or more chromatographic columns or packed-bed columns/reactors. There is also a third filter downstream of the separation unit through which the second intermediate liquid stream passes for separation into a third intermediate liquid stream and a third retentate comprising one or more recovered products comprising nickel (Ni), manganese (Mn), and cobalt (Co). Finally, the system comprises a lithium recovery unit that includes a lithium precipitation reactor to precipitate at least one compound comprising lithium (Li) and a fourth filter downstream of the fourth heated reactor tank. The lithium precipitation reactor has an outlet through which a fourth intermediate stream exits to enter a fourth filter for separation into a waste stream and a fourth retentate comprising the at least one compound comprising lithium (Li).

In one aspect, the lithium precipitation reactor is a fourth heated reactor tank having an agitator and the lithium recovery unit further comprises a source of sodium hydroxide (NaOH), a source of sodium carbonate ($Na_2CO_3$). The fourth heated reactor tank has a plurality of inlets that receive the third intermediate liquid stream, sodium hydroxide (NaOH), and sodium carbonate ($Na_2CO_3$), and an outlet through which the fourth intermediate stream exits to enter the fourth filter.

In one aspect, the lithium recovery unit further comprises a thermal shock unit and an electrode ionization unit upstream of the lithium precipitation reactor.

In one aspect, the metal recovery unit is the co-precipitation unit that further comprises an analyzer to determine a content of nickel (Ni), manganese (Mn), and cobalt (Co) in the purified filtrate liquid stream upstream of the third heated reactor. The co-precipitation unit also comprises a controller and one or more metering pumps to regulate flow of a nickel sulfate ($NiSO_4$), manganese sulfate ($MnSO_4$), and cobalt sulfate ($CoSO_4$) into the plurality of inlets of the third heated reactor. The controller receives input from the analyzer and controls the one or more metering pumps.

In one aspect, the metal recovery unit comprises one chromatographic column or packed-bed column/reactor comprising a chelating resin to conduct a chromatographic separation process at a pH of less than or equal to about 4.5. The metal recovery unit also comprises one or more precipitation reactors for precipitating compounds comprising nickel (Ni), manganese (Mn), and cobalt (Co).

In one aspect, a stationary phase in the packed-bed column/reactor comprises a macroporous styrene divinylbenzene having functional groups comprising iminodiacetic acid.

In one aspect, the metal recovery unit comprises a first chromatographic column or packed-bed column/reactor comprising a first chelating resin to conduct a chromatographic separation process at a pH of less than or equal to about 2.5, a second chromatographic column or packed-bed column/reactor comprising a second chelating resin to conduct a chromatographic separation process at a pH of less than or equal to about 3.5, and one or more precipitation reactors for precipitating compounds comprising nickel (Ni), manganese (Mn), and cobalt (Co).

In one aspect, the system further comprises an evaporator downstream of the metal recovery unit and upstream of the lithium recovery unit.

According to yet another aspect of the present disclosure, a system for recovering metals from a lithium-ion battery waste stream is provided. The system comprises a leaching reactor. The leaching reactor comprises a plurality of inlets that receive the lithium-ion battery waste liquid stream comprising black mass, sulfuric acid ($H_2SO_4$), hydrogen peroxide ($H_2O_2$), and deionized water ($H_2O$). The leaching reactor also has at least one outlet and an agitator. Further, the leaching reactor is in thermal communication with a first heat source and is configured to subject the lithium-ion battery waste stream to a leaching reaction that generates a leachate stream. The system also includes a first pneumatic filter in fluid communication with the outlet of the leaching reactor and through which the leachate stream passes and is separated into a first filtrate liquid stream and a first retentate comprising graphite. The system also comprises an impurity removal reactor in fluid communication with the first pneumatic filter. The impurity removal reactor comprises a plurality of inlets that receive the first filtrate liquid stream from the first pneumatic filter, hydrogen peroxide ($H_2O_2$), and calcium oxide (e.g., CaO, Ca(OH)$_2$). The impurity removal reactor also comprises an outlet and an agitator. The impurity removal reactor is in thermal communication with a second heat source and is configured to purify the first filtrate liquid stream to remove fluorine (F), phosphate (P), and one or more impurity metals selected from the group consisting of: copper (Cu), aluminum (Al), iron (Fe), and titanium (Ti) and generate a first intermediate liquid stream. The system also includes a second pneumatic filter in fluid communication with the outlet of the impurity removal reactor and through which the first intermediate liquid stream passes and is separated into a purified filtrate liquid stream and a second retentate including a plurality of precipitated compounds comprising fluorine (F), phosphate (P), copper (Cu), aluminum (Al), iron (Fe), and titanium (Ti). The system further comprises a co-precipitation reactor in fluid communication with the second pneumatic filter. The co-precipitation reactor comprises a plurality of inlets that receive the purified filtrate liquid stream from the second pneumatic filter, nickel sulfate (NiSO$_4$), manganese sulfate (MnSO$_4$), cobalt sulfate (CoSO$_4$), and sodium hydroxide (NaOH). The co-precipitation reactor also comprises at least one outlet and an agitator. The co-precipitation reactor is in thermal communication with a third heat source and is configured to generate a second intermediate liquid stream. The system further comprises a third pneumatic filter in fluid communication with the outlet of the impurity removal reactor and through which the second intermediate liquid stream passes and is separated into a third intermediate stream comprising lithium (Li) and a third retentate including a plurality of precipitated products nickel (Ni), manganese (Mn), and cobalt (Co). An evaporator in the system is in fluid communication with the third pneumatic filter comprising an inlet, a distillate outlet, and a concentrate outlet. The evaporator separates the third intermediate stream into a concentrate stream and a distillate stream. The system further comprises a lithium precipitation reactor in fluid communication with the concentrate outlet of the evaporator. The lithium precipitation reactor comprises a plurality of inlets that receives the concentrate stream from the evaporator, sodium hydroxide (NaOH), and sodium carbonate (Na$_2$CO$_3$). The lithium precipitation reactor also has an outlet and an agitator. The lithium precipitation reactor is in thermal communication with a fourth heat source and is configured to generate a product stream. A fourth pneumatic filter is in fluid communication with the outlet of the lithium precipitation reactor and the product stream passes through it, so that it is separated into a fourth retentate comprising lithium carbonate (Li$_2$CO$_3$) product and a waste stream. The system also comprises a fluid conduit for establishing fluid communication between the leaching reactor, the first pneumatic filter, the impurity removal reactor, the second pneumatic filter, the co-precipitation reactor, the third pneumatic filter, the evaporator, the lithium precipitation reactor, and the fourth pneumatic filter. The system also has at least one pump for circulating fluids within the fluid conduit.

In one aspect, the plurality of inlets of the impurity removal reactor further receives iron (Fe) powder and sodium hydroxide (NaOH).

In one aspect, the plurality of inlets of the impurity removal reactor further receives sodium phosphate (Na$_3$PO$_4$).

In one aspect, the leaching reactor comprises a first outlet through which the leachate stream flows and a second outlet through which a first gas effluent flows. The co-precipitation reactor comprises a third outlet through which the second intermediate liquid stream flows and a fourth outlet through which a second gas effluent flows. The system further comprises a scrubber in fluid communication with the second outlet of the leaching reactor and the fourth outlet of the co-precipitation reactor so that the scrubber receives the first gas effluent and second gas effluent for processing.

According to yet another aspect of the present disclosure, a system for recovering metals from a lithium-ion battery waste stream is provided. The system comprises a leaching reactor. The leaching reactor comprises a plurality of inlets that receive the lithium-ion battery waste liquid stream comprising black mass, sulfuric acid (H$_2$SO$_4$), hydrogen peroxide (H$_2$O$_2$), and deionized water (H$_2$O). The leaching reactor also has at least one outlet and an agitator. Further, the leaching reactor is in thermal communication with a first heat source and is configured to subject the lithium-ion battery waste stream to a leaching reaction that generates a leachate stream. The system also includes a first pneumatic filter in fluid communication with the outlet of the leaching reactor and through which the leachate stream passes and is separated into a first filtrate liquid stream and a first retentate comprising graphite. The system also comprises an impurity removal reactor in fluid communication with the first pneumatic filter. The impurity removal reactor comprises a plurality of inlets that receive the first filtrate liquid stream from the first pneumatic filter, iron (Fe) powder, sodium hydroxide (NaOH), hydrogen peroxide (H$_2$O$_2$), and calcium oxide (e.g., CaO, Ca(OH)$_2$). The impurity removal reactor also comprises an outlet and an agitator. The impurity removal reactor is in thermal communication with a second heat source and is configured to purify the first filtrate liquid stream to remove fluorine (F), phosphate (P), and one or more impurity metals selected from the group consisting of: copper (Cu), aluminum (Al), iron (Fe), and titanium (Ti) and generate a first intermediate liquid stream. The system also includes a second pneumatic filter in fluid communication with the outlet of the impurity removal reactor and through which the first intermediate liquid stream passes and is separated into a purified filtrate liquid stream and a second retentate including a plurality of precipitated compounds comprising fluorine (F), phosphate (P), copper (Cu), aluminum (Al), iron (Fe), and titanium (Ti). The system further comprises a co-precipitation reactor in fluid communication with the second pneumatic filter. The co-precipitation reactor comprises a plurality of inlets that receive the purified filtrate liquid stream from the second pneumatic filter, nickel sulfate ($NiSO_4$), manganese sulfate ($MnSO_4$), cobalt sulfate ($CoSO_4$), and sodium hydroxide (NaOH). The co-precipitation reactor also comprises at least one outlet and an agitator. The co-precipitation reactor is in thermal communication with a third heat source and is configured to generate a second intermediate liquid stream. The system further comprises a third pneumatic filter in fluid communication with the outlet of the impurity removal reactor and through which the second intermediate liquid stream passes and is separated into a third intermediate stream comprising lithium (Li) and a third retentate including a plurality of precipitated products nickel (Ni), manganese (Mn), and cobalt (Co). An evaporator in the system is in fluid communication with the third pneumatic filter comprising an inlet, a distillate outlet, and a concentrate outlet. The evaporator separates the third intermediate stream into a concentrate stream and a distillate stream. The system further comprises a lithium crystallization or lithium precipitation reactor in fluid communication with the concentrate outlet of the evaporator. The lithium precipitation reactor comprises a plurality of inlets that receives the concentrate stream from the evaporator, sodium hydroxide (NaOH), and sodium carbonate ($Na_2CO_3$). The lithium precipitation reactor also has an outlet and an agitator. The lithium precipitation reactor is in thermal communication with a fourth heat source and is configured to generate a product stream. A fourth pneumatic filter is in fluid communication with the outlet of the lithium precipitation reactor and the product stream passes through it, so that it is separated into a fourth retentate comprising lithium carbonate ($Li_2CO_3$) product and a waste stream. The system also comprises a fluid conduit for establishing fluid communication between the leaching reactor, the first pneumatic filter, the impurity removal reactor, the second pneumatic filter, the co-precipitation reactor, the third pneumatic filter, the evaporator, the lithium precipitation reactor, and the fourth pneumatic filter. The system also has at least one pump for circulating fluids within the fluid conduit.

In one aspect, the leaching reactor comprises a first outlet through which the leachate stream flows and a second outlet through which a first gas effluent flows. The co-precipitation reactor comprises a third outlet through which the second intermediate liquid stream flows and a fourth outlet through which a second gas effluent flows. The system further comprises a scrubber in fluid communication with the second outlet of the leaching reactor and the fourth outlet of the co-precipitation reactor so that the scrubber receives the first gas effluent and second gas effluent for processing.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a process flow diagram including a chromatographic separation process implemented with one chromatographic column or packed-bed column/reactor including a chelating resin stationary phase, according to another example embodiment.

FIG. 5 is a process flow diagram including a chromatographic separation process implemented with two chromatographic columns or packed-bed columns/reactors including a chelating resin, according to another example embodiment.

FIGS. 8-9 are additional process flow diagrams including a chromatographic separation process implemented with two chromatographic columns or packed-bed columns/reactors including a chelating resin like that shown in FIG. 5, according to another example embodiment.

FIG. 17 is a top view of a system including a chelating resin column to implement the process of FIGS. 4 and 6-7, according to another example embodiment.

FIG. 18 is a top view of a system including two chelating resin columns to implement the process of FIGS. 5 and 8-9, according to another example embodiment.

Figure 20:
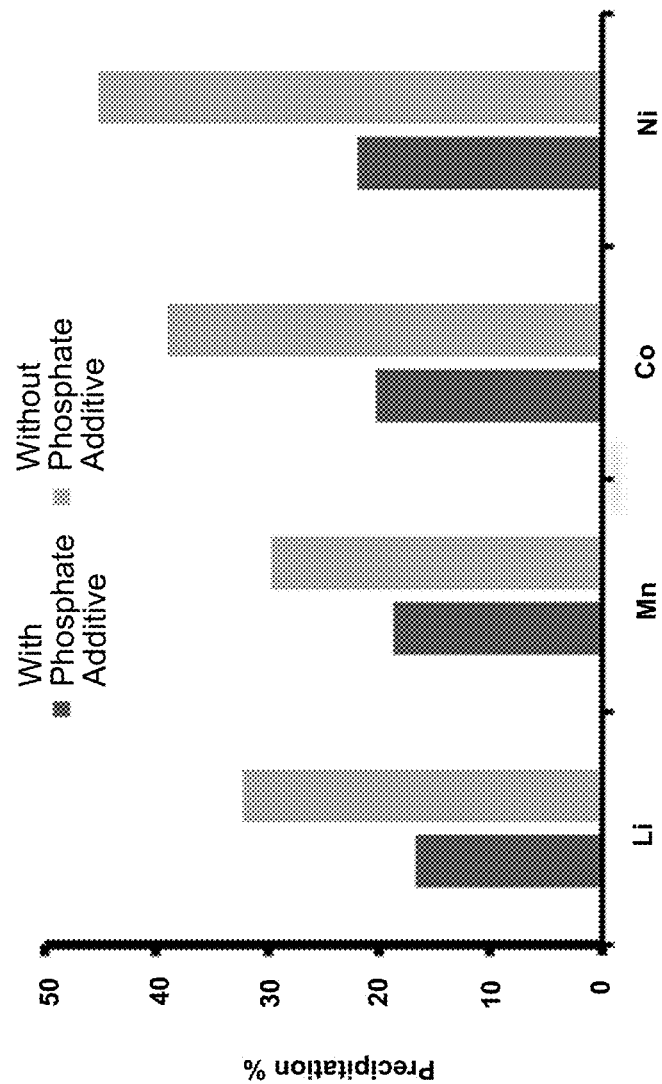

FIG. 20 shows a chart comparing of recovery of desired precipitated metals (Li, Co, Mn, Ni) for an embodiment employing a phosphate additive for removing aluminum from a spent lithium-ion battery stream (black mass rich in aluminum) according to various aspects of the present disclosure as compared to a precipitation process lacking the phosphate additive for the same aluminum-rich black mass stream.

Corresponding reference numerals may indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. Thus ranges are, unless specified otherwise, inclusive of endpoints and include disclosure of all distinct values and further divided ranges within the entire range. Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Unless otherwise indicated, compositional amounts are on a mass basis. Further, if an amount is expressed as a weight, it may be used interchangeably with mass, but should be understood to reflect a mass of a given component.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

In the figures, the direction of an arrow, as indicated by the arrowhead, generally demonstrates the flow of material or information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit," for example, when used in the context of a computing device or module, etc. The term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module and/or controller may include one or more interface circuits. In some examples, the interface circuits may include wired or wireless interfaces that are connected to a local area network (LAN), the Internet, a wide area network (WAN), or combinations thereof. The functionality of any given module and/or controller of the present disclosure may be distributed among multiple modules and/or controllers that are connected via interface circuits. For example, multiple modules and/or controllers may allow load balancing. In a further example, a server (also known as remote, or cloud) module and/or controller may accomplish some functionality on behalf of a client module and/or controller.

The term code, as used above, may include software, firmware, and/or microcode, and may refer to programs, routines, functions, classes, data structures, and/or objects. The term shared processor circuit encompasses a single processor circuit that executes some or all code from multiple modules and/or controllers. The term group processor circuit encompasses a processor circuit that, in combination with additional processor circuits, executes some or all code from one or more modules and/or controllers. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules and/or controllers. The term group memory circuit encompasses a memory circuit that, in combination with additional memories, stores some or all code from one or more modules and/or controllers.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

As noted above, lithium-ion battery waste streams are formed from lithium-ion batteries after they are dismantled, crushed, and/or shredded. Such a waste stream may be a material known as black mass that is intended for recycling. The black mass may collectively include portions of one or more spent lithium-ion batteries, including portions from different types (e.g., having different active materials) of lithium-ion batteries. The black mass typically includes all active materials, so may contain anodic active materials and electrolytic constituents mixed with cathodic active materials. In some examples, spent lithium-ion batteries may include positive electrodes/cathodes made from lithium cobalt oxide (LCO), lithium manganese oxide (LMO), lithium nickel manganese cobalt oxides (NMC), lithium iron phosphate (LFP), lithium nickel cobalt aluminum oxide (NCA), lithium titanate (LTO), and the like. See for example, Table 1 showing a list of common commercial battery active material combinations. The spent lithium-ion batteries may include negative electrodes/anodes made from graphite, lithium titanate oxide ($Li_2TiO_3$—LTO), lithium metal, and the like.

TABLE 1

| Type | Cathode | Anode |
|---|---|---|
| Lithium Cobalt Oxide (LCO or Li-cobalt) | $LiCoO_2$ cathode (~60% Co) | Graphite |
| Lithium Manganese Oxide (LMO or Li-manganese | $LiMn_2O_4$ | Graphite |
| Lithium Nickel Manganese Cobalt Oxide (NMC) | $LiNiMnCoO_2$ | Graphite |
| Lithium Iron Phosphate (LFP or Li-phosphate) | $LiFePO_4$ | Graphite |
| Lithium Nickel Cobalt Aluminum Oxide (NCA or Li-aluminum) | $LiNiCoAlO_2$ (~9% Co) | Graphite |
| Lithium Titanate (LTO or Li-titanate) | NMC | $Li_2TiO_3$ |

Further, the black mass may include fluorine, such as lithium hexafluorophosphate ($LiPF_6$). As a result, the black mass may comprise metals of interest to be recovered (e.g., precious metals), such nickel (Ni), manganese (Mn), cobalt (Co), lithium (Li) and the like, as well as impurities, such as iron (Fe), copper (Cu), fluorine (F), phosphorous (P), titanium (Ti), aluminum (Al), and the like. It should be appreciated that the black mass composition may be subject to variations between batches depending on the types of lithium-ion batteries. As one example, a batch of black mass may include the components shown in Table 2 below.

TABLE 2

| Component | Weight, kg | Weight, lb. | Weight % |
|---|---|---|---|
| Carbon (Graphite) | 105 | 231.5 | 21 |
| Copper | 15 | 33 | 3 |
| $Li_2TiO_3$ | 25 | 55.1 | 5 |
| LiNiCoAl | 75 | 165.3 | 15 |
| LiNiCoMn | 265 | 584.2 | 53 |
| $LiPF_6$ | 15 | 33 | 3 |
| Total | 500 | 1,102 a | 100% |

As lithium-ion batteries evolve, new active materials may include more complex materials with multiple metals (e.g., lithium nickel manganese cobalt oxide $Li(Ni_xMn_yCo_z)O_2$, where $0 \leq x \leq 1$, $0 \leq y \leq 1$, $0 \leq z \leq 1$, and $x+y+z=1$, abbreviated NMC, for example, $LiMn_{0.33}Ni_{0.33}Co_{0.33}O_2$ as a positive electrode material). As noted above, recycling processes generally have focused on recovering cobalt and lithium from lithium cobalt oxide cathodes. However, spent lithium-ion batteries now often include many other types of cathode materials having valuable metals, such as nickel and manganese, which are desirable to recover. Further, the black mass typically contains many types of impurities. This is especially true when the black mass is derived from a collection of different types of lithium-ion batteries. Such impurities may adversely affect the purity of otherwise valuable metals recovered from recycling.

In various aspects, the systems and processes disclosed herein enable the recycling of spent lithium-ion batteries by removing impurities contained in black mass and recovering various precious metals of interest. By way of example, the methods and systems of the present disclosure provide the ability to process a lithium-ion battery waste stream to separate impurities comprising elements selected from the group consisting of: fluorine (F), phosphate (P), copper (Cu), aluminum (Al), iron (Fe), carbon (C) (e.g., in the form of graphite), titanium (Ti), and combinations thereof from one or more recovered metals selected from the group consisting of: nickel (Ni), manganese (Mn), cobalt (Co), and lithium (Li).

In certain aspects, where the lithium-ion battery waste stream initially includes impurities comprising elements selected from the group consisting of: fluorine (F), phosphate (P), copper (Cu), aluminum (Al), iron (Fe), carbon (C) (e.g., in the form of graphite), titanium (Ti), these impurities may be removed to a separation efficiency individually or cumulatively (inclusive of all elements to be removed) of greater than or equal to about 75% or any of the values specified below. The separation efficiency may be calculated by comparing an initial amount of a given element present in a stream before processing and a final amount of a given element present in a product after processing or separations. In certain aspects, a separation efficiency ($\eta$) for a given component can be expressed by $$\eta = 100 \times \left( \frac{x_i - x_f}{x_i} \right),$$

where $x_i$ is the initial amount (either mass or volume quantity) of a component and $x_f$ is the final amount of the component after the separation process has been completed. In certain variations, an efficiency of separation using the inventive systems may be greater than or equal to about 75%, optionally greater than or equal to about 80%, optionally greater than or equal to about 85%, optionally greater than or equal to about 90%, optionally greater than or equal to about 95%, optionally greater than or equal to about 96%, optionally greater than or equal to about 97%, optionally greater than or equal to about 98%, and in certain variations, optionally greater than or equal to about 99% for a select impurity or component (or alternatively for a cumulative total amount of all impurities), as will be described in more detail below.

In certain variations, a separation efficiency for each of copper (Cu), aluminum (Al), titanium (Ti), and iron (Fe) is respectively greater than or equal to about 95%, optionally greater than or equal to about 97%, optionally greater than or equal to about 98%, optionally greater than or equal to about 99%, optionally greater than or equal to about 99.5%, optionally greater than or equal to about 99.8%, and in certain aspects, optionally greater than or equal to about 99.9%.

In certain variations, a separation efficiency for fluorine is greater than or equal to about 85%, optionally greater than or equal to about 90%, optionally greater than or equal to about 95%, optionally greater than or equal to about 97%, optionally greater than or equal to about 98%, and in certain aspects, optionally greater than or equal to about 99%.

In a further aspect, a separation efficiency for each of copper (Cu), aluminum (Al), titanium (Ti), and iron (Fe) is respectively greater than or equal to about 95% and a separation efficiency for fluorine is greater than or equal to about 80%.

In a further aspect, a separation efficiency for each of copper (Cu), aluminum (Al), titanium (Ti), and iron (Fe) is greater than or equal to about 99.5% up to about 100% and a separation efficiency for fluorine is greater than or equal to about 99%.

In other aspects, the processes of the present disclosure may generate one or more recovered products (comprising nickel (Ni), cobalt (Co), and manganese (Mn)) that have a purity level of greater than or equal to about 95% and comprise less than or equal to about 5% by mass of a total cumulative amount of impurities comprising aluminum (Al), copper (Cu), iron (Fe), phosphorus (P), titanium (Ti) and fluorine (F). For example, a purity level of the one or more recovered products (comprising nickel (Ni), cobalt (Co), and manganese (Mn)) may be greater than or equal to about 95% by mass to less than or equal to about 99% by mass and comprise greater than or equal to about 1% by mass to less than or equal to about 5% by mass of a total cumulative amount of impurities comprising aluminum (Al), copper (Cu), iron (Fe), phosphorus (P), titanium (Ti) and fluorine (F). In one variation, the one or more recovered products has a purity level of greater than or equal to about 98% by mass and comprises less than or equal to about 2% by mass of a total cumulative amount of impurities comprising aluminum (Al), copper (Cu), iron (Fe), phosphorus (P), titanium (Ti) and fluorine (F). Further, the separating processes described herein are able to recover greater than or equal to about 80% by mass of each of nickel (Ni), manganese (Mn), and cobalt (Co) from the waste stream.

This may be achieved by processing the lithium-ion battery waste stream as feed material in various stages of a system for batch processing, where the contents undergo successive reactions with various reagents to selectively precipitate and remove the components of interest, such as nickel (Ni), manganese (Mn), cobalt (Co), and lithium (Li) when present, for example nickel-manganese-cobalt oxides (NMC), lithium carbonate ($Li_2CO_3$), and the like. The various stages or units are arranged consecutively providing intermediate processed streams the next stage units. Such stages may include, for example, a leaching stage or unit, an impurity removal stage or unit, a metal recovery stage, a lithium recovery stage or unit, and/or one or more precipitation stages, as further explained below.

Figure 1:
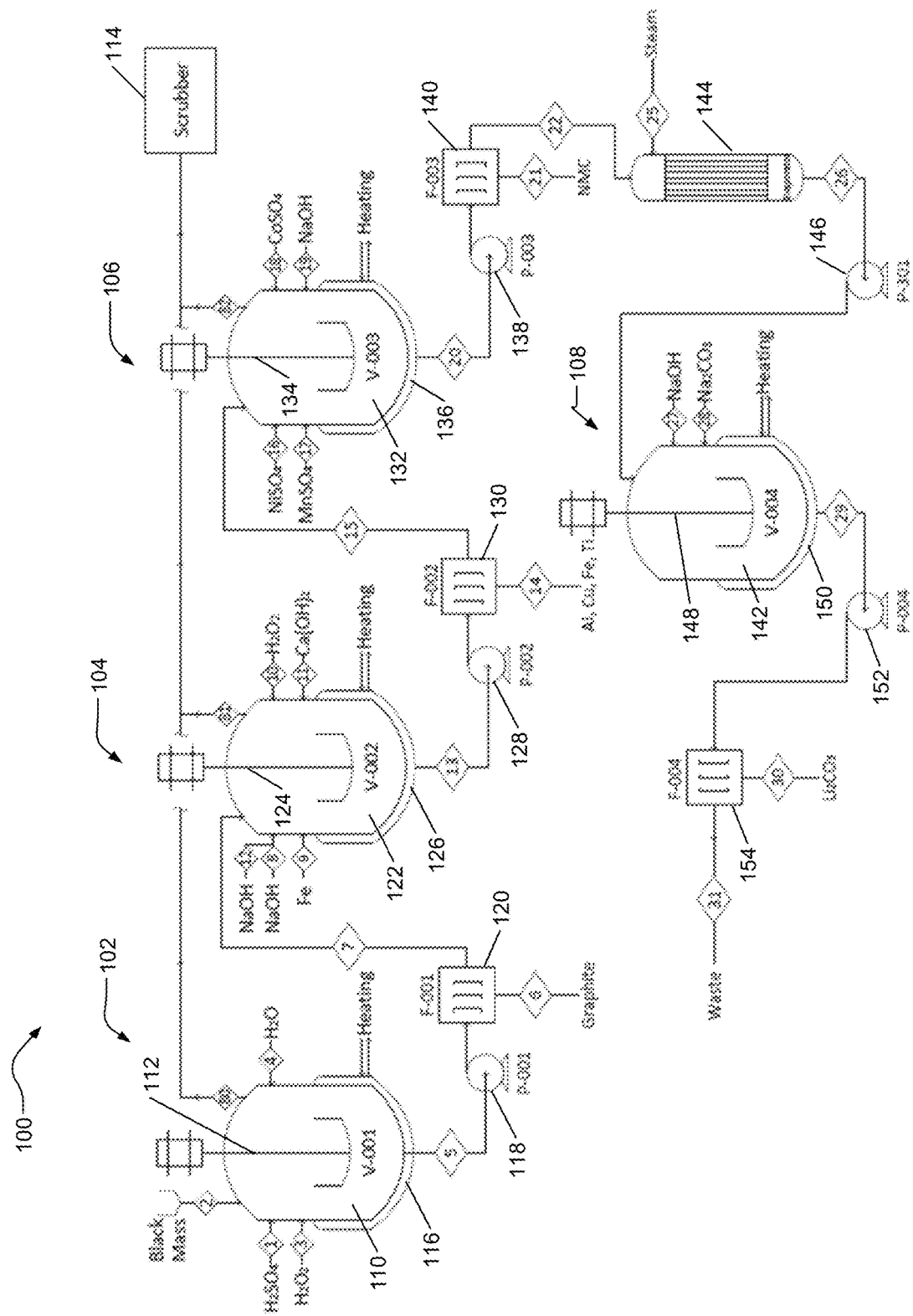
FIG. 1 is a process flow diagram including various stages for removing impurities and recovering precious metals contained in spent lithium-ion batteries, according to one example embodiment of the present disclosure.

In certain aspects, the present disclosure contemplates a process for recovering metals from a lithium-ion battery waste stream. An optional first leaching step may be conducted on a lithium-ion battery waste stream, for example, comprising a black mass (2) that is subjected to a leaching process, or the waste stream may be received pre-processed, as will be described further below. For example, a process of removing impurities and recovering various precious metals from one or more spent lithium-ion batteries according to one example embodiment of the present disclosure is illustrated in FIG. 1 and indicated generally by the reference number 100. As shown, a process may be conducted in system 100 that includes various consecutively arranged stages including a leaching unit or stage 102, an impurity removal unit or stage 104, and two precipitation units or stages 106, 108. In the stages 102, 104, 106, 108, contents are collected and processed in reactors or vessels 110, 122, 132, 142. Each reactor 110, 122, 132, 142 may be a jacketed, agitated tank that is internally coated with a corrosion-resistant lining to withstand hot acidic conditions that may occur in the system 100. For example, each reactor 110, 122, 132, 142 may include an agitator 112, 124, 134, 148 for stirring contents, and a jacket 116, 126, 136, 150 surrounding its respective reactor to circulate a heating/cooling medium (e.g., steam, etc.) for maintaining a desired temperature.

The process in the system 100 begins at the leaching stage 102. In the example of FIG. 1, various components are fed into the reactor (e.g., a leaching reactor) 110, which is identified as V-001. The method may include generating the lithium-ion battery waste liquid stream by subjecting the black mass (2) to a leaching process that comprises mixing an inorganic acid (1) with the black mass (2) to form an acidic admixture; then mixing an oxidant (3) with the acidic admixture; and adding deionized water (4) to the acidic admixture. After this process, the leachate stream (5) generated in the reactor 110 may then pass through a second filter to generate a filtrate liquid stream (7) comprising one or more metal sulfates and a first retentate comprising graphite (6).

Thus, during the leaching stage 102, an inorganic acid from a source or container (1) is fed into the leaching reactor 110 during a first phase. The inorganic acid may be sulfuric acid ($H_2SO_4$) as shown in FIG. 1 or another suitable inorganic acid. Notably, in certain aspects, hydrochloric acid (HCl) may be avoided, because chlorine can cause contamination in electrochemical cells if the recycled material contains high levels of chlorine. In some examples, the inorganic acid may contain about 4M sulfuric acid ($H_2SO_4$). During this time, the agitator 112 may be activated to stir the acid solution in the leaching reactor 110. In one aspect, the mixing of the inorganic acid and the mixing of the oxidant are conducted at a temperature of less than or equal to about 100° C., optionally less than or equal to about 95° C., and in certain aspects, less than or equal to about 90° C. The oxidant may be hydrogen peroxide ($H_2O_2$), ozone ($O_3$), sodium hypochlorite (NaClO), or combinations thereof. In certain variations, the oxidant is hydrogen peroxide ($H_2O_2$). Notably, because the addition of black mass and dilution with sulfuric acid are exothermic processes, the temperature may be monitored to ensure that it does not exceed the boiling point of water, for example, by introducing cool water or via heat exchangers. During the first phase, black mass from a source or container may be gradually added to the agitated acid solution in the leaching reactor 110.

In one variation, the inorganic acid comprises sulfuric acid ($H_2SO_4$), the oxidant comprises hydrogen peroxide ($H_2O_2$), and a pH of the acidic admixture in the leaching reactor 110 is less than or equal to about 2.5. The hydrogen peroxide ($H_2O_2$) may be added at a concentration of greater than or equal to about 4% by volume to less than or equal to about 6% by volume of total liquid contents. In one further variation, the mixing of the inorganic acid comprises adding black mass to the sulfuric acid ($H_2SO_4$) having a molarity of about 4M, the mixing the oxidant adds about 30% by mass hydrogen peroxide ($H_2O_2$) to the acidic admixture so that the acidic mixture has a solid/liquid ratio of 100 g/L, followed by mixing in the leaching reactor 110 for greater than or equal to about 2 hours, and then the adding of the deionized water dilutes the sulfuric acid ($H_2SO_4$) to a molarity of about 2M, followed by mixing for greater than or equal to about 30 minutes.

After the black mass (2) is introduced, the acid solution begins reacting with metals in the black mass so that the metals react and form their respective sulfates. In some examples, fluorine (F) in the black mass may be converted to hydrogen fluoride (HF). Some of the HF may stay in the solution contained in the leaching reactor 110, while the remainder may be released as a gas (80) and vented to a scrubber 114.

During the first phase, an oxidant may be fed to the leaching reactor 110 from a source or container. The oxidant may be hydrogen peroxide ($H_2O_2$) as shown in FIG. 1 or another suitable oxidant. In some examples, the oxidant may be 30% hydrogen peroxide ($H_2O_2$). The oxidant may be fed into the reactor 110 before, the same time as, or after the inorganic acid and/or the black mass are added. The mixture of the acid solution, the oxidant, and the black mass may be agitated for a defined period of time (e.g., 1 hour, 2 hours, 3 hours, etc.).

In some examples, it may be desired for a temperature of the liquid in the leaching reactor 110 to remain at a defined level, as noted above, desirably below 100° C. For example, the defined temperature level may range from about 60° C. (140° F.) to about 80° C. (176° F.). In some embodiments, the minimum required temperature level may be about 60° C. (140° F.), and a desired temperature level may be about 80° C. (176° F.). In some cases, however, the temperature of the liquid may increase above the desired level and/or fall below the minimum required temperature level. For example, as noted above, heat from the reaction between the acid solution and the metals in the black mass may increase the temperature of the liquid in the leaching reactor 110 above the desired temperature (e.g., 80° C.). In other examples, the liquid temperature may not rise to the required level (e.g., 60° C.). In such examples, the liquid temperature may be controlled through different manners. For example, the liquid temperature may be reduced by adjusting the rate of black mass addition to the acid solution. In other cases, the liquid temperature may be reduced or increased by circulating a heating/cooling medium (e.g., steam, etc.) through the jacket 116 surrounding the leaching reactor 110.

Once the agitation period is complete, demineralized water from a source or container (4) is added to the reactor 110 in a second phase. For example, deionized (DI) water may be added to dilute the sulfuric acid. For instance, adding the water may reduce molarity of the liquid in the leaching reactor 110 from about 4M to about 2M. Additionally, the water may cool the contents in the reactor 110 so that the temperature does not exceed 90-100° C., because as noted above, the addition of the black mass and dilution of the sulfuric acid are exothermic processes. In some examples, the temperature may be cooled to about 60° C. (140° F.). After the demineralized water is added, the mixture in the leaching reactor 110 is agitated for a defined period of time (e.g., about 30 minutes, etc.). At this point, the pH of the solution may be acidic, for example, greater than or equal to about 0.1 to less than or equal to about 1. In certain variation, the pH may be about 0.1. The leachate stream may comprise a variety of metal sulfates, for example, nickel sulfate ($NiSO_4$), manganese sulfate ($MnSO_4$), cobalt sulfate ($CoSO_4$), and the like.

Next, the vessel contents in the reactor 110 are pumped via a pump 118 through a filter 120, which may be a pneumatic filter. After passing the leachate stream through the filter, a filtrate liquid stream (7) comprising one or more metal sulfates and a first retentate comprising solids (6), such as carbon (graphite) particles are formed. In this manner, the graphite is removed from the leachate stream. The pump 118 and the filter 120 are identified as P-001 and F-001, respectively, in FIG. 1. The remaining contents (e.g., a first filtrate) passing through the filter 120 are fed to an impurity removal reactor 122 used in the impurity removal stage 104. In some examples, nearly all carbon (graphite) particles in the vessel contents may be captured in the filter 120 as retentate. Such carbon (graphite) particles may be passed or conveyed to a container and further processed (e.g., dried). In some examples, the pump 118 may be a centrifugal pump as shown in FIG. 1 or another suitable pump, and the filter 120 may be a pressure filter, a hydraulic filter, a gravity filter or another suitable type of filter.

After filtration, the reactor 110 may be washed with an internal spray ball to remove acid residue and to send all leaching reaction products to the reactor 122.

Additionally, acid residue in the filter cake/retentate may be neutralized by rinsing the residue to reduce operator exposure during cake collection. In some examples, a separate water stream may be lined up with the pump 118 and a dilute caustic may be added upstream of the filter 120 to remove residual filtrate, which may be sent to wastewater treatment. At the end this stage 102, graphite cake (e.g., in the container, on the filter 120, etc.) may be collected for disposal.

In the impurity removal stage 104, impurities removal occurs. This may occur concurrently and multifacetedly in a collective batch process, and with individual steps to remove specific impurities performed sequentially. If the impurities removal procedure is not followed chronologically or sequentially as explained below, high efficiency for impurities removal may not be achieved. In the impurity removal stage 104, impurities (e.g., certain metals) in the leachate (7) produced from stage 102 may be removed, for example, converted to their hydroxide or other forms and precipitated. In some embodiments, there may be a minimal compromission of precious metals concentration of not more than 2% while removing impurities.

In certain aspects, the methods of the present disclosure may include purifying the lithium-ion battery waste liquid stream (7) comprising sulfuric acid ($H_2SO_4$) in an impurity removal reactor 122 to remove fluorine (F), phosphate (P), and one or more impurity metals selected from the group consisting of: copper (Cu), aluminum (Al), iron (Fe), and titanium (Ti). Initially, the contents (e.g., the first filtrate or leachate) (7) from the reactor 110 are provided to the impurity removal reactor 122, which is identified as V-002 in FIG. 1. The purifying may include removing copper (Cu) from the liquid stream. In certain variations, the purifying may include precipitating a product comprising copper (Cu) that is removed (e.g., separated) from the liquid stream, which may occur via a cementation reaction or sulfidation reaction, for example. In other aspects, the removing of copper (Cu) may include subjecting the removing copper (Cu) from the waste liquid stream comprises subjecting the waste liquid stream to a solvent-extraction. The removing of the copper (Cu) may involve one or more of these removal processes (e.g., one or more of sulfidation, cementation, or solvent-extraction).

By way of example, in one variation, the removal of copper from the liquid stream may be achieved via a sulfidation reaction that creates a precipitate that can be removed. As will be described further herein, sulfide precipitation of copper may be useful to recover a greater number of desired metals downstream in the process, because many of such metals are sparingly soluble as sulfides. In general, a log solubility product ($K_{sp}$) of metal sulfides is higher than that of metal hydroxides (i.e., a higher log solubility product equates to lower solubility product). For example, with respect to copper (Cu), copper sulfide (CuS) has a first $K_{sp}$ of $10^{-35.9}$ that is smaller than that of copper hydroxide ($Cu(OH)_2$) with a second $K_{sp}$ of $10^{-19.8}$. In variations where the lithium-ion battery waste stream, for example, the black mass is relatively rich in copper (Cu), for example, having greater than or equal to about 6% by weight of copper, other copper removal processes, such as cementation, may be less desirable because iron (Fe) released during the process could cause the desired precious metals to prematurely precipitate from the process stream when impurities like copper are removed, thus potentially reducing the recovery of desired metals downstream in the process.

For a sulfidation reaction and removal process, a source of sulfur (S), for example, sodium sulfide ($Na_2S$) may be added to the liquid stream to provide sulfur compounds/ions as a reagent that facilitates precipitating copper (Cu) via a sulfidation reaction. The precipitation of copper as sulfides usually occurs at lower pH values than the precipitation of the target/desired metals as hydroxides. As will be appreciated by those of skill in the art, the pH is not too low, for example, less than or equal to about 0.5, as some sulfide precipitates are acid soluble. Moreover, it is understood that at higher pH ranges, for example, at pH of greater than or equal to about 4 to less than or equal to about 8, metal salts would have already formed their hydroxide salts and thus would not be precipitated as sulfides. In one variation, the source of sulfur (S) may be sodium sulfide ($Na_2S$). Thus, sodium sulfide ($Na_2S$) may be dosed in the leaching solution in an amount in excess of a required stoichiometric ratio of sodium sulfide ($Na_2S$) to copper, for example, at greater than or equal to about 1.1 to less than or equal to about 1.5 times to remove copper at pH. The pH of the liquid may optionally be around 1, for example, in certain variations, greater than or equal to about 0.9 to less than or equal to about 1.1.

Subsequently, the pH of the liquor may be increased to an acidic pH, for example, at greater than or equal to about 4.5 to less than or equal to about 5. The addition of sodium sulfide ($Na_2S$) to the liquid stream and the ensuing reaction may serve to increase the pH to target range. In certain aspects, an amount of sodium sulfide ($Na_2S$) that is introduced/dosed into the stream is controlled to avoid an undesirably large increase in pH. For example, dissolution of sodium sulfide forms aqueous hydrogen sulfide and NaOH (which causes pH increase) per the reaction scheme below:

$$Na_2S + H_2O \rightarrow H_2S + 2NaOH.$$

In other variations, a first inorganic base may be added to further increase the pH to the desired pH range.

For the copper ions to form copper sulfide, the copper ions should react with hydrogen sulfide ions and thus protonation of hydrogen sulfide occurs in an alkaline medium based on speciation as shown in the reaction scheme below:

$$CuSO_4 + HS^- + OH^- \rightarrow Cu\ (s) + SO_4^{2-} + H_2O.$$

Another sulfidation reaction that may occur when sodium sulfide is added is:

$$Na_2S\ (s) + Cu^{2+}\ (aq) \rightarrow CuS\ (s) + 2Na^+\ (aq).$$

Thus, in one aspect, the overall sulfidation reaction in the waste liquid may be represented by:

$$Na_2S\ (aq) + CuSO_4\ (aq) \rightarrow Na_2SO_4 + CuS\ (s).$$

In certain variations, a pH during the sulfidation reaction may be greater than or equal to about 0.7 to less than or equal to about 2, in one variation, optionally greater than or equal to about 1.5 to less than or equal to about 2. The sulfidation reaction may be conducted at about 25° C. The sulfidation reaction may be conducted for about 30 minutes in certain variations.

The copper precipitate formed via the sulfidation reaction may then be removed from the liquid stream. The precipitated copper (Cu) can be removed in a solid-liquid separation process downstream from the first reactor, such as filtration, as will be described further below. After conducting the sulfidation removal, in certain variations, greater than or equal to about 90% of the initial copper (Cu) present in the liquid stream is removed.

In another variation, the removal of copper may be achieved via a cementation reaction. In an alternative variation, for a cementation reaction and removal process, iron (Fe) provided from a source of iron (Fe) (9) and a first inorganic base (8) may be added to the liquid stream to precipitate copper (Cu) via a cementation reaction. In certain variations, the first base may be added until a pH of the admixture is about 5 and in certain other variations, about 5.5. While not limiting the present disclosure, it is believed that a spontaneous reaction between copper ions and iron occurs, so that iron oxidizes and the copper ions are reduced through the transfer of electrons resulting in copper precipitation as follows:

$$Cu^{2+}\ (aq) + Fe\ (s) \rightarrow Cu\ (s) + Fe^{2+}\ (aq).$$

The precipitated copper (Cu) can be removed in a solid-liquid separation process downstream from the first reactor, such as filtration, as will be described further below. The source of iron (Fe) may be iron powder.

The first inorganic base (as well as the second inorganic base discussed below) may be selected from relatively strong inorganic bases, such as sodium hydroxide (NaOH), potassium hydroxide (KOH), and/or lithium hydroxide (LiOH). In one variation, the base comprises sodium hydroxide (NaOH).

Figure 19:
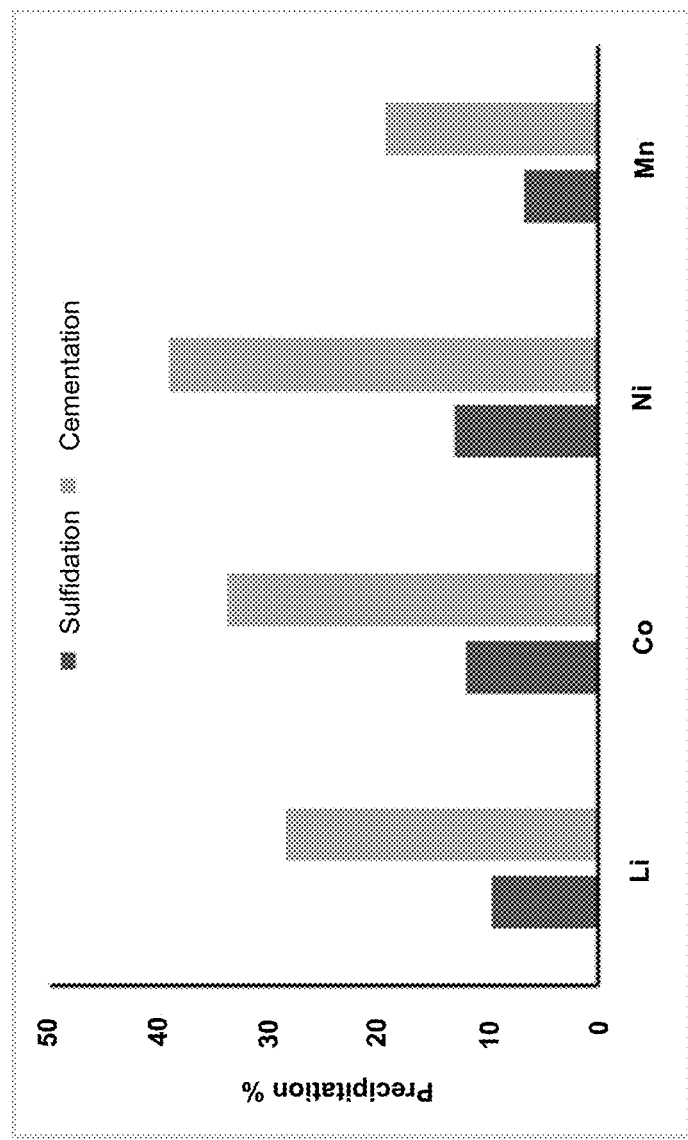
FIG. 19 shows a chart comparing of recovery of desired metals (Li, Co, Mn, Ni) by two embodiments for removing copper by precipitation (cementation and sulfidation) from a spent lithium-ion battery stream (black mass rich in copper) according to various aspects of the present disclosure.

A comparison of recovery of desired (e.g., precious) metals (e.g., Li, Co, Mn, Ni) by precipitation is provided for the two alternative copper removal processes (cementation and sulfidation) for black mass rich in copper (e.g., 6 weight % copper (Cu)) in FIG. 19. As can be seen, the sulfidation showed better performance and less undesired precipitation for the desired/precious metals for such a lithium-ion battery waste stream, for example, comprising a copper-rich black mass meaning that greater quantities of the desired metals are available for recovery downstream in the processes of the present disclosure.

In other variations where the lithium-ion battery waste stream, for example, the black mass is relatively rich in copper (Cu), for example, having greater than or equal to about 3% by weight of copper, another copper removal process such as a solvent-extraction process may be used. For example, the waste liquid stream containing copper to be removed can be contacted (e.g., mixed) with an extractant and an organic phase. In such a process, the extractant can form a complex with the target impurity, here copper (Cu), and transfer the complex from the liquid aqueous phase in the waste stream to the organic phase. In this manner, the extractant/organic phase forms a raffinate that may be further separated by gravity or centrifugation separation processes. In certain variations, the solvent-extraction process for removing copper (Cu) may also concurrently and advantageously remove impurities comprising iron (Fe) when the waste liquid stream is mixed with extractant and organic phase.

In certain variations, a suitable extractant for removing copper and optionally iron comprises an oxime such as 5-nonyl-salicylaldoxime also known as 2-hydroxy-5-nonyl-benzaldehyde oxime (NSAO, commercially available as ACORGA™ P50 oxime solvent extraction reagent). A suitable organic phase for use in the solvent-extraction of copper may be a liquid hydrocarbon, such as kerosene. In certain variations, the kerosene may be a sulfonated kerosene. An aqueous-organic ratio (A/O ratio) may be set 1 to 1. In one variation, a pH may be about 1 to maximise copper (Cu) extraction while minimizing precious metals co-extraction. A concentration of the extractant (e.g., 5-nonyl-salicylaldoxime) may be greater than 0 to less than or equal to about 20 volume % of the total organic phase volume. In certain variations, solvent extraction may be conducted in a reactor with three separate stages, which appears to provide an efficacy that far exceeds the separation of a single stage column/reactor. While additional stages may be used, it appears that a fourth or greater stage solvent extraction results in only a negligible increase in copper (Cu) extraction efficiency.

After conducting the solvent-extraction process, in certain variations, greater than or equal to about 95% of the initial copper (Cu) present in the waste liquid stream and greater than or equal to about 95% of the initial iron (Fe) present in the waste liquid stream may be removed from the waste liquid stream.

Next, the method may include fluorine removal. The fluorine removal process may further include adding a source of calcium and oxygen (11), for example, calcium oxide, and optionally an oxidant (10) to generate calcium fluoride ($CaF_2$) that precipitates out of the liquid waste stream. The source of calcium oxide (11) is selected from the group consisting of: lime (CaO), calcium hydroxide ($Ca(OH)_2$), and combinations thereof and the oxidant may comprise hydrogen peroxide ($H_2O_2$), ozone ($O_3$), sodium hypochlorite (NaClO), and combinations thereof. In certain variations, solid phase calcium oxide (CaO) or solid phase calcium hydroxide ($Ca(OH)_2$) may be mixed or reacted (e.g., slaked) with water in a reactor or tank to form a liquid phase source of calcium hydroxide ($Ca(OH)_2$) that may then introduced to and/or mixed with the liquid stream to remove fluorine. In certain variations, a pH during the fluoride removal may be greater than or equal to about 1 to less than or equal to about 2. A temperature during the fluorine removal may be about 40° C. in certain variations.

In certain aspects, the oxidant (10) is hydrogen peroxide ($H_2O_2$). Again, after reaction, the precipitated calcium fluoride ($CaF_2$) can be removed in a solid-liquid separation process downstream, such as filtration, as will be described further below. Notably, in certain variations, where iron is added to the process (in the reaction above, where copper is precipitated), it may be added to the process prior to lime addition (CaO) for removing fluoride. If unreacted CaO were instead present in the solution, it could detrimentally interfere with copper removal, because zero valent iron that is meant to remove copper acts as an adsorbent, and not as a reducing agent for transforming $Cu^{2+}$ to Cu.

An alternative fluorine removal process may be a selective adsorption process where the liquid stream may be processed in one or more columns (e.g., chromatographic columns or packed-bed columns/reactors) with a resin process using a stationary phase of a polymeric adsorbent with high selectivity for fluorine to remove fluorine. By way of non-limiting example, a suitable fluorine removal process is described in PCT International Application PCT/SG2022/050014 entitled "PROCESS FOR RECYCLING LITHIUM IRON PHOSPHATE BATTERIES," the relevant portions of which are incorporated herein by reference. Removal of fluorine is advantageous because if it remains in the recycled active material at significant concentrations it can form detrimental impurity compounds (e.g., as hydrogen fluoride (HF)), which can cause capacity attenuation and degradation of the recycled cathode electroactive materials in a battery.

In variations where the lithium-ion battery waste stream, for example, black mass, is relatively rich in aluminum (Al), for example, having greater than or equal to about 3% by weight of aluminum, the present disclosure may further include additional purification steps for the lithium-ion battery waste liquid stream after copper and fluoride removal. More specifically, an additional process for removing aluminum can be conducted as described herein. In such an embodiment, a source of phosphate may be added to the liquid stream, for example, sodium phosphate ($Na_3PO_4$), to impurity removal reactor 122 to facilitate removal of aluminum (Al). The addition of phosphates to the leaching solution is advantageous in that aluminum phosphate ($AlPO_4$) precipitates (in addition to the aluminum hydroxide discussed below), from the aluminum-rich black mass. When processing aluminum-rich black mass streams, a considerable amount of desired (e.g., precious) metals (e.g., Li, Co, Ni) may be prematurely precipitated in the impurity removal phase due to the presence of aluminum (Al). Most phosphates have lower solubility products as compared to their hydroxide counterparts, such that forming metal phosphates serves to remove them from the leached liquor as solid products. In certain variations of the present disclosure, a source of phosphates, like sodium phosphate ($Na_3PO_4$), will be added to provide phosphate anions to facilitate the formation of aluminum phosphate as a desired by-product as shown in the reaction scheme below:

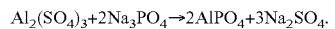

$$Al_2(SO_4)_3 + 2Na_3PO_4 \rightarrow 2AlPO_4 + 3Na_2SO_4.$$

After addition of the source of phosphates, for example, sodium phosphate ($Na_3PO_4$), a pH of the liquid stream/liquor may then be increased to greater than or equal to 4 to less than or equal to about 5 then increased to around pH 4 to less than 5 before subjected to liquid-solid separation (e.g., filtration) of the precipitated phosphates. The results are shown in FIG. 20, where precipitation is shown with the phosphate additive and without the phosphate additive. As can be seen, the precipitation of aluminum just by changing the pH in a leachate with high amounts of aluminum causes considerable precipitation rate for desired precious metals (e.g., Li, Mn, Co, Ni). When the phosphate additive is used for a comparative precipitation that includes forming the aluminum phosphate, a rate of the desired precious metals precipitation is lower. The removal of iron (Fe) and aluminum (Al) may be 100%.

In certain aspects, after removal of copper and fluoride, the liquid waste stream may be adjusted to have a pH of greater than or equal to about 4.5 to less than or equal to about 5, for example, by adding a base like sodium hydroxide (NaOH) (12). The transition in the pH will assist with removal of remaining impurities, including one or more of iron (Fe), titanium (Ti), aluminum (Al), phosphate (P), and combinations thereof. A temperature during this process may be about 60° C. and this mixing may be conducted for about 60 minutes in certain variations.

The purifying also optionally includes adding a second inorganic base (12) to increase pH of the liquid waste stream to generate one or more metal precipitate compounds comprising a metal selected from the group consisting of: aluminum (Al), titanium (Ti), iron (Fe), and combinations thereof. More specifically, in certain variations, the purifying also optionally includes adding a second inorganic base (12) to increase pH of the liquid waste stream to generate one or more metal hydroxide precipitate compounds selected from the group consisting of: aluminum hydroxide (Al(OH)$_3$), titanium hydroxide (Ti(OH)$_4$), iron phosphate (FePO$_4$), iron hydroxide(s) (either Fe(OH)$_3$ and/or Fe(OH)$_2$), and combinations thereof. In certain variations, the second inorganic base may be added until a pH of the admixture is optionally greater than or equal to about 10.2, optionally greater than or equal to about 10.3, optionally greater than or equal to about 10.4, and in certain aspects, optionally greater than or equal to about 10.5. In certain further variations, the second inorganic base may be added until the pH of the admixture is greater than or equal to about 10.5 to less than or equal to about 11.5, optionally greater than or equal to about 10.5 to less than or equal to about 11, which may depend on the stoichiometry of the metals in the final product to be formed.

The addition of sulfuric acid upstream during leaching of the metals facilitates the presence of sulfate ions (SO$_4^{2-}$). An oxidant, like H$_2$O$_2$ added upstream in leaching reactor oxidizes ferrous Fe$^{2+}$ ions to ferric Fe$^{3+}$ ions to and thus iron will exist in the liquid waste stream as Fe$_2$(SO$_4$)$_3$ in the matrix. Thus, during the impurity removal process, iron and phosphorus can be precipitated as FePO$_4$. Likewise, the oxidant (e.g., H$_2$O$_2$) modifies the oxidative states of titanium (II) and aluminum (III) metals respectively, and therefore, titanium and aluminum hydroxides may be precipitated out (e.g., as Ti(OH)$_2$ or Ti(OH)$_4$ and Al(OH)$_3$).

The second inorganic base, like NaOH, that is used to adjust the pH, may also further facilitate precipitation of the excess copper (Cu) and iron (Fe) during this impurity removal process so that residual copper (Cu) and iron (Fe) are removed as impurities.

In certain variations, further processing for deep removal of the impurities may be advantageous. For additional removal of impurities, for example, those comprising a metal selected from the group consisting of: iron (Fe), copper (Cu), aluminum (Al), and combinations thereof from the solution, a solvent extraction process may be used. After adjusting pH of the solution, for example to be greater than or equal to about 2 to less than or equal to about 2.5, and liquid-solid separation/filtration for the removal of precipitated impurities, the solution may then be sent to a solvent extraction tank (while not shown, such a solvent extraction tank may be disposed in fluid communication with the impurity removal reactor/tank and the product precipitation reactor/tank. In certain aspects, the solvent extraction may be conducted in a tank or reactor with multiple stages.

The solution containing one or more of impurities comprising copper (Cu), iron (Fe), and optionally aluminum (Al) to be removed can be contacted (e.g., mixed) with an extractant and an organic phase. In such a process, the extractant can form a complex with the target impurity, here copper (Cu), iron (Fe), and/or aluminum (Al)), and transfer the complex from the liquid aqueous phase in the solution to the organic phase. In this manner, the extractant/organic phase forms a raffinate that may be further separated by gravity or centrifugation separation processes.

In certain variations, a suitable extractant for deep removal of impurities comprises bis-(2-ethylhexyl) phosphoric acid, also known as di-(2-ethylhexyl)phosphoric acid (DEHPA or HDEHP). A suitable organic phase for use in the solvent-extraction of the impurity metals may be a liquid hydrocarbon, such as kerosene. In certain variations, the kerosene may be a sulfonated kerosene. An aqueous-organic ratio (A/O ratio) may be set 2 to 1. In one variation, a pH may be greater than or equal to about 2 to less than or equal to about 2.5. A concentration of the extractant (e.g., bis-(2-ethylhexyl) phosphoric acid) may be greater than 0 to less than or equal to about 15 volume %, for example, in one variation, about 10 volume % and in another variation about 15 volume % of the total organic phase volume, while the hydrocarbon (e.g., kerosene) may be present at greater than 85 to less than about 100 volume %, for example, about 90 volume % or alternatively about 85 volume % of the total organic phase volume. A duration of the deep removal of impurities solvent-extraction process may be about 20 minutes, by way of example.

Thus, the extractant and organic phase/hydrocarbon may be mixed with the process stream solution in the solvent extraction tank/reactor, so that a cumulative level of all metal impurities (e.g., a total amount of copper (Cu), iron (Fe), and aluminum (Al)) of interest decreases to less than or equal to about 20 ppm. For example, the solution entering the tank may have impurity levels of 100 to 200 ppm, which may then be reduced to less than about 20 ppm in the purified product stream exiting the solvent extraction tank.

As shown in FIG. 1, one variation of the inventive technology involves removal of copper (Cu) as an impurity via precipitation involving a cementation reaction where sodium hydroxide (NaOH) is introduced from a source or container (8, 12) and iron (Fe) powder (9) is introduced from a different source or container into the reactor 122 to initiate the removal of impurities such as copper (Cu) via cementation. As will be appreciated by those of skill in the art, while not shown in FIG. 1, the source of sodium hydroxide (NaOH) (8, 12) and the source of iron (Fe) powder (9) may readily be substituted with a single source of sodium sulfide (Na$_2$S, for example, in water) that is introduced into the reactor 122 when the desired copper (Cu) precipitation reaction is alternatively sulfidation.

This may be considered a first phase of the impurity removal stage 104. This mixture may be agitated with the agitator 124 for a defined period of time (e.g., 15 minutes, 30 minutes, etc.). In some examples, 19.125 M NaOH and iron (Fe) powder may be added. As noted above, the pH of the leachate solution exiting the leaching reactor 110 and entering the reactor 122 may be acidic, for example, having a pH of greater than or equal to about 0.1 to less than or equal to about 1. In certain examples, pH may be adjusted in the reactor 122 to between greater than or equal to about 1 to less than or equal to about 2 with the use of an inorganic base, like sodium hydroxide (NaOH), to initiate the removal of copper via cementation. For instance, when sodium hydroxide (NaOH) and iron (Fe) powder are added to the leachate for cementation, copper (Cu) precipitate and ferric sulfate (Fe$_2$SO$_4$) may be generated. In the alternative variations, where when sodium sulfide (Na$_2$S) is added to the leachate for sulfidation, copper (Cu) precipitate in the form of CuS and sulfuric acid (H$_2$SO$_4$) may be generated. In some examples, fluorine in the mixture may be converted to hydrogen fluoride (HF). Some of the HF may stay in the solution contained in the reactor 122, while the remainder may be released as a gas (81) and vented to the scrubber 114.

For example, Cu cementation with zero-valent iron (Fe) may be applied for at least 15 minutes with agitation. During this time, temperature may be maintained at about 60° C. by circulating a heating/cooling medium (e.g., steam, etc.) through the jacket 126 surrounding the reactor 122. Ignoble metals can reduce the noble metal ions according to the electromotive force series. The larger the voltage gap between the two half-cell reactions, the higher the propensity of reaction occurring from a thermodynamic and electrochemistry standpoint. Thus, amongst all the metals available in the leachate, iron and copper may react favorably due to a higher cell potential (E_cell). In the case of the Cu cementation with Fe powder as in the example of FIG. 1, Fe is oxidized to $Fe^{2+}$ and $Cu^{2+}$ is reduced to Cu. The reaction is shown below:

$$Fe+Cu^{2+} \rightarrow Fe^{2+}+Cu$$

Next, an oxidant from a source or container (10) and a lime component (source of calcium oxide) from a source or container are (11) fed into the reactor 122 to initiate the removal of further impurities such as fluorides from the leachate. This may be considered a second phase of the impurity removal stage 104. For example, the oxidant (10) may be hydrogen peroxide ($H_2O_2$) as shown in FIG. 1 or another suitable oxidant, and the lime component may be calcium oxide (CaO) or calcium hydroxide ($Ca(OH)_2$) (11) as shown in FIG. 1 or another suitable lime. As discussed above, while not shown, the calcium oxide component may be fed as a liquid phase from an upstream tank where the calcium oxide component is mixed with water or other solvents. In some examples, the oxidant may be 30% hydrogen peroxide ($H_2O_2$). This mixture may be agitated in the reactor 122 with the agitator 124 for another defined period of time (e.g., 15 minutes, 30 minutes, etc.).

For example, lithium hexafluorophosphate ($LiPF_6$) is one of the most commonly used ionically conductive salts for organic carbonate-based electrolytes in lithium-ion batteries. The dissolution of $LiPF_6$ in black mass may trigger the formation of highly toxic HF when water reacts with phosphorus pentafluoride ($PF_5$). This formation of HF is shown below:

$$LiPF_6 \rightarrow LiF+PF_5$$

$$PF_5+H_2O \rightarrow POF_3+2HF$$

Conventional lithium battery recycling processes have not provided for fluoride removal. However, failure to remove fluoride/hydrofluoric acid (HF) may result in the capacity attenuation of batteries, such as batteries incorporating NMC, produced from recycled and recovered metals. For example, HF may decrease the $Li^+$ concentration available, forming LiF instead of precipitating $Li^+$ out as useful resource, as shown below.

$$Li^++HF \rightarrow LiF+H^+$$

To alleviate this problem, HF that is not removed from the system may be removed via the added calcium oxide (CaO). For example, the mixture of CaO and HF generates calcium fluoride ($CaF_2$) and water, as shown below.

$$CaO+2HF \rightarrow CaF_2+H_2O$$

During the second phase, the pH remains the same at greater than or equal to about 1 to less than or equal to about 2, where the mixture may be agitated with the agitator 124 for another defined period of time (e.g., 15 minutes, 30 minutes, etc.), and the temperature may be maintained at about 60° C. by thermal communication with a heat source. For example, a heating/cooling medium (e.g., steam, etc.) may be circulated through the jacket 126 surrounding the reactor 122.

In some embodiments, a particular order of removal of particular types of impurities as set forth above is desired. For example, it may be advantageous to remove copper from the leachate, before removing fluorides. If fluorides are removed (via the addition of CaO) before copper, then the unreacted CaO remaining in the solution may interfere with copper removal as zero valent iron that is meant to remove copper acts as an adsorbent, and not as a reducing agent for $Cu^{2+}$ to Cu. For example, reduction provides for a drop in charge/oxidative states while oxidation provides for an increase in charge.

After removal of copper and fluoride, the method contemplates adding a second inorganic base to increase pH of the liquid waste stream to generate one or more metal precipitate compounds. In certain aspects, the one or more metal precipitate compounds may be selected from the group consisting of: aluminum hydroxide ($Al(OH)_3$), titanium hydroxide ($Ti(OH)_4$), iron phosphate ($FePO_4$), iron hydroxide (($Fe(OH)_3$ and $Fe(OH)_2$) and combinations thereof. As shown in FIG. 1, sodium hydroxide (NaOH) is fed into the impurity removal reactor 122 to initiate the removal of further impurities such as remaining iron (Fe), phosphate (P), titanium (Ti), and aluminum (Al) from the intermediate liquid/vessel contents. This may be considered a third phase of the impurity removal stage 104. When the NaOH is added, the entire solution's pH may be adjusted from greater than or equal to about 4 to less than or equal to about 5, and the solution may be agitated with the agitator 124 for another defined period of time (e.g., about 60 minutes, etc.), and the temperature may be maintained at about 60° C. as explained above. This pH transition may assist in the removal of remaining iron, phosphate, titanium, and aluminum. In some embodiments, 19.125M NaOH is added in small doses (e.g., stepwise in increments of 0.5) to gradually increase pH to 5.5. The NaOH added in the third phase may be fed from the NaOH source or container used in the first phase of the stage 104 or a different source or container.

For example, for iron and phosphate removal, the addition of sulfuric acid ($H_2SO_4$) to leach the metals encourages the presence of $SO_4^{2-}$. Hydrogen peroxide ($H_2O_2$) previously added upstream in the leaching reactor 110 oxidizes ferrous iron ($Fe^{2+}$) to ferric iron ($Fe^{3+}$) ions and thus iron will exist as $Fe_2(SO_4)_3$ in the matrix. In such examples, iron and phosphorus will be precipitated as iron phosphate ($FePO_4$).

Additionally, iron that was dosed earlier (as Fe powder) for copper removal will facilitate the removal of phosphate $PO_4^{3-}$ as well. Earlier, if cementitious precipitation of copper was conducted, copper (II) cations were reduced to copper metal ($Fe+Cu^{2+} \rightarrow Fe^{2+}+Cu$) and iron will oxidize to form ferrous $Fe^{2+}$ ions. Hydrogen peroxide ($H_2O_2$) used in the leaching reactor 110 oxidizes ferrous $Fe^{2+}$ to ferric $Fe^{3+}$ ions and will remove the $PO_4^{3-}$ as $FePO_4$. In some embodiments, NaOH may be used to adjust the pH and facilitate precipitation of the excess Fe to remove the impurities.

For titanium and aluminum removal, $H_2O_2$ acting as an oxidant may push the oxidative states of the metals to titanium (II) and aluminum (III) valences respectively, and the hydroxides may be precipitated out ($Ti(OH)_4$ and $Al(OH)_3$).

After processing, the impurity removal reactor 122, the liquid waste stream (13) exits reactor 122 and enters through a filter 130 to generate a purified filtrate liquid stream (15) and a second retentate (14) comprising the one or more metal precipitate compounds and calcium fluoride ($CaF_2$) that can be further processed in the system as will be described below. Thus, the vessel contents in the reactor 122 are pumped via a pump 128 (e.g., a centrifugal pump, etc.) through filter 130 (e.g., a pressure filter, a hydraulic filter, a gravity filter, etc.), and a second filtrate stream enters the reactor 132 used in the metal recovery stage 106 (sometimes referred to as a co-precipitation stage 106). The pump 128 and the filter 130 are identified as P-002 and F-002, respectively, in FIG. 1. In some embodiments, nearly all impurities (e.g., metallic hydroxides) that precipitated in the reactor 122 are captured in the filter 130.

After filtration, the impurity removal reactor 122 may be washed with an internal spray ball to remove acid residue in the vessel and to send all reaction products to the reactor (e.g., a receiving reactor) 132. Additionally, any chemical residue in the filter cake may be rinsed to reduce operator exposure during cake collection. Further, a separate water stream may be lined up with the pump 128 and a dilute caustic may be added upstream of the filter 130 to remove residual filtrate, which may be sent to wastewater treatment. At the end this batch cycle (e.g., stage 104), the retentate/hydroxides cake may be collected for disposal.

After leaching of metals and removal of impurities in the reactors 110, 122, the method may include processing the purified liquid stream to separate and recover nickel (Ni), manganese (Mn), and cobalt (Co) by passing the purified filtrate stream into a metal recovery unit. The metal recovery unity may include a second reactor for conducting a co-precipitation process by increasing pH or one or more chromatographic columns. In certain alternative variations, metal recovery may include both processing a one or more second reactors and also in one or more chromatographic columns. In this manner, an intermediate liquid stream comprising lithium (Li) and one or more recovered products comprising one or more of nickel (Ni), manganese (Mn), and cobalt (Co) are generated. The one or more recovered products may be an electroactive material precursor, more specifically a positive electrode/cathode active material precursor, having a stoichiometry of $Ni_xMn_yCo_{1-x-y}(OH)_2$, where x is <1 and y is <1. To convert this precursor material to an electroactive material (in oxide form), it can be mixed with other reagents, like lithium carbonate for lithiation. After mixing, a thermal treatment like calcination having a temperature of greater than or equal to about 700° C. can be performed on the electroactive material precursor to form the electroactive material. In certain variations, the one or more recovered products has a stoichiometry of about

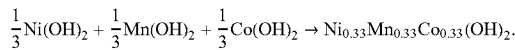

also referred to as NMC111, but may have other stoichiometries, for example, NMC622 (where x is 0.6 and y is 0.2), NMC811 (where x is 0.8 and y is 0.1), and NMC532 (where x is 0.5 and y is 0.3).

In certain aspects, after leaching of metals and removal of impurities have been conducted as described above, the one or more recovered products comprising one or more of nickel (Ni), manganese (Mn), and cobalt (Co) are extracted from the intermediate liquid stream. In certain variations, a reaction between stoichiometric quantities of transition-metal salts, such as nickel sulfate hydrate ($NiSO_4 \cdot 6H_2O$), manganese sulfate hydrate ($MnSO_4 \cdot H_2O$), and cobalt sulfate hydrate occurs. In one optional variation, a complexing agent (chelating agent) and a base may be used in the process. For example, ammonia ($NH_3$) may be used as a complexing or chelating agent and may be added first to provide a sufficient concentration gradient to promote the formation of $[M(NH_3)]^{2+}$ complexes (where M is a transition metal like nickel (Ni), manganese (Mn), or cobalt (Co)) prior to particle precipitation. Sodium hydroxide or potassium hydroxide may be selected as the base to maintain a high pH and supply hydroxide ions for metal product precipitation. In such a variation, the reactions that occur are shown below, where "n" represents a number of coordinating ammonia molecules and M represents nickel (Ni), manganese (Mn), or cobalt (Co), which is less than or equal to 6. Reaction (1) shows the metal complexation/chelating into complexes. Reaction (2) shows the addition of a base, like NaOH, that forms metal hydroxides.

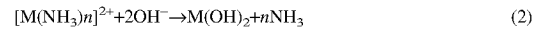

In this manner, as will be described further, below, additional processing of the liquid stream can separate and recover nickel (Ni), manganese (Mn), and cobalt (Co) hydroxides.

In another variation shown in FIG. 1, an NMC electroactive material precursor may be extracted from the system at the reactor 132 in the co-precipitation stage 106. The reactor 132 is identified as V-003 in FIG. 1. Stated in another way, the purified liquid stream (15) is processed in reactor 132 to separate and recover nickel (Ni), manganese (Mn), and cobalt (Co). The purified liquid stream (15) may be received directly from the filter 130 after exiting impurity removal reactor 122 and may be either pretreated as described above with a complexing or chelating agent, like ammonia, or may simply be processed as described herein in reactor 132 to facilitate co-precipitation.

In terms of electroactive material precursors of interest, $Ni_xMn_yCo_{1-x-y}O_2$ (NMC) layered oxides may now primarily exist as sulfates in the reactor 132 where the liquid stream has not been treated with ammonia. Below is an example of formation of NMC sulfates in the reactor 132 via the use of sulfuric acid (leaching) and hydrogen peroxide as a reductant in stages 102, 104.

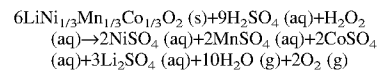

Thus, the purified filtrate stream comprises nickel sulfate ($NiSO_4$), manganese sulfate ($MnSO_4$), and cobalt sulfate ($CoSO_4$) and the method according to certain aspects of the present disclosure may include separating nickel (Ni), manganese (Mn), and cobalt (Co) from the purified filtrate stream by passing the purified filtrate stream into the second reactor for conducting the co-precipitation process.

The co-precipitation process may comprise increasing the pH of the purified filtrate stream to greater than or equal to about 11 in an inert environment (e.g., nitrogen blanket) to form nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$) that concurrently precipitate from the purified filtrate stream to generate the one or more recovered products.

Thus, in the co-precipitation stage 106, sodium hydroxide (NaOH) (19) may be fed into the reactor 132 to increase the pH level, as shown in FIG. 1. For example, 19.125M NaOH may be added to increase the pH to approximately 10.5, 11, etc. During this time, the solution in the reactor 132 may be agitated with the agitator 134 for a defined period of time (e.g., about 30 minutes, etc.), and the temperature may be maintained at about 80° C. (176° F.) by circulating a heating/cooling medium through the jacket 136 surrounding the reactor 132. After the agitation period is complete, $NiMnCo(OH)_6$ precipitate, sodium sulfate, and lithium sulfate are generated as further explained below.

For example, after NaOH (19) is added to the reactor 132, the metal sulfates $NiSO_4$, $MnSO_4$, and $CoSO_4$ are converted into their hydroxides, forming nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$), respectively. Alternatively, in a process where the purified liquid stream is pretreated with a complexing or chelating agent (e.g., ammonia), the adding NaOH to the reactor 132 to the pH levels at the conditions described above serves to form the same metal hydroxide hydrates, namely nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$).

As noted above, to maintain the oxidative integrity of the hydroxides, an inert environment may be provided via, for example, the use of a nitrogen blanket.

$$NiSO_4\ (aq) + 2NaOH + 6H_2O \rightarrow Ni(OH)_2 \cdot 6H_2O + Na_2SO_4$$

$$MnSO_4\ (aq) + 2NaOH + H_2O \rightarrow Mn(OH)_2 \cdot H_2O + Na_2SO_4$$

$$CoSO_4\ (aq) + 2NaOH + 7H_2O \rightarrow Co(OH)_2 \cdot 7H_2O + Na_2SO_4$$

In some embodiments, a nitrogen purge system may be used with the reactor 132 to generate the nitrogen blanket. For example, nitrogen (e.g., a nitrogen source providing $N_2$ gas) may be connected to a push-pull (e.g., a pad-depad) valve to keep the reactor 132 oxygen free during pump-in and pump-out steps. Additionally, the reactor 132 may be designed for 45 PSIG and equipped with a valve (e.g., a pressure relief valve) set at 45 PSIG for potential future high-pressure operation.

In some embodiments, with all the liquid from the impurity removal stage 104 collected in the reactor 132, concentration of the one or more recovered components, such as NMC components is analyzed and adjusted accordingly. For example, because each of the hydroxide's precipitates share similar crystals and micro spherical structures, they may behave similarly in mechanism and can appear as mixed salts instead of three separate phases, irrespective of their Ni/Mn/Co ratios.

The method may further comprise determining a first ratio of Ni:Mn:Co in the purified filtrate stream prior to the co-precipitation process. The method may include comparing the first ratio to a target stoichiometric ratio of Ni:Mn:Co for the one or more recovered products. The method may then include adding one or more of nickel sulfate ($NiSO_4$) (16), manganese sulfate ($MnSO_4$) (17), and cobalt sulfate ($CoSO_4$) (18) to the purified filtrate stream to adjust an amount of nickel sulfate ($NiSO_4$), manganese sulfate ($MnSO_4$), and cobalt sulfate ($CoSO_4$) prior to adjusting the pH. In this manner, the one or more recovered products has a second ratio corresponding to the target stoichiometric ratio.

Thus, where the Ni:Mn:Co values may not suffice for an intended recycled electroactive material precursor, or should the desired product be of different NMC permutation/stoichiometry, the sulfates may be added as necessary to the reactor 132, as show in FIG. 1. This may achieve, for example, molar equivalence between nickel, manganese, and cobalt in the reactor 132. Below is one such example formulation of adding NMC sulfates. In certain aspects, the system may include an analyser unit that can sample the purified liquid stream and determine a content of nickel (Ni), manganese (Mn), and cobalt (Co) upstream of the reactor. The co-precipitation unit may also comprise a controller and one or more metering pumps to regulate flow of a nickel sulfate ($NiSO_4$), manganese sulfate ($MnSO_4$), and cobalt sulfate ($CoSO_4$) into the plurality of inlets of the third heated reactor. The controller receives input from the analyzer and controls the one or more metering pumps to adjust the amount of respective sulfates fed to the stream or into the reactor.

Figure 2:
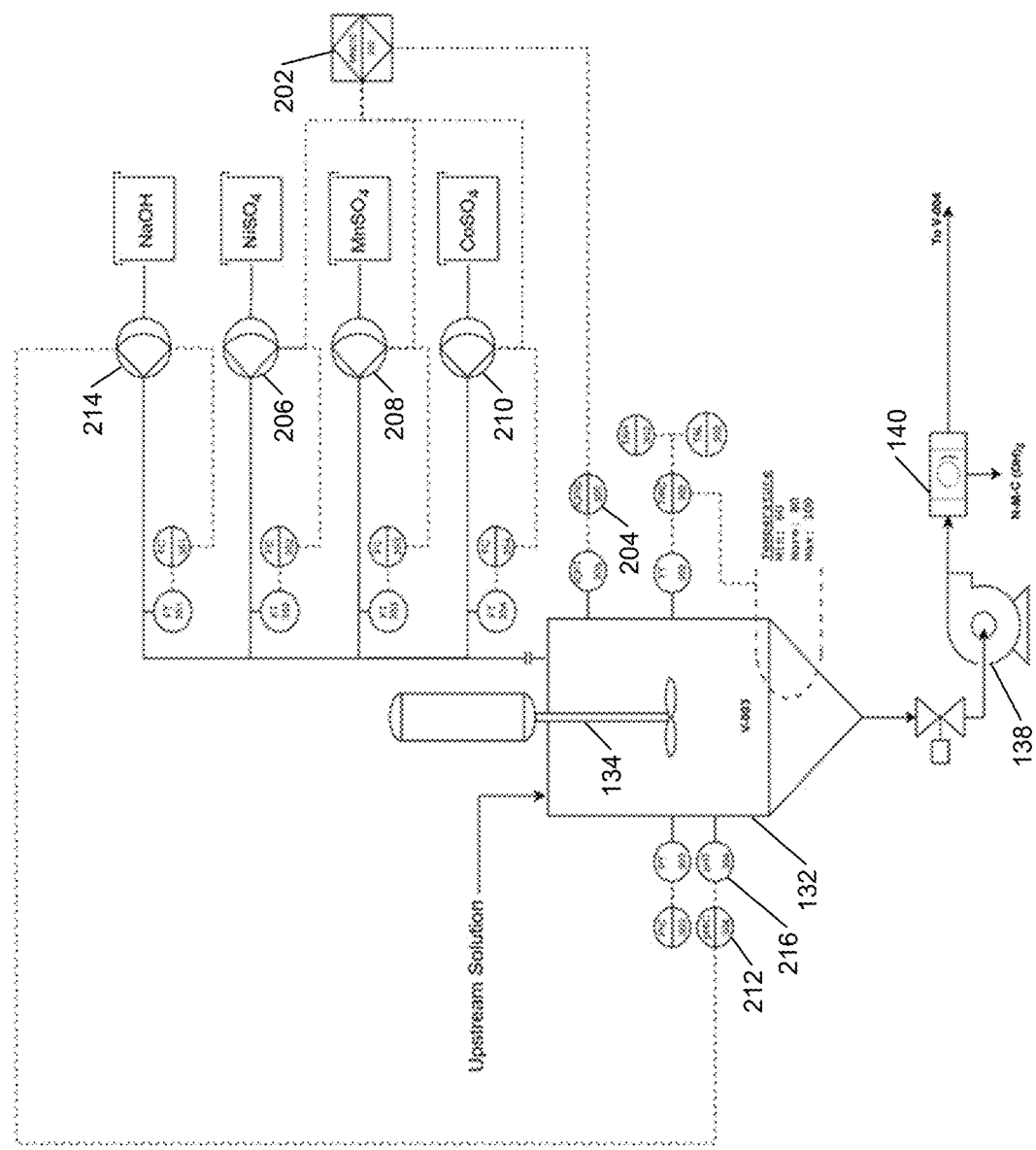
FIG. 2 is a process flow diagram for a co-precipitation stage of FIG. 1, including an automated control system according to another example embodiment.

In various embodiments, NMC sulfates may be dosed accordingly via the use of automated process implementing a controller such as a programmable logic controller (PLC). For example, FIG. 2 illustrates one example implementation of a piping and instrumentation design for the precipitation stage 106, in which nickel, manganese, and cobalt sulfates are added to the reactor 132 using a PLC 202. In FIG. 2, a real time control system governing the balance of Ni—Mn—Co molar ratios for the customization of N-M-C $(OH)_2$ products may be implemented by using an inductively coupled plasma (ICP) analyser 204 with algorithm implemented in the PLC.

In the example of FIG. 2, concentrations of nickel, manganese and cobalt in the solution entering the reactor 132 may be measured using the ICP analyser 204. The measurements may then be relayed to the PLC 202 for further computation. For example, the algorithm stored in the PLC 202 may determine the volume of nickel sulfate ($NiSO_4$), manganese sulfate ($MnSO_4$), and cobalt sulfate ($CoSO_4$) needed to dose for the coprecipitation of the final $NiMnCo(OH)_6$ product based on metal concentration data (e.g., represented in one or more feedback signals) from the ICP analyser 204. In some examples, the algorithm can take in any form of desired $NiMnCo(OH)_6$ output and compute the desired dosage volume by balancing the molar ratio to the setpoint. Once the desired dosage volume is determined, the PLC 202 may provide control signals to metering pumps 206, 208, 210 for precise dosages of $NiSO_4$, $MnSO_4$, $CoSO_4$. After the desired levels NMC sulfates are achieved, the pH of the solution may be increased by adding NaOH as explained above. In the example of FIG. 2, a controller 212 (e.g., implementing proportional-integral-derivative (PID) control) may control a metering pump 214 to add the desired amount of NaOH based on a pH sensor 216 mounted at the reactor 132.

Thus, instead of precipitating, for example, $NiMnCo(OH)_6$ hydroxide (aka NMC111) manually, the entire stage 106 process may be automated. This provides convenience for the entire end user and management by dosing the appropriate nickel sulfate ($NiSO_4$), manganese sulfate ($MnSO_4$), and cobalt sulfate ($CoSO_4$) to supplement the necessary concentrations of Ni, Mn, and Co in the solution to produce the appropriate NMC hydroxide permutation (and/or for other permutations, such as NMC622, NMC811, NMC532, by way of non-limiting example).

With continued reference to FIG. 1 and/or FIG. 2, after adding the appropriate amount of NaOH (19) and the appropriate amounts of NMC sulfates (if necessary from 16, 17, 18), the reactor 132 contains all of the N-M-C product as precipitate, as well as sodium sulfate and lithium sulfate that are dissolved under process conditions, as explained above. In some embodiments, residual HF in the solution contained in the reactor 132 may be released as a gas (82) and vented to the scrubber 114. The contents in the reactor 132 are then pumped via a pump 138 (e.g., a centrifugal pump, etc.) through a filter 140 (e.g., a pressure filter, a hydraulic filter, a gravity filter, etc.), and a third filtrate (e.g., including sodium sulfate and lithium sulfate) (20) is collected in the reactor (e.g., a receiving reactor) 142 used in the precipitation stage 108. The retentate (21) from the filter 140 includes the one or more recovered products comprising nickel (Ni), manganese (Mn), and cobalt (Co). The pump 138 and the filter 140 are identified as P-003 and F-003, respectively, in FIG. 1. In some embodiments, nearly all of the one or more recovered products (e.g., NMC product) that precipitated in the reactor 132 are captured as retentate in the filter 140.

After filtration, the reactor 132 may be washed with an internal spray ball to remove any process fluid residue in the reactor 132 and to send all reaction products to the reactor 142. At the end this batch cycle (stage 106), the product NMC cake may be collected for further drying and packaging.

In some embodiments, at least some water in the contents passing through the filter 140 (e.g., the third filtrate) (22) may be removed before collecting in the reactor 142. This may be accomplished through heating and distillation/evaporation processes. In various embodiments, the process to remove water from the third filtrate may be considered as part of the co-precipitation stage 106 and/or the precipitation stage 108. In other embodiments, the process to remove water from the third filtrate may be considered a separate stage such as a water removal stage.

For example, in FIG. 1, the third filtrate (22) including sodium sulfate and lithium sulfate is passed through an evaporator 144. The evaporator separates the intermediate third filtrate stream into a concentrate stream (26) and a distillate stream (25). In such examples, about 50% of the water in the filtrate may be evaporated and form the distillate stream and the resulting concentrate steam may be collected in a storage tank. In some cases, the collected distillate stream (25) may be used in upstream processes if desired. The remaining contents (e.g., a concentrate stream) (26) may then be pumped via a pump 146 to the reactor 142. The pump 146 is identified as P-301 in FIG. 1. In some embodiments, the concentrate stream may be collected in another storage tank before being pumped to the reactor 142. In certain aspects, the lithium concentration is increased for the next process step, for example only, after being processed in the evaporator a concentration of lithium (Li) may be greater than about 12 g/L in the stream.

The methods of the present disclosure also contemplate introducing the intermediate liquid stream, for example, the concentrate stream (26) into a lithium precipitation reactor to precipitate at least one compound comprising lithium (Li). For example, the concentrate stream may be introduced into a lithium precipitation reactor. Next, sodium carbonate ($Na_2CO_3$) (28) may be added along with inorganic base (e.g., NaOH) (27) to the lithium precipitation reactor. The liquid stream has a temperature of greater than or equal to about 80° C. to less than or equal to about 90° C. for greater than or equal to about 90 minutes while in the lithium precipitation reactor to generate lithium carbonate ($Li_2CO_3$) precipitate.

In the precipitation stage 108, sodium carbonate ($Na_2CO_3$) (28) is optionally fed into a lithium precipitation reactor 142 to convert lithium sulfate ($Li_2SO_4$) into lithium carbonate ($Li_2CO_3$). The reactor 142 is identified as V-004 in FIG. 1. During this time (or before), the temperature of the contents (e.g., the concentrate stream, the third filtrate, etc.) in the reactor 142 may be adjusted to a desired temperature (e.g., about 80° C.-90° C.) by circulating a heating/cooling medium through the jacket 150 that serves as a heat exchanger. In one variation, the sodium carbonate ($Na_2CO_3$) solution may be added to the liquid stream comprising lithium in the lithium precipitation reactor at a feed rate of 20 L/minute.

Next, sodium hydroxide (NaOH) (27) is optionally fed into the reactor 142 to increase the pH level, as shown in FIG. 1. For example, 19.125M of NaOH may be added to increase the pH to approximately 13. During this time, the solution in the reactor 142 may be agitated with the agitator 134 for a defined period of time (e.g., about 30 minutes, 1 hour, 1.5 hours, etc.), and the temperature may be maintained at the desired temperature with the jacket 150. After the agitation period is complete, the lithium sulfate will precipitate as lithium carbonate $Li_2CO_3$, shown in the example reactions (either (3) and/or (4) and (5)) below:

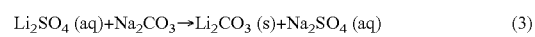
$$Li_2SO_4\ (aq)+Na_2CO_3 \rightarrow Li_2CO_3\ (s)+Na_2SO_4\ (aq) \qquad (3)$$

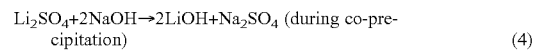
$$Li_2SO_4+2NaOH \rightarrow 2LiOH+Na_2SO_4\ \text{(during co-precipitation)} \qquad (4)$$

$$2LiOH+Na_2CO_3 \rightarrow Li_2CO_3+2NaOH \qquad (5)$$

The vessel contents (29) in the reactor 142 are then pumped via a pump 152 (e.g., a centrifugal pump, etc.) through a filter 154 (e.g., a pressure filter, a hydraulic filter, a gravity filter, etc.). The pump 152 and the filter 154 are identified as P-004 and F-004, respectively, in FIG. 1. In some embodiments, nearly all the lithium carbonate product (30) may be captured in the filter 154. After filtration, the reactor 142 may be washed with an internal spray ball to remove any process fluid residue in the reactor 142. At the end this batch cycle (e.g., stage 108), the product $Li_2CO_3$ cake (30) may be collected for further drying and packaging. In various embodiments, the effluent (e.g., a fourth filtrate) (31) passing through the filter 154 may be sent to wastewater treatment and/or recycled back to the reactor 110 to facilitate dilution of acid and magnify lithium concentration in a subsequent performed process conducted in system 100.

In various embodiments, the contents from the reactor 132 of FIG. 1 may be provided to another suitable module instead of the evaporator 144 before collecting in the reactor 142. For example, in some cases, where volumetric applications of 10 m³ and above are processed, the evaporator may provide limited capacities. As such, in some embodiments, the contents may pass through a thermal shock module coupled with electrode ionization to facilitate thermal shocking by lowering temperatures. In certain variations, a temperature after the thermal shock process may be less than or equal to about 30° C., optionally less than or equal to about 25° C., and in certain aspects, greater than or equal to about 0° C. to less than or equal to about 30° C., optionally greater than or equal to about 0° C. to less than or equal to about 25° C. In such examples, a thermal shocking process may be less costly, less energy intensive and less time consuming as compared to an evaporation process.

In one variation, the thermal shock module is advantageous where the intermediate liquid stream comprises lithium sulfate ($Li_2SO_4$) and sodium sulfate ($Na_2SO_4$). Prior to introducing the stream into the lithium precipitation reactor, the intermediate liquid stream is subjected to a thermal shock process followed by ionization in an electrode ionization unit to facilitate precipitation of sodium sulfate ($Na_2SO_4$) from the intermediate liquid stream. Sodium sulfate has lower solubility than lithium sulfate, thus desirably removing the sodium sulfate from solution. This may be followed by adding sodium carbonate ($Na_2CO_3$) into the lithium precipitation reactor to generate lithium carbonate ($Li_2CO_3$) precipitate.

Figure 3:
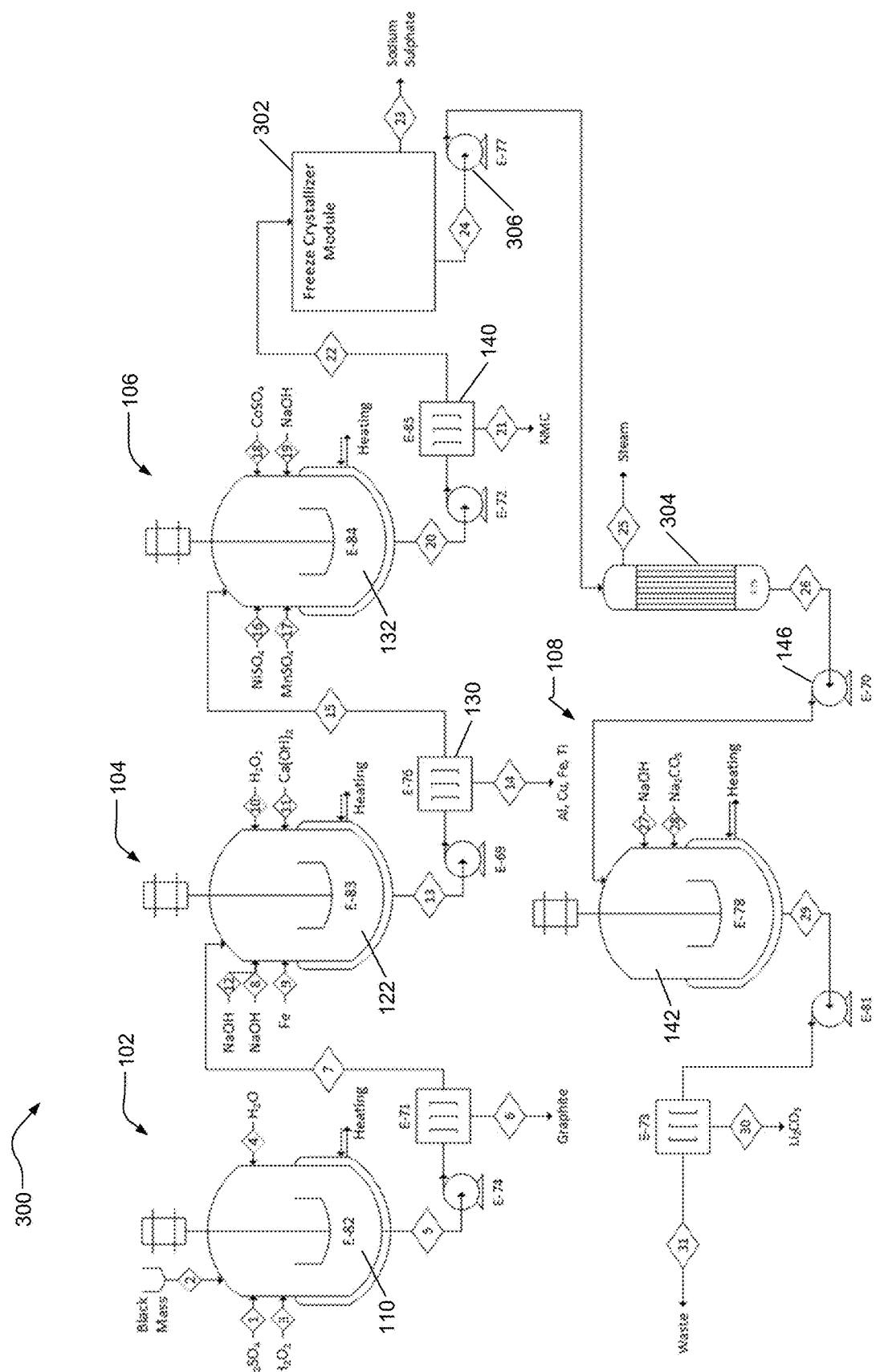
FIG. 3 is a process flow diagram including a thermal shocking process according to another example embodiment.

For example, FIG. 3 illustrates a process that occurs in system 300 substantially similar to the process conducted in system 100 of FIG. 1, but where the contents passing through the filter 140 (e.g., the third filtrate) (22) are passed through a thermal shock module 302 and an electrode ionization module 304. The process conducted in system 300 includes the stages 102, 104, 106, 108 of FIG. 1 where contents are collected and processed in the reactors 110, 122, 132, 142 (also identified as E-82, E-83, E-84, E-78, respectively, in FIG. 3) and pumped via pumps 118, 128, 138, 146, 152 (E-74, E-69, E,72, E-77, E-70, and E-81, respectively, in FIG. 3). In various embodiments, processes completed with the modules 302 and/or 304 may be considered as part of the co-precipitation stage 106 and/or the precipitation stage 108. In other embodiments, such processes may be considered a separate stage.

In the example of FIG. 3, the contents (22) from the filter 140 are passed to the thermal shock module (e.g., a freeze crystallizer module) 302 to precipitate sodium sulfate (23) from the lithium sulfate/sodium sulfate stream. In the module 302, lithium sulfate may be extracted from the solution containing sodium cations and sulfate anions. For example, monovalent cationic precipitation may be difficult in heating and distillation/evaporation processes due to their high solubility product and solubility in waters. However, in the module 302, the lithium sulfate/sodium sulfate solution undergoes a thermal shock to lower the temperature of both precipitates. Since sodium sulfate has a lower solubility product than lithium sulfate, more sodium sulfate may be removed as precipitate after the thermal shock.

Next, the remaining solution (24) is pumped via a pump 306 to the electrode ionization module 304 (also identified as E-79 in FIG. 3) via to remove water (25) from the solution and generate a precipitate/sludge including lithium sulfate (26). The precipitate and its sludge (26) may be collected as a main product while permeate water (25) may be collected and recycled back to the reactor 110 to facilitate dilution of acid. This may magnify the lithium concentration in the remaining sludge. The main product (e.g., the precipitate and its sludge) including lithium sulfate (26) is then pumped via the pump 146 to the reactor 142 where sodium carbonate (27) is added to precipitate the lithium sulfate as lithium carbonate as explained above.

The method also contemplates separating by a chromatographic separation process rather than or in addition to a co-precipitation process. The method may include passing the purified filtrate stream in a first direction in a chromatographic column or packed-bed column/reactor comprising a chelating resin to conduct a chromatographic separation process. In certain variations, the pH in the column may be less than or equal to about 4.5. After passing through the chromatographic column or packed-bed column/reactor, a raffinate stream comprising at least one manganese (Mn)-containing species and at least one lithium (Li)-containing species exits the chromatographic column, while at least one nickel (Ni)-containing species, more specifically, nickel (Ni) ions, and at least one cobalt (Co)-containing species, more specifically, cobalt (Co) ions, are retained on the chelating resin in the chromatographic column or packed-bed column/reactor. The method may include regenerating the chromatographic column or packed-bed column/reactor by passing a regeneration liquid through the chromatographic column. The regeneration liquid can be passed in a counter-current or a concurrent-current direction in the chromatographic column or packed-bed column/reactor. For example, in certain aspects, the generating may be counter-current regeneration, where the regeneration liquid is passed in the chromatographic column or packed-bed column/reactor to form an extract stream comprising the at least one nickel (Ni)-containing species (e.g., nickel (Ni) ions) and the at least one cobalt (Co)-containing species (e.g., cobalt (Co) ions). The regeneration liquid may have a pH of less than or equal to about 1.5. The collected extract stream may then be subjected to a precipitation reaction to precipitate nickel hydroxide ($Ni(OH)_2$) and cobalt hydroxide ($Co(OH)_2$) from the extract.

The method may further comprise adjusting the pH of the purified filtrate stream to be greater than or equal to about 4 to less than or equal to about 5 as it enters the chromatographic column or packed-bed column/reactor. Thus, the method further comprises precipitating manganese hydroxide ($Mn(OH)_2$) from the raffinate stream, which may be achieved by adjusting pH to be greater than or equal to about 8 to less than or equal to about 10 by adding a strong alkaline base, like sodium hydroxide (NaOH), potassium hydroxide (KOH), lithium hydroxide (LiOH) and the like to forming an intermediate liquid stream. The manganese hydroxide ($Mn(OH)_2$) may then be removed or separated from the stream before entering the lithium precipitation reactor.

In one variation, the method comprises forming a precursor of $LiNiCoAlO_2$ electroactive material by combining the nickel hydroxide ($Ni(OH)_2$) and cobalt hydroxide ($Co(OH)_2$) with the aluminum hydroxide ($Al(OH)_3$) and at least one compound comprising lithium (Li).

In various embodiments, the contents from the reactor 122 of FIG. 1 may undergo another alternative separation process such as passing through a chromatographic column or packed-bed column/reactor having a chelating resin before collecting in the reactor 132 and/or the reactor 142. In some cases, a chelating resin may be capable of selectively capturing metal ions such as Ni and Co from solutions with acidic pH (e.g., the solution from the reactor 122). For example, low pH leachate passing through the filter 130 (e.g., the second filtrate) may be passed through one or more selective columns (e.g., fixed-bed column(s)) and then the contents from the column(s) may be collected in the reactor 132 and/or the reactor 142. Both raffinate and resin regeneration stream will pass through V-003 to drop the precious metal that they contain. In such examples, the chelating resin process may replace the co-precipitation stage 106 of FIGS. 1 and 3, or may be a part of the co-precipitation stage 106.

The column(s) include a stationary phase of a chelating resin, which may be any resin with selectivity for nickel ions (Ni), and/or cobalt (Co) ions known in the art. In one variation, the stationary phase is a matrix of macroporous styrene divinylbenzene and functional groups iminodiacetic acid. The purified liquid may flow through the resin from a top of the column(s) to a bottom of the column(s). In some embodiments, the resin may have a bed height of greater than or equal to about 0.6 m to less than or equal to about 1 m. In various embodiments, the solution flowrate through the column(s) may be monitored and maintained within a desired range, and Ni and Co removal efficiency may be monitored by measuring concentrations before and after the resin column(s).

In some embodiments, resin in the column(s) may need to be regenerated when it is exhausted, or its exchange capacity is full. In such examples, a suitable acid (e.g., sulfuric acid, hydrochloric acid, etc.) or ammonium solution may be used for regeneration of the resin. Regeneration can be from top to bottom (co-current) or from bottom to top (counter-current). The resin elutes Ni and Co during regeneration with elution solution, and the regenerated resin is used for further cycles of Ni and Co removal.

For example, FIG. 4 illustrates a first chromatographic separation process using a chelating resin as a stationary phase in system 400 that may be implemented with the systems 100, 300 (or portions thereof), where leachate from an impurity removal stage (e.g., the second filtrate from the impurity removal stage 104 of FIGS. 1 and 3) is passed through a selective column (e.g., a fixed-bed column) 402 including resin as explained above. The process 400 may be included in stage 106 of FIGS. 1 and 3, or a separate stage that replaces stage 106 of FIGS. 1 and 3.

In the example of FIG. 4, leachate is passed through the column 402 after a pH of the leachate is adjusted to a desired level (e.g., 4.5). The resin in the column 402 co-separates and adsorbs Ni and Co ions (extract) in the leachate, while other ions such as Mn and Li (raffinate) in the remaining leachate pass through.

Figure 6:
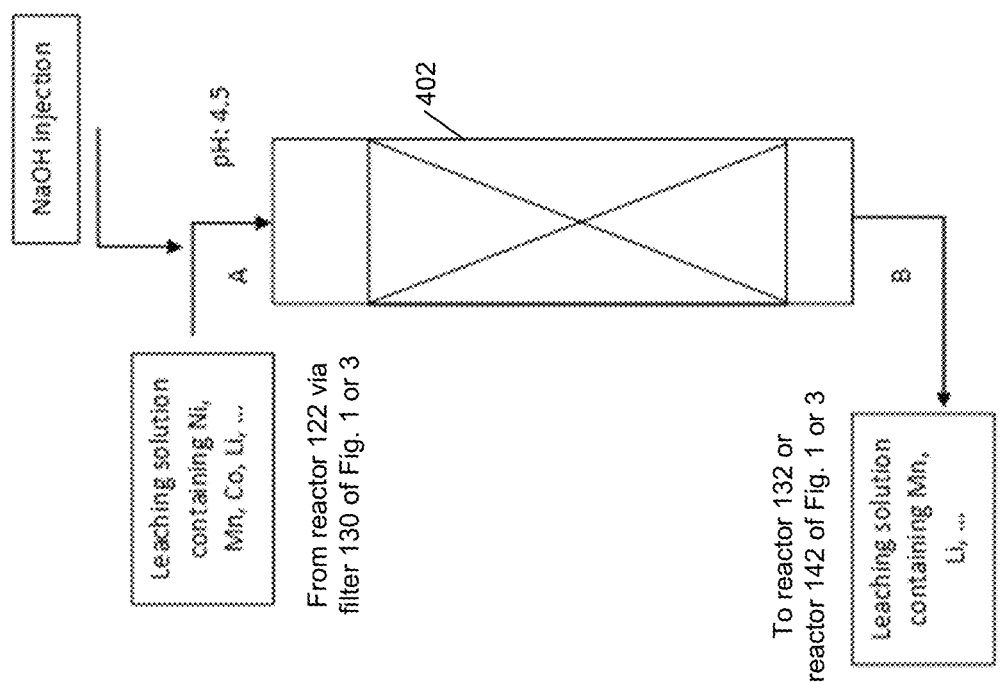
Figure 10:
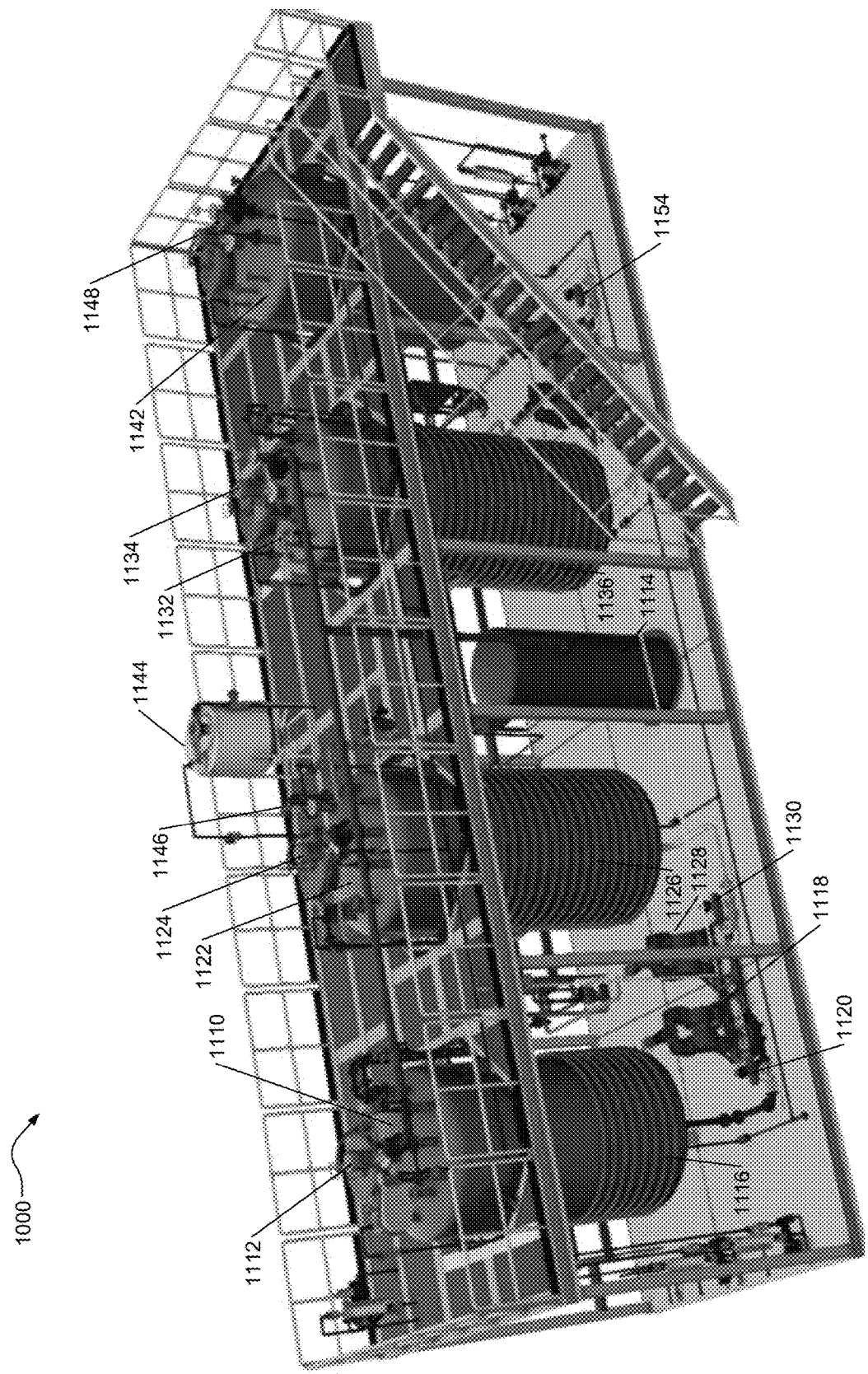
FIGS. 10-14 are various views of a system used to implement the process of FIG. 1, according to another example embodiment.
Figure 11:
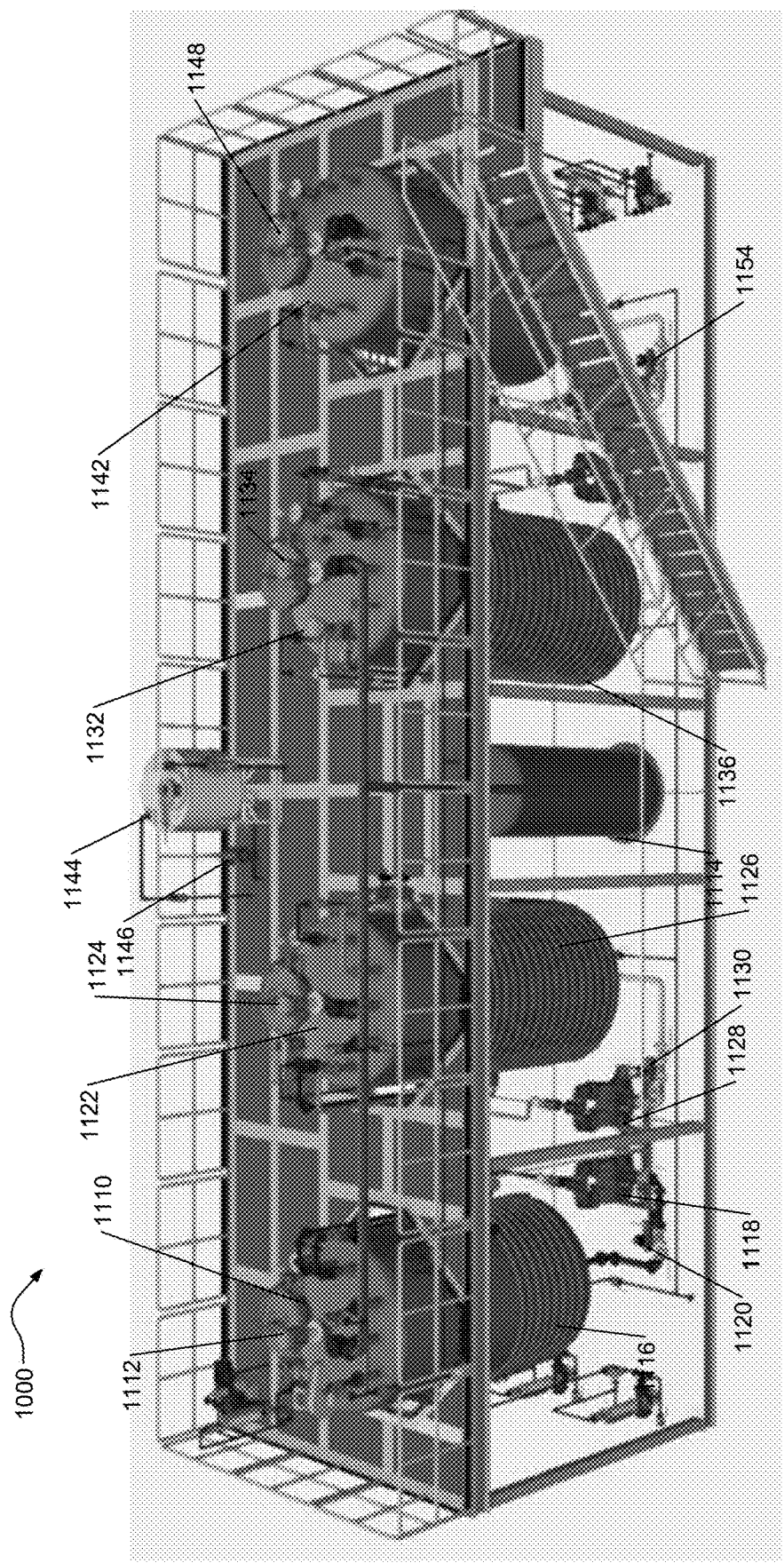
Figure 12:
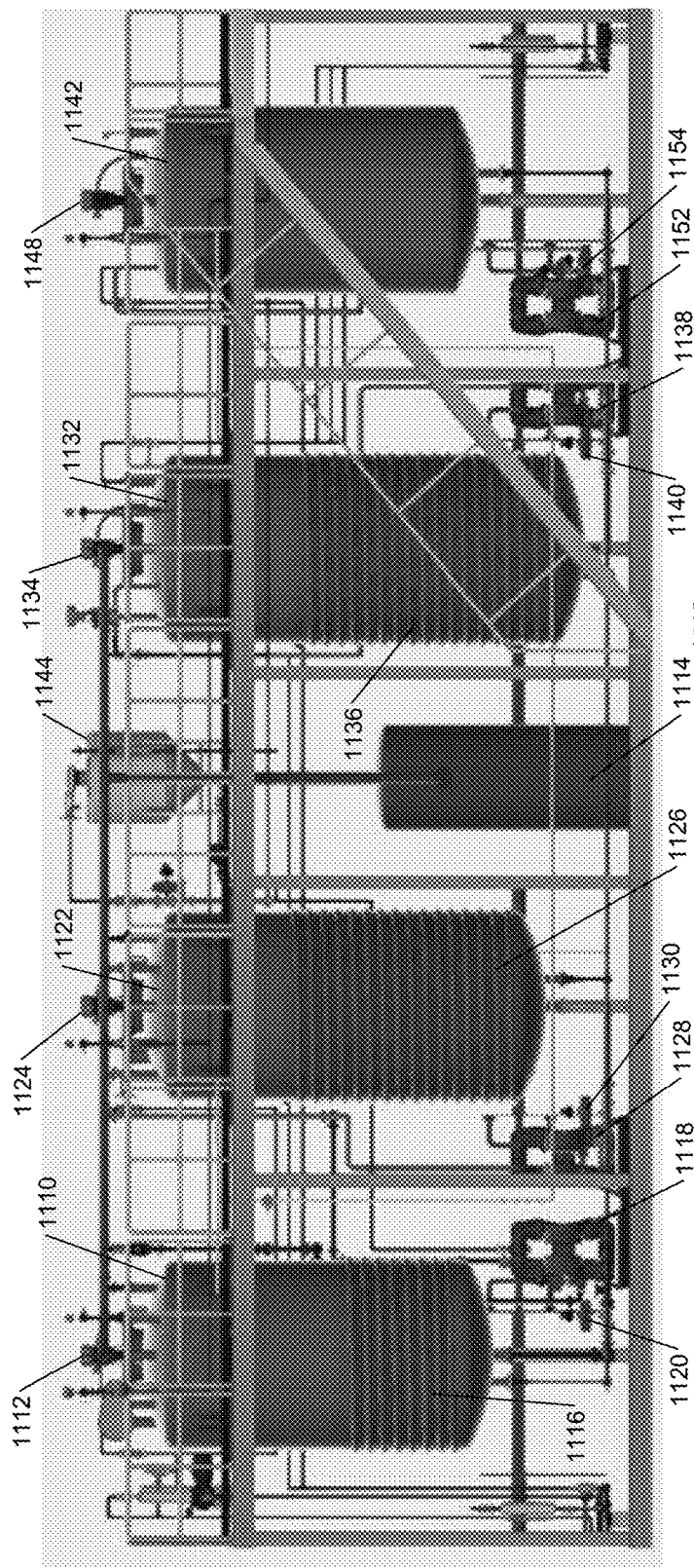
Figure 13:
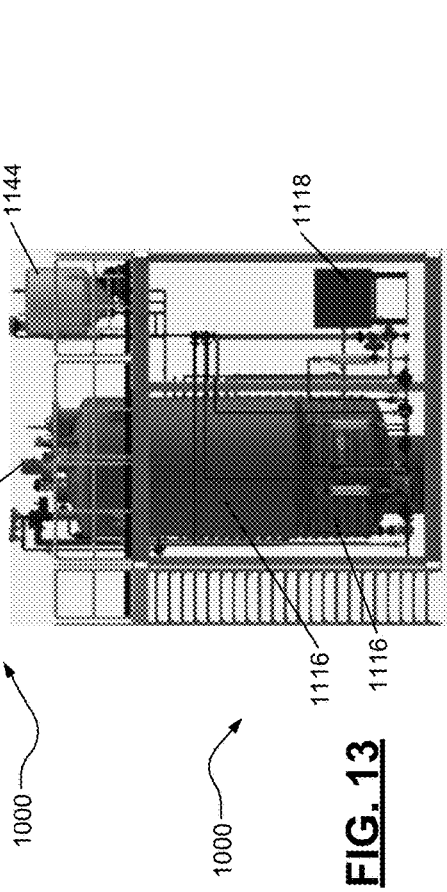
Figure 14:
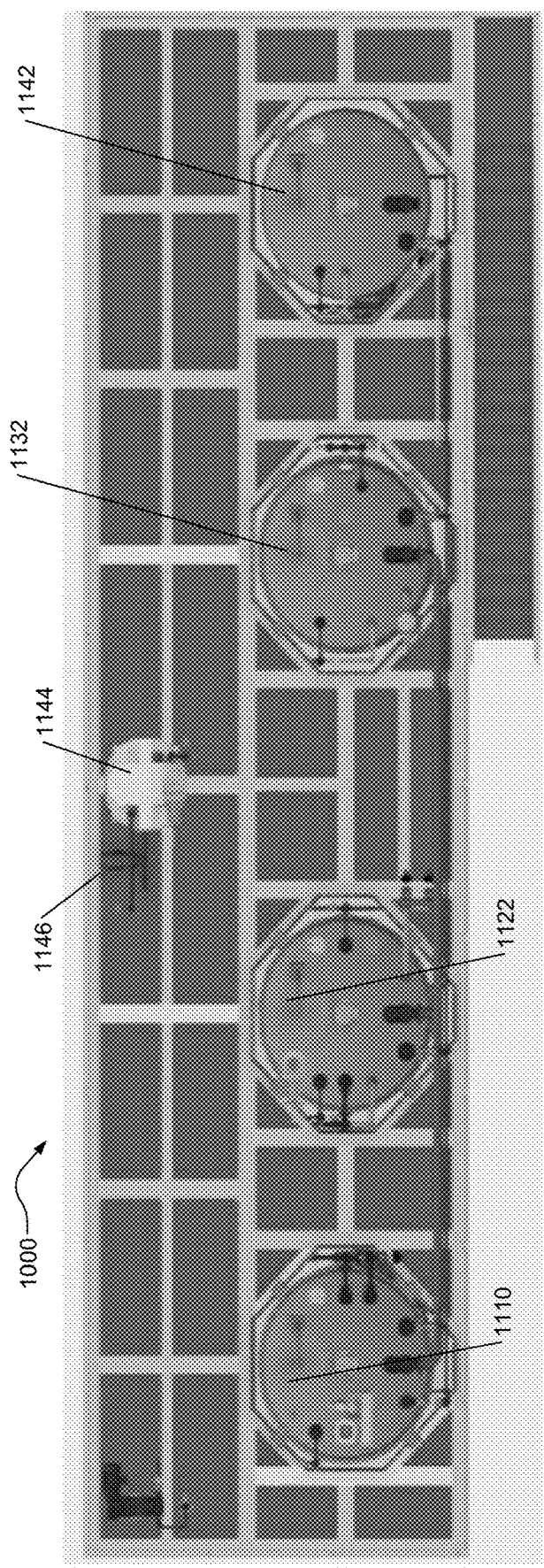

FIG. 6 illustrates an example diagram of this metal ion separation phase of the process conducted in system 400. As shown, sodium hydroxide (NaOH) is added to leachate to adjust the pH to 4.5. Next, the leachate is fed into a top of the column 402 (indicated by letter A in FIG. 6). The resin in the columns adsorbs Ni and Co ions from the leachate, and the remaining solution exits the column 402 (indicated by letter B in FIG. 6).

With continued reference to FIG. 4, after the resin co-separates and adsorbs Ni and Co ions, the ions may be recovered through a regeneration process in the column 402. The recovery process begins by introducing a regeneration solution from a source or container 408 at the bottom of the column 402 to elute Ni and Co ions from the resin. The regeneration solution may have a pH of 1.5. The solution with the Ni and Co ions may then be collected in a container 410 where Ni and Co may be separated from the solution in a precipitation process by increasing a pH of the solution to their precipitation pH. The Co and Ni in the solution, after adjusting the concentration, may be precipitated in hydroxide form (cobalt hydroxide and nickel hydroxide). Then, in some embodiments, the hydroxides and lithium precipitate (from the remaining leachate produced in the metal ion separation phase) may be combined to generate $LiNiCoAlO_2$.

Figure 7:
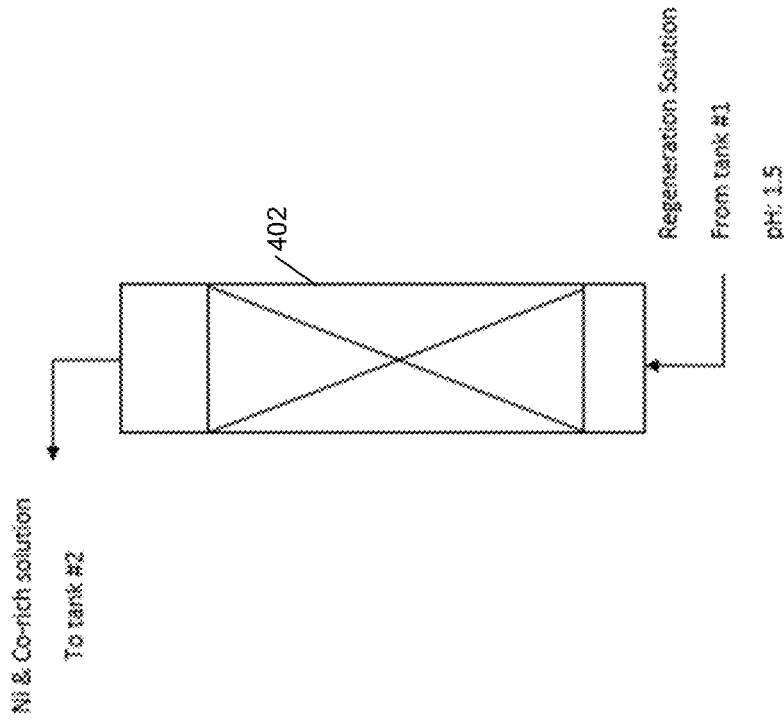
FIGS. 6-7 are additional process flow diagrams including a chromatographic separation process implemented with one chromatographic column or packed-bed column/reactor including a chelating resin stationary phase like that shown in FIG. 4, according to another example embodiment.

FIG. 7 illustrates an example diagram of this metal ion recovery phase of the process conducted in system 400. As shown, the regeneration solution from tank #1 (e.g., the container 408 in FIG. 4) is introduced at the bottom of the column 402, and the solution with the Ni and Co ions is passed to tank #2 (e.g., the container 410 of FIG. 4).

In some embodiments, the remaining leachate from the metal ion separation phase and the contents from the metal ion recovery phase may be collected in a reactor (e.g., the reactor 132 or the reactor 142 of FIGS. 1 and 3). For example, the remaining leachate may be pumped via a pump 404 to a reactor, as shown in FIG. 4. In this reactor, the solution (including Mn and Li) can be used to produce $LiMn_2O_4$ active material. For example, the solution can be processed to first precipitate Mn (e.g., as manganese hydroxide $Mn(OH)_2$) and then to precipitate lithium (e.g., as lithium carbonate $Li_2CO_3$) by adding sodium carbonate ($Na_2CO_3$). From these chemicals ($Mn(OH)_2$ and $Li_2CO_3$), $LiMn_2O_4$ may be produced.

In other embodiments, a chromatographic separation process using a chelating resin as a stationary phase may be implemented with multiple columns. Thus, the methods provided in certain aspects of the present disclosure may include separating that occurs by passing the purified filtrate stream in a first direction in a first chromatographic column or packed-bed column/reactor comprising a first chelating resin to conduct a chromatographic separation process, for example, at a pH of less than or equal to about 1.5, that generates a first raffinate stream comprising at least one manganese (Mn)-containing species (e.g., manganese (Mn) ions), at least one cobalt (Co)-containing species (e.g., cobalt (Co) ions), and at least one lithium (Li)-containing species that exits the first chromatographic column or packed-bed column/reactor. At least one nickel (Ni)-containing species (e.g., nickel (Ni) ions) is retained on the first chelating resin in the first chromatographic column or packed-bed column/reactor. The method may also include passing the first raffinate stream in a first direction in a second chromatographic column or packed-bed column/reactor comprising a second chelating resin to conduct a chromatographic separation process, for example, at a pH of less than or equal to about 2.5, that generates a second raffinate stream comprising at least one manganese (Mn)-containing species and at least one lithium (Li)-containing species that exits the second chromatographic column or packed-bed column/reactor. At least one cobalt (Co)-containing species (e.g., cobalt (Co) ions) is retained on the second chelating resin in the second chromatographic column or packed-bed column/reactor. The method also includes regenerating the first chromatographic column or packed-bed column/reactor by passing a first regeneration liquid, for example, having a pH of less than or equal to about 1.5, in the first chromatographic column or packed-bed column/reactor to form a first extract stream comprising the at least one nickel (Ni)-containing species (e.g., nickel (Ni) ions). In certain aspects, the first regeneration liquid may be passed in the column in a second direction opposite to the first direction. The method includes precipitating nickel hydroxide ($Ni(OH)_2$) from the first extract stream. The method also includes regenerating the second chromatographic column or packed-bed column/reactor by passing a second regeneration liquid, for example, having a pH of less than or equal to about 2.5, in the second chromatographic column or packed-bed column/reactor to form a second extract stream comprising the at least one cobalt (Co)-containing species (e.g., cobalt (Co) ions). The method may include precipitating cobalt hydroxide ($Co(OH)_2$) from the second extract stream. In certain aspects, the second regeneration liquid may be passed in the column in a second direction opposite to the first direction.

In certain variations, the methods may include forming a precursor of $LiNiCoAlO_2$ electroactive material by combining the nickel hydroxide ($Ni(OH)_2$) and cobalt hydroxide ($Co(OH)_2$) with the aluminum hydroxide ($Al(OH)_3$) and the at least one compound comprising lithium (Li).

In other aspects, the methods may further comprise precipitating manganese hydroxide ($Mn(OH)_2$) from the second raffinate stream, which may be achieved by adjusting pH to be greater than or equal to about 8 to less than or equal to about 10 by adding a strong alkaline base, like sodium hydroxide (NaOH), potassium hydroxide (KOH), lithium hydroxide (LiOH) and the like to forming an intermediate liquid stream. The manganese hydroxide ($Mn(OH)_2$) may then be removed or separated from the stream before entering the lithium precipitation reactor. In certain aspects, manganese hydroxide ($Mn(OH)_2$) thus formed may be later combined with the at least one compound comprising lithium (Li), for example, lithium carbonate ($Li_2CO_3$), to form $LiMnO_4$ electroactive material.

The methods may also further comprise adjusting the pH of the purified filtrate stream by adding sodium hydroxide (NaOH) to the purified filtrate stream to have a pH of about 2.5 and adjusting the pH of the first raffinate stream by adding sodium hydroxide (NaOH) to the first raffinate stream to have a pH of about 3.5.

In certain variations, the stationary phase in the first chromatographic column or packed-bed column/reactor and the stationary phase in the second chromatographic column or packed-bed column/reactor are any resin with selectivity for manganese (Mn) ions, nickel (Ni) ions, and/or cobalt (Co) ions and in particular, nickel (Ni) ions and/or cobalt (Co) ions known in the art. In one variation, the stationary phase in the first chromatographic column or packed-bed column/reactor comprises macroporous styrene divinylbenzene having functional groups comprising iminodiacetic acid and a stationary phase in the second chromatographic column or packed-bed column/reactor comprises macroporous styrene divinylbenzene having functional groups comprising iminodiacetic acid.

For example, FIG. 5 illustrates yet another chromatographic separation process conducted in system 500 that may be implemented with the systems 100, 300 of FIGS. 1 and 3, where leachate from an impurity removal stage (e.g., the impurity removal stage 104 of FIGS. 1 and 3) is passed through two selective columns (e.g., fixed-bed columns) 502A, 502B including resin as explained above. The system 500 may be included in stage 106 of FIGS. 1 and 3, or a separate stage that replaces stage 106 of FIGS. 1 and 3.

In the example of FIG. 5, leachate is passed through the column 502A after a pH of the leachate is adjusted to a desired level (e.g., 2.5). For example, leachate is introduced from a top of the column 502A. The resin in the column 502A separates and adsorbs Ni ions while other ions such as Mn, Co, and Li pass though the column 502A. The collected solution at a bottom of the column 502A is then passed through the column 502B after the pH of the solution is adjusted to a desired level (e.g., 3.5). In the column 502B, Co ions are separated and adsorbed.

FIG. 8 illustrates an example diagram of this metal ion separation phase of the process conducted in system 500. As shown, sodium hydroxide (NaOH) is added to leachate to adjust the pH to 2.5. Next, the leachate is fed into a top of the column 502A (indicated by letter A in FIG. 8) where the resins in the column 502A absorb Ni ions while other ions such as Mn, Co, and Li pass though. Next, the remaining solution exits a bottom of the column 502A (indicated by letter B in FIG. 8) and is passed to the column 502B. Before entering a top of column 502B, sodium hydroxide (NaOH) is added to the solution to adjust the pH to 3.5. The resins in the column 502B absorb Co ions while other ions such as Mn and Li pass though. Mn ions which are not separated by the column 502B can be removed later in a precipitation process if desired.

With continued reference to FIG. 5, Ni and Co ions in the leachate may be measured before and after the leachate passes through the resin columns 502A, 502B (e.g., top and bottom of the resin columns). Monitoring of effluent of the columns 502A, 502B while in service is a task that may be done continuously. Breakthrough or leakage of metal ions from the bottom of the columns 502A, 502B may provide an indication of when action needs to be taken and the unit needs to be regenerated. When the concentration of either of the Ni and Co ions exceeds a defined or predetermined amount, the separation phase stops and the system proceeds into a regeneration (e.g., a metal ion recovery) phase.

After the resins in the stationary phases of columns 502A, 502B co-separate and adsorb Ni and Co ions, the ions may be recovered through a regeneration process in the columns 502A, 502B. The recovery process begins by introducing a first regeneration solution (e.g., shown as a regeneration solution #1 in FIG. 5) from a source or container 508A at the bottom of the column 502A. The first regeneration solution may have an adjusted pH of about 1.5. The first regeneration solution elutes Ni ions from the resin in the column 502A and then collects in a container 510A. Ni may be separated from the solution in a precipitation process after adjusting pH to its precipitation pH. Similarly, for Co, a second regeneration solution (e.g., shown as a regeneration solution #2 in FIG. 5) is introduced from a source or container 508B at the bottom of the column 502B. The second regeneration solution may have an adjusted pH of about 2.5. The second regeneration solution elutes Co ions from the resin in the column 502B and then collects in a container 510B. Co may be separated from the solution in a precipitation process after adjusting pH to its precipitation pH. The amount of solution passed through the columns 502A, 502B during each run, the amount of regenerant solution needed for a complete recovery cycle of each metal ion, and the pH of regenerant used may be monitored if desired.

FIG. 9 illustrates an example diagram of this metal ion recovery phase of the process 500. As shown, the regeneration solution from tank #1 (e.g., the container 508A in FIG. 5) is introduced at the bottom of the column 502A, and the solution with Ni ions is passed to tank #3 (e.g., the container 510A of FIG. 5). Additionally, the regeneration solution from tank #2 (e.g., the container 508B in FIG. 5) is introduced at the bottom of the column 502B, and the solution with Co ions is passed to tank #5 (e.g., the container 510B of FIG. 5).

In some embodiments, the remaining leachate from the metal ion separation phase and the contents from the metal ion recovery phase may be collected in a reactor (e.g., the reactor 132 or the reactor 142 of FIGS. 1 and 3). For example, the remaining leachate may be pumped via a pump 504 to a reactor, as shown in FIG. 5. In this reactor, the solution (including Mn and Li) can be used to produce $LiMn_2O_4$. For example, the solution can be processed to first precipitate Mn (e.g., as manganese hydroxide $Mn(OH)_2$) and then to precipitate lithium (e.g., as lithium carbonate $Li_2CO_3$) by adding sodium carbonate ($Na_2CO_3$). From these chemicals ($Mn(OH)_2$ and $Li_2CO_3$), $LiMn_2O_4$ may be produced. Additionally, the eluted Co and Ni ions may be precipitated as cobalt hydroxide and nickel hydroxide, and combined with Al to produce $LiNiCoAlO_2$.

FIGS. 10-14 illustrate an example system 1000 that may be used to implement the process shown in system 100 of FIG. 1. As shown in FIGS. 10-14, the system 1000 may be employed in a two-level configuration with various components positioned on one or both levels.

For example, the system 1000 of FIGS. 10-14 includes four reactors 1110, 1122, 1132, 1142, five pumps 1118, 1128, 1138, 1146, 1152, four filters 1120, 1130, 1140, 1154, an evaporator 1144, and a scrubber 1114. Each reactor 1110, 1122, 1132, 1142 may be a jacketed, agitated tank that is internally coated with a corrosion-resistant lining to withstand hot acidic (see, also, Appendix A). In such examples, the reactors 1110, 1122, 1132, 1142 include agitators 1112, 1124, 1134, 1148 (respectively) for stirring contents (see, also, Appendix A), and the reactors 1110, 1122, 1132 further include thermal jackets 1116, 1126, 1136 (respectively) surrounding a portion of its respective reactor to circulate a heating/cooling medium for maintaining a desired temperature as explained herein. The reactors 1110, 1122, 1132, 1142, the pumps 1118, 1128, 1138, 1146, 1152, the filters 1120, 1130, 1140, 1154, the evaporator 1144, the scrubber 1114, the agitators 1112, 1124, 1134, 1148, and the jackets 1116, 1126, 1136 function in a similar manner as the reactors 110, 122, 132, 142, the pumps 118, 128, 138, 146, 152, the filters 120, 130, 140, 154, the evaporator 144, the scrubber 114, the agitators 112, 124, 134, 148, and the jackets 116, 126, 136 of FIG. 1 and as described above.

In the example of FIGS. 10-14, the reactors 1110, 1122, 1132, 1142, the pumps 1118, 1128, 1138, 1146, 1152, the filters 1120, 1130, 1140, 1154, and the evaporator 1144 are in fluid communication. For example, the pump 1118 and the filter 1120 may be in fluid communication with the reactors 1110, 1122, the pump 1128 and the filter 1130 may be in fluid communication with the reactors 1122, 1132, the pump 1138 and the filter 1140 may be in fluid communication with the reactors 1132, 1142, the evaporator 1144 may be in fluid communication with the filter 1140 and the reactor 1142, and the pump 1152 and the filter 1154 may be in fluid communication with the reactor 1142. In some examples, the reactors 1110, 1122, 1132, 1142, the pumps 1118, 1128, 1138, 1146, 1152, the filters 1120, 1130, 1140, 1154, and the evaporator 1144 are arranged in a serial flow path. For example, the flow path may include, in order, the reactor 1110, the pump 1118, the filter 1120, the reactor 1122, the pump 1128, the filter 1130, the reactor 1132, the pump 1138, the filter 1140, the evaporator 1144, the pump 1146, the reactor 1142, the pump 1152, and the filter 1154.

For example, the reactor (e.g., a leaching reactor) 1110 receives an inorganic acid (e.g., sulfuric acid ($H_2SO_4$)), an oxidant (e.g., hydrogen peroxide ($H_2O_2$)), and black mass as explained herein relative to FIG. 1 (e.g., from sources thereof in fluidic communication with the reactor 1110 as illustrated in FIG. 1 (e.g., located in communication with the reactor 1110 via inlets toward a top portion of the reactor 1110, etc.), etc.). The inorganic acid, the oxidant, and the black mass may be introduced into the reactor 1100 in different phases. For example, the black mass and the inorganic acid may be added before the oxidant, as explained above relative to FIG. 1. The agitator 1112 extending into the reactor 1110 may mix the contents, and the jacket 1116 extending around an outer surface of the reactor 1110 may be used to maintain and/or adjust the temperature of the contents through a heating/cooling medium as explained herein.

After a desired amount of agitation as explained above, the pump 1118 may pump contents from the reactor 1110 and through the filter 1120 (e.g., whereby the contents may exit the reactor 1110 via an outlet (e.g., disposed toward a lower part of the reactor 1110, etc.), etc.). The filter 1120 may remove carbon (graphite) particles from the contents of the reactor 1110. The remaining contents (e.g., a first filtrate) passing through the filter 1120 are then provided to the reactor 1122. The carbon (graphite) particles collected by the filter 1120 may then be processed as desired.

The reactor 1122 receives the first filtrate passing through the filter 1120, an oxidant (e.g., hydrogen peroxide ($H_2O_2$)), sodium hydroxide (NaOH), iron (Fe) powder, and a lime component (e.g., calcium oxide (CaO)) (e.g., from sources thereof in fluidic communication with the reactor 1122 as illustrated in FIG. 1 (e.g., located in communication with the reactor 1122 via inlets toward a top portion of the reactor 1122, etc.), etc.). The first filtrate, the oxidant, the sodium hydroxide, the iron powder, and the lime may be introduced into the reactor 1122 in different phases. For example, the first filtrate, the sodium hydroxide, and the iron powder may be added before the oxidant and the lime, as explained above relative to FIG. 1. The agitator 1124 extending into the reactor 1122 may mix the contents, and the jacket 1126 extending around an outer surface of the reactor 1122 may be used to maintain and/or adjust the temperature of the contents through a heating/cooling medium as explained herein.

After a desired amount of agitation as explained above, the pump 1128 may pump contents from the reactor 1122 and through the filter 1130 (e.g., whereby the contents may exit the reactor 1122 via an outlet (e.g., disposed toward a lower part of the reactor 1122, etc.), etc.). The filter 1130 may remove impurities such as copper, fluoride, iron, phosphate, titanium, and aluminum from the contents. The remaining contents (e.g., a second filtrate) passing through the filter 1130 are then provided to the reactor 1132. The impurities collected by the filter 1130, again, may be processed as desired.

The reactor 1132 receives the second filtrate passing through the filter 1130 and sodium hydroxide (NaOH). In some examples, the reactor 1132 may receive defined amounts (e.g., dosages) of $NiSO_4$, $MnSO_4$, and $CoSO_4$, as explained above relative to the system 100 of FIG. 1 (e.g., from sources thereof in fluidic communication with the reactor 11321 (e.g., located in communication with the reactor 1132 via inlets toward a top portion of the reactor 1132, etc.), etc.). The agitator 1134 extending into the reactor 1132 may mix the contents, and the jacket 1136 extending around an outer surface of the reactor 1132 may be used to maintain and/or adjust the temperature of the contents through a heating/cooling medium as explained herein.

After a desired amount of agitation as explained above, the pump 1138 may pump contents from the reactor 1132 and through the filter 1140 (e.g., whereby the contents may exit the reactor 1132 via an outlet (e.g., disposed toward a lower part of the reactor 1132, etc.), etc.). The filter 1140 may remove NMC product from the contents. The remaining contents (e.g., a third filtrate) passing through the filter 1140 are then provided to the evaporator 1144.

In the evaporator 1144, the third filtrate is heated to remove water from the filtrate through an evaporation process. For example, in some embodiments, about 50% of the water in the third filtrate may be evaporated. The remaining contents of the third filtrate (e.g., a concentrate stream) are then pumped via the pump 1146 to the reactor 1142.

The reactor 1132 receives the concentrate stream, sodium carbonate ($Na_2CO_3$), and sodium hydroxide (NaOH). The concentrate stream, the sodium carbonate, and the sodium hydroxide may be introduced into the reactor 1132 in different phases. For example, the concentrate stream and the sodium carbonate may be added before the sodium hydroxide, as explained above relative to FIG. 1. The agitator 1148 extending into the reactor 1132 may mix the contents as explained herein.

After a desired amount of agitation as explained above, the pump 1152 may pump contents from the reactor 1142 and through the filter 1154. The filter 1154 may remove lithium carbonate from the contents. The remaining contents passing through the filter 1154 may be sent to wastewater treatment and/or recycled back to the reactor 1110.

In various embodiments, components in the reactors 1110, 1122, 1132, 1142 may generate undesirable gases. For example, in some embodiments, fluorine in the reactors 1110, 1122, 1132 may be converted to hydrogen fluoride (HF). In such examples, some of the undesirable gases (e.g., HF, etc.) may be released and vented through the scrubber 1114 of FIGS. 10-14.

In various embodiments, a controller may be implemented to determine precise dosages of components added to the reactors 1110, 1122, 1132, 1142 of FIGS. 10-14. Such dosages may be determined based on sensed characteristics of contents in the reactors 1110, 1122, 1132, 1142, contents entering the reactors 1110, 1122, 1132, 1142, contents leaving the reactors 1110, 1122, 1132, 1142, etc. For example, precise dosages of NaOH, $NiSO_4$, $MnSO_4$, and $CoSO_4$ may be automatically determined based sensed characteristics (e.g., a pH level, concentrations of different metals, etc.) of the contents in the reactor 1132 and then dosed accordingly using a controller (e.g., a PLC, etc.), as explained above relative to FIGS. 1 and 2.

Figure 15:
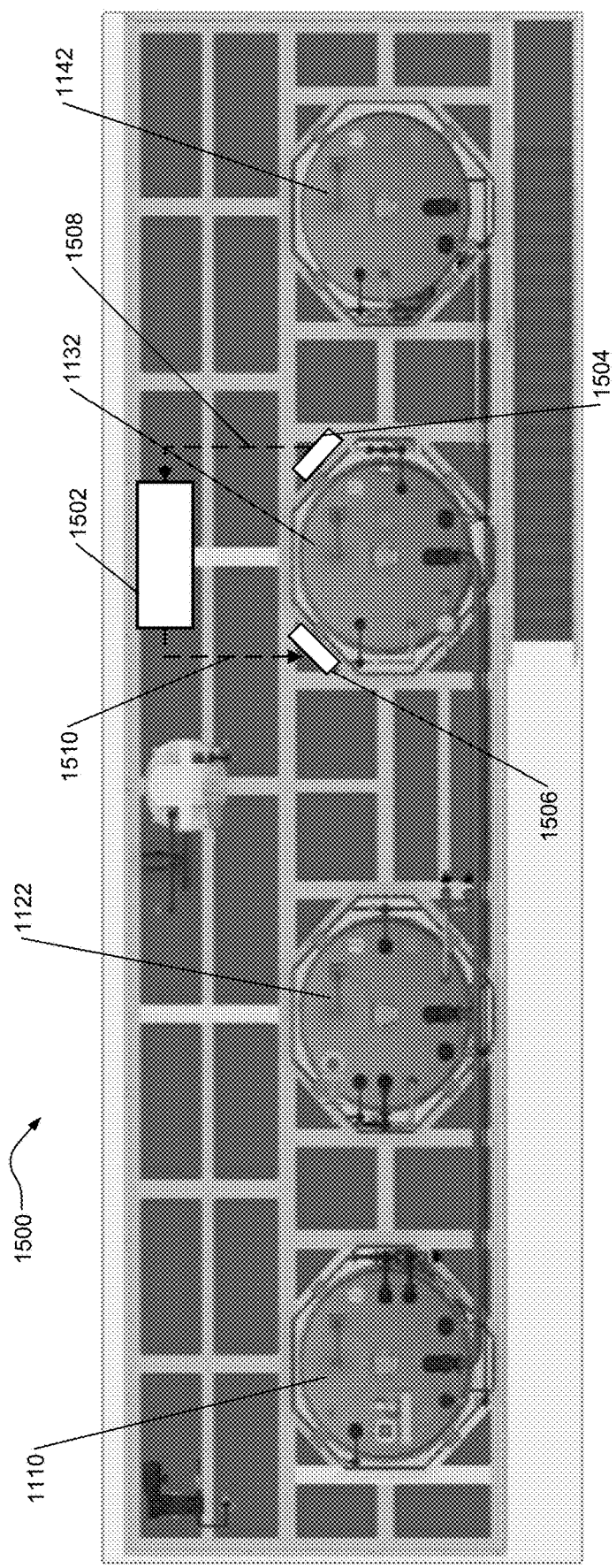
FIG. 15 is a top view of a system including a controller to implement the process of FIG. 2, according to another example embodiment.

For example, FIG. 15 illustrates an example system 1500 that may be used to implement the process conducted in the system 100 of FIGS. 1 and 2. The system 1500 of FIG. 15 may be substantially similar to the system 1000 of FIGS. 10-14, but include a controller 1502 (e.g., a computing device, a computer, a computing module, etc. consistent with the description provided above; etc.) (see, also, Appendix A), one or more sensors (collectively shown as sensors 1504), and one or more pumps (collectively shown as pumps 1506). The system 1500 includes the reactors 1110, 1122, 1132, 1142 of FIGS. 10-14. In the example of FIG. 15, the sensors 1504 are in communication with contents in and/or entering the reactor 1132, and the pumps 1506 are in communication with the reactor 1132.

In various embodiments, the controller 1502 may include a PLC and/or another suitable control device for determining precise dosages of components that may be add to the reactor 1132. Additionally, the sensors 1504 may include, for example, one or more analysers for measuring concentrations of nickel, manganese and cobalt in the solution entering (and/or in) the reactor 1132, one or more sensors for measuring a pH level of the contents in (and/or entering) the reactor 1132, etc.

In the system 1500, the controller 1502 may receive feedback signals 1508 from the sensors 1504 representing characteristics of contents entering and/or in the reactor 1132. For example, the feedback signals 1508 may include signals representing concentrations of nickel, manganese and cobalt in the solution entering the reactor 1132, signals representing a pH level of the contents in the reactor 1132, etc. Based on the feedback signals 1508, the controller 1502 may determine precise amounts of components that need to be added to the reactor 1132. For example, the controller 1502 may determine desirable amounts of nickel sulfate ($NiSO_4$), manganese sulfate ($MnSO_4$), cobalt sulfate ($CoSO_4$), and sodium hydroxide (NaOH) to add to the reactor 1132, as explained above relative to FIGS. 1 and 2. Once the desirable amounts of nickel sulfate ($NiSO_4$), manganese sulfate ($MnSO_4$), cobalt sulfate ($CoSO_4$), and sodium hydroxide (NaOH) are determined, the controller 1502 may generate control signals 1510 to control the pumps 1506 for adding the components to the reactor 1132.

Although the system 1500 of FIG. 15 is described in relation to controlling components being added to the reactor 1132, it should be apparent that the controller 1502 and/or additional controllers may be implemented to control precise amounts of components added to the other reactors 1110, 1122, 1142 if desired. Further, it should be appreciated that the controller 1502 of FIG. 15 and/or additional controllers may be implemented in other systems disclosed herein to control precise amounts of components added to reactors in such systems.

Figure 16:
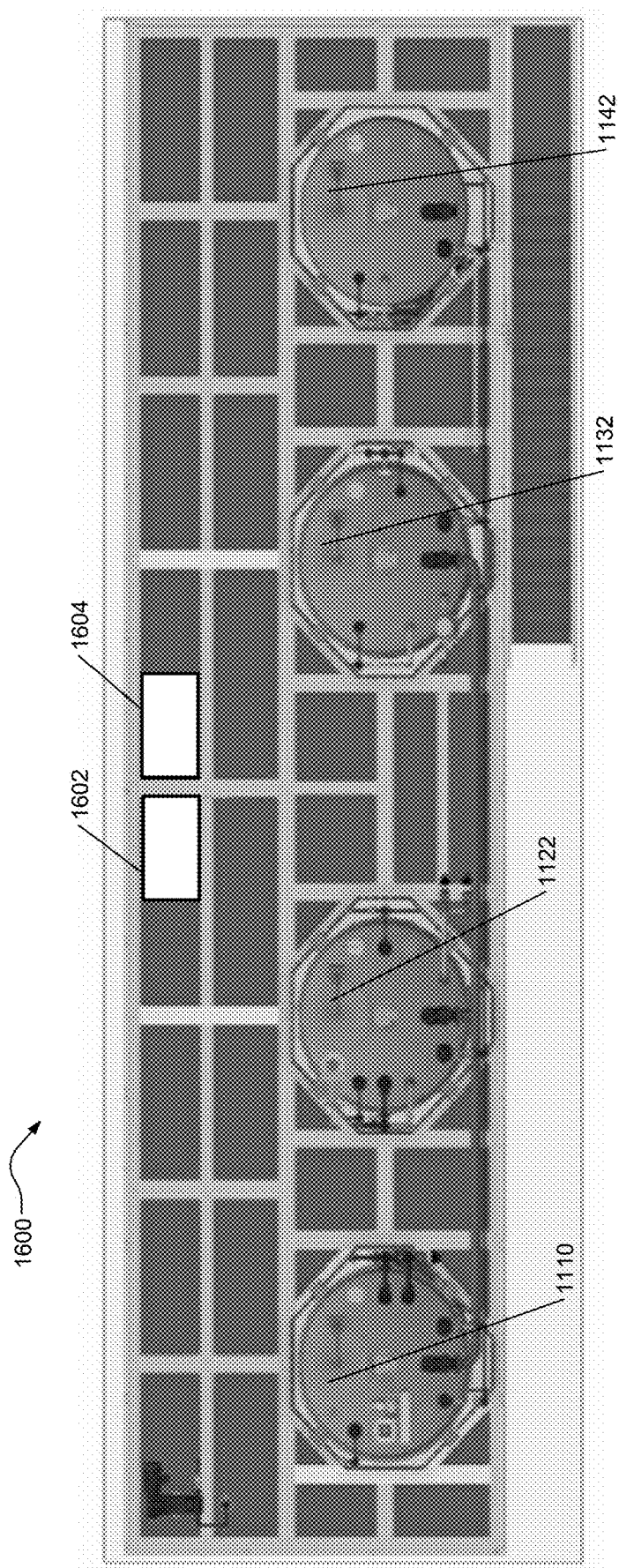
FIG. 16 is a top view of a system including a thermal shock module and an electrode ionization module to implement the process of FIG. 3, according to another example embodiment.

In various embodiments, a thermal shocking process may be implemented in the system 1500 and/or any other system disclosed herein. In such examples, the system(s) may include modules for implementing a thermal shocking process instead of, for example, an evaporator (e.g., the evaporator 1144 of FIG. 15). For example, FIG. 16 illustrates an example system 1600 that may be used to implement the process conducted in system 300 of FIG. 3. The system 1600 of FIG. 16 may be substantially similar to the system 1000 of FIGS. 10-14, but also includes a thermal shock module and an electrode ionization module instead of an evaporator. Specifically, the system 1600 includes the reactors 1110, 1122, 1132, 1142 of FIGS. 10-14, a thermal shock module 1602, and an electrode ionization module 1604.

In the system 1600, the thermal shock module 1602 and the electrode ionization module 1604 are arranged in fluid communication between the reactors 1132, 1142. For example, the thermal shock module 1602 may receive contents from a filter (e.g., the 1130 of FIGS. 10-14) on an output side of the reactor 1132, and provide contents to the electrode ionization module 1604 (e.g., via a pump). Additionally, the electrode ionization module 1604 may provide contents to the reactor 1142 (e.g., via a pump).

The thermal shock module 1602 may be controlled to thermally shock contents in the module 1602. For example, a temperature in the module 1602 may be lowered to a defined level to remove a component (e.g., sodium sulfate, etc.) from the contents. After the component is removed, a pump may provide the remaining contents from the thermal shock module 1602 to the electrode ionization module 1604.

The electrode ionization module 1604 may remove water from the contents therein. For example, the electrode ionization module 1604 may utilize electricity, ion exchange membranes and resin to deionize water and separate dissolved ions from water. Such ions may form a precipitate/sludge including, for example, lithium sulfate as explained above relative to FIG. 3. In such examples, the precipitate and its sludge may be provided to the reactor 1142, and the removed water may be recycled back to the reactor 1110, provided to a wastewater treatment facility, etc. as explained above.

In various embodiments, a chelating resin process may be implemented in any one of the systems disclosed herein. In such examples, one or more columns including resin(s) may be implemented to separate and absorb particular components in a solution passing therethrough.

For example, FIG. 17 illustrates an example system 1700 that may be used to implement any one of the processes conducted in systems 100, 300, 400 of FIGS. 1-4 and 6-7 explained herein. The system 1700 of FIG. 17 may be substantially similar to the system 1000 of FIGS. 10-14, but includes a column 1702 having resin such as such as a matrix of macroporous styrene divinylbenzene and functional groups iminodiacetic acid. Specifically, the system 1700 includes the reactors 1110, 1122, 1132, 1142 of FIGS. 10-14, the column 1702, and containers 1708, 1710.

In the example of FIG. 17, the column 1702 may be arranged in fluid communication between the reactors 1122, 1132. In such examples, contents from the reactor 1122 may be provided to the column 1702, and contents from the column 1702 may be provided to the reactor 1132. In other examples, the column 1702 may be arranged in fluid communication between the reactors 1122, 1142, and the reactor 1132 may be omitted. In such examples, contents from the column 1702 may be provided to the reactor 1142.

For example, the column 1702 receives leachate (e.g., the second filtrate as explained above) from the reactor 1122. In some embodiments, the leachate may be passed to the column 1702 after its pH is adjusted to a desired level (e.g., 4.5). The resin in the column 1702 co-separates and adsorbs particular metal ions (e.g., Ni and Co ions) in the leachate, while other ions such as Mn and Li (raffinate) in the remaining leachate pass through.

The column 1702 may then undergo a regeneration process to recover the separated and adsorbed metal ions. For example, the column 1702 may receive a regeneration solution from the container 1708 to elute the ions from the resin. The solution with the eluted ions may then be collected in the container 1710 where the ions may be separated from the solution in a precipitation process by increasing a pH of the solution to their precipitation pH. The remaining leachate passing through the column 1702 and/or the recovered metal ions may then be passed to a subsequent reactor (e.g., the reactor 1132 or the reactor 1142), as explained herein relative to FIGS. 4 and 6-7.

In other examples, a chelating resin process may be implemented with two columns. For example, FIG. 18 illustrates an example system 1800 that may be used to implement any one of the processes conducted in systems 100, 300, 500 of FIGS. 1-3, 5 and 8-9 explained herein. The system 1800 of FIG. 18 may be substantially similar to the system 1700 of FIG. 17, but includes two columns 1802A, 1802B having resins such as such as a matrix of macroporous styrene divinylbenzene and functional groups iminodiacetic acid. Specifically, the system 1800 includes the reactors 1110, 1122, 1132, 1142 of FIGS. 10-14, the columns 1802A, 1802B, and containers 1808A, 1808B, 1810A, 1810B.

In the example of FIG. 18, the columns 1802A, 1802B may be arranged in fluid communication between the reactors 1122, 1132. In such examples, contents from the reactor 1122 may be provided to the column 1802A, contents from the column 1802A may be provided to the column 1802B, and contents from the column 1802B may be provided to the reactor 1132. In other examples, the columns 1802A, 1802B may be arranged in fluid communication between the reactors 1122, 1142, and the reactor 1132 may be omitted. In such examples, contents from the column 1802B may be provided to the reactor 1142.

For example, the column 1802A receives leachate (e.g., the second filtrate as explained above) from the reactor 1122. In some embodiments, the leachate may be passed to the column 1802A after its pH is adjusted to a desired level (e.g., 2.5). The resin in the column 1802A co-separates and adsorbs a particular metal ion (e.g., Ni ions) in the leachate, while other ions such as Mn, Co, and Li in the remaining leachate pass through.

The column 1802B receives the remaining leachate from the column 1802A. In some embodiments, this leachate may be passed to the column 1802B after its pH is adjusted to a desired level (e.g., 3.5). The resin in the column 1802B co-separates and adsorbs another metal ion (e.g., Co ions) in the remaining leachate, while other ions such as Mn, Co, and Li in the remaining leachate pass through.

The columns 1802A, 1802B may then undergo a regeneration process to recover the separated and adsorbed metal ions. For example, the column 1802A may receive a regeneration solution from the container 1808A to elute the Ni ions from the resin. The solution with the eluted ions may then be collected in the container 1810A where the Ni ions may be separated from the solution in a precipitation process by increasing a pH of the solution to its precipitation pH. Additionally, the column 1802B may receive a regeneration solution from the container 1808B to elute the Co ions from its resin. The solution with the eluted ions may then be collected in the container 1810B where the Co ions may be separated from the solution in a precipitation process by increasing a pH of the solution to its precipitation pH. The leachate passing through both columns 1802A, 1802B and/ or the recovered metal ions (Ni ions, Co ions) may then be passed to a subsequent reactor (e.g., the reactor 1132 or the reactor 1142), as explained herein relative to FIGS. 4 and 6-7.

In various embodiments, any one of the agitators disclosed herein may include a shaft extending into a reactor, one or more impellers attached to the shaft, and a motor for rotating the shaft and the impellers. In some embodiments, each impeller may include one or more blades (or fins) for stirring contents in the reactor. For example, one agitator may include two impellers separated by a defined distance, with each impeller having three blades. Example reactors and impellers, as may be used herein, are illustrated in the Appendix A. Notably, agitators may include other forms of mixers or agitators (e.g., sonication, bubblers, and the like) as well.

In various embodiments, black mass may be fed into a reactor (e.g., the reactor 1110 of FIGS. 10-14) of a system through a hopper. For example, black mass in conventional super sack containers may be delivered to a site where the system is located. In some examples, 1,000 kg (2,200 lbs.) of black mass may be provided. The containers of black mass may be unloaded into a transfer system using a lift truck or similar device, and the black mass may then be transferred via a material handling system to a feed hopper located above the reactor. The feed hopper may be sized to hold enough black mass for two batches, with each batch having, for example, 500 kg (1,100 lbs.) of black mass. Alternatively, the feed hopper may be sized to hold enough black mass for a single batch or more than two batches.

In various embodiments, any one of the filters disclosed herein may include any suitable type of filter. For example, the filters may be pressure (or press) filters, hydraulic filters, gravity filters, etc. Further, any one of the pumps disclosed herein may include any suitable type of pump. For example, the pumps may be centrifugal pumps, positive-displacement pumps, axial-flow pumps, etc.

In various embodiments, any one of the scrubbers disclosed herein may include a tower, one or more blowers, one or more pumps, and an exhaust. For example, gases may be passed through the tower with the pump(s), and exhausted from the tower through the exhaust and blower(s).

In various embodiments, any one of the reactors disclosed herein may be a jacketed, agitated tank that is internally coated with a corrosion-resistant lining to withstand hot acidic conditions. For instance, one reactor may include a suitable agitator extending into an interior portion of the reactor, and a thermal jacket surrounding an exterior portion of the reactor for circulating a heating/cooling medium to maintain and/or adjust the temperature of contents in the rector at and/or to a desired level. In various embodiments, the thermal jacket may include, for example, a pipe (e.g., a metallic pipe) coiled around the reactor. The thermal jacket may extend a defined distance (e.g., length) from a bottom of the reactor. The circumference of the pipe and/or the distance the jacket extends up the reactor may depend on, for example, the amount of energy required to change and/or maintain the temperature with the heating/cooling medium.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A process for recovering metals from a lithium-ion battery waste stream, the process comprising:
   purifying a lithium-ion battery waste liquid stream comprising sulfuric acid ($H_2SO_4$), fluorine (F), copper (Cu), nickel (Ni), manganese (Mn), cobalt (Co), lithium (Li), and one or more additional impurities selected from the group consisting of: phosphate (P), aluminum (Al), iron (Fe), and titanium (Ti), in a first reactor to remove the fluorine (F), copper (Cu) and the one or more additional impurities, wherein the purifying sequentially includes:
(i) removing copper (Cu) from the waste liquid stream;
(ii) adding a source of calcium oxide and an oxidant to the waste liquid stream having a pH of greater than or equal to about 1 to less than or equal to about 2 to generate calcium fluoride ($CaF_2$) that precipitates out of the waste liquid stream; and
(iii) after the (i) removing copper (Cu) and the (ii) adding the source of calcium oxide and the oxidant, then adding a first inorganic base to increase pH of the waste liquid stream to generate one or more metal precipitate compounds selected from the group consisting of: aluminum hydroxide ($Al(OH)_3$), titanium hydroxide ($Ti(OH)_4$), iron phosphate ($FePO_4$), and one or more iron hydroxides ($Fe(OH)_3$ and $Fe(OH)_2$);
passing the waste liquid stream exiting the first reactor through a filter to generate a purified filtrate liquid stream and a second retentate;
separating nickel (Ni), manganese (Mn), and cobalt (Co) from the purified filtrate liquid stream by passing the purified filtrate liquid stream into one or more of:
(i) a second reactor for conducting a co-precipitation process by increasing pH; or
(ii) one or more chromatographic columns;
to generate an intermediate liquid stream comprising lithium (Li) and one or more recovered products comprising one or more of nickel (Ni), manganese (Mn), and cobalt (Co) that are removed from the intermediate liquid stream; and
introducing the intermediate liquid stream into a lithium precipitation reactor to precipitate at least one compound comprising lithium (Li).

2. The process of claim 1, wherein the removing copper (Cu) from the waste liquid stream comprises precipitating copper (Cu) by adding a source of iron (Fe) and a second inorganic base to the waste liquid stream to precipitate copper (Cu) via a cementation reaction.

3. The process of claim 2, wherein the source of iron (Fe) comprises iron powder, the first inorganic base and the second inorganic base each comprise sodium hydroxide (NaOH), the source of calcium oxide is selected from the group consisting of: lime (CaO), calcium hydroxide ($Ca(OH)_2$), and combinations thereof, and the oxidant is selected from the group consisting of: hydrogen peroxide ($H_2O_2$), ozone ($O_3$), sodium hypochlorite (NaClO), and combinations thereof.

4. The process of claim 3, wherein the second inorganic base is added until pH is about 5, the first inorganic base is added until pH is about 10.5, and the oxidant comprises hydrogen peroxide ($H_2O_2$) which is added at a concentration of greater than or equal to about 4% by volume to less than or equal to about 6% by volume of total liquid contents.

5. The process of claim 2, wherein the adding the source of iron (Fe) and the second inorganic base to the waste liquid stream is conducted at a pH of greater than or equal to about 1 to less than or equal to about 2 while mixing for a duration of greater than or equal to about 15 minutes at a temperature of greater than or equal to about 55° C. to less than or equal to about 65° C.

6. The process of claim 1, wherein the removing copper (Cu) from the waste liquid stream comprises adding a source of sodium sulfide ($Na_2S$) to the waste liquid stream to precipitate copper (Cu) via a sulfidation reaction.

7. The process of claim 1, wherein the removing copper (Cu) from the waste liquid stream comprises subjecting the waste liquid stream to a solvent-extraction process by mixing the waste liquid stream with an extractant and an organic phase to remove copper (Cu).

8. The process of claim 7, wherein the extractant comprises 2-hydroxy-5-nonylbenzaldehyde oxime and the organic phase comprises kerosene.

9. The process of claim 1, wherein the purifying further includes introducing a source of phosphate comprising sodium phosphate ($Na_3PO_4$) to the waste liquid stream prior to the first inorganic base to increase pH of the waste liquid stream so as to generate aluminum phosphate ($AlPO_4$) precipitate.

10. The process of claim 1, wherein the adding the source of calcium oxide and the oxidant to generate calcium fluoride ($CaF_2$) is conducted at a pH of greater than or equal to about 1 to less than or equal to about 2 while mixing for a duration of greater than or equal to about 30 minutes at a temperature of greater than or equal to about 55° C. to less than or equal to about 65° C.

11. The process of claim 1, wherein the adding of the first inorganic base increases the pH of the waste liquid stream to greater than or equal to about 4 to less than or equal to about 5 and the adding of the first inorganic base to increase pH is conducted while mixing for a duration of greater than or equal to about 60 minutes at a temperature of greater than or equal to about 55° C. to less than or equal to about 65° C.

12. The process of claim 1, wherein the purified filtrate liquid stream comprises nickel sulfate ($NiSO_4$), manganese sulfate ($MnSO_4$), and cobalt sulfate ($CoSO_4$) and the separating nickel (Ni), manganese (Mn), and cobalt (Co) from the purified filtrate liquid stream occurs by passing the purified filtrate liquid stream into the second reactor for conducting the co-precipitation process that comprises:
increasing the pH of the purified filtrate liquid stream to greater than or equal to about 11 in an inert environment to form nickel hydroxide hydrate ($Ni(OH)_2 \cdot 6H_2O$), manganese hydroxide hydrate ($Mn(OH)_2 \cdot H_2O$), and cobalt hydroxide hydrate ($Co(OH)_2 \cdot 7H_2O$) that concurrently precipitate from the purified filtrate liquid stream to generate the one or more recovered products.

13. The process of the claim 12, wherein the increasing the pH of the purified filtrate liquid stream further comprises first adding ammonia to the purified liquid stream that comprises nickel sulfate ($NiSO_4$), manganese sulfate ($MnSO_4$), and cobalt sulfate ($CoSO_4$).

14. The process of claim 1, wherein the one or more recovered products is an electroactive material precursor having a stoichiometry of $Ni_xMn_yCo_{1-x-y}(OH)_2$, where x is <1 and y is <1.

15. The process of claim 1, wherein the one or more recovered products has a stoichiometry of about

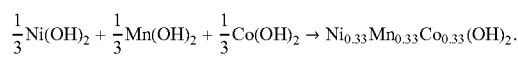

16. The process of claim 1, further comprising:
determining a first ratio of Ni:Mn:Co in the purified filtrate liquid stream prior to the co-precipitation process;

comparing the first ratio to a target stoichiometric ratio of Ni:Mn:Co for the one or more recovered products; and adding one or more of nickel sulfate (NiSO$_4$), manganese sulfate (MnSO$_4$), and cobalt sulfate (CoSO$_4$) to the purified filtrate liquid stream to adjust an amount of nickel sulfate (NiSO$_4$), manganese sulfate (MnSO$_4$), and cobalt sulfate (CoSO$_4$) prior to adjusting the pH so that the one or more recovered products has a second ratio corresponding to the target stoichiometric ratio.

17. The process of claim 1, wherein the lithium-ion battery waste stream is black mass and prior to the purifying, the process further comprises:

generating the lithium-ion battery waste liquid stream by subjecting the black mass to a leaching process that comprises:

mixing an inorganic acid comprising sulfuric acid (H$_2$SO$_4$) with the black mass to form an acidic admixture having a pH of less than or equal to about 2.5;

mixing an oxidant comprising hydrogen peroxide (H$_2$O$_2$) with the acidic admixture, wherein both the mixing of the inorganic acid and the mixing of the oxidant are conducted at a temperature of less than or equal to about 100° C.; and adding deionized water to the acidic admixture; and passing a leachate stream through a second filter to generate a filtrate liquid stream comprising one or more metal sulfates and a first retentate comprising graphite.

18. The process of claim 1, wherein the separating recovers greater than or equal to about 80% by mass of each of nickel (Ni), manganese (Mn), and cobalt (Co) from the purified filtrate liquid stream, the one or more recovered products have a purity level of greater than or equal to about 98% and comprise less than or equal to about 2% by mass of a total cumulative amount of impurities comprising aluminum (Al), copper (Cu), iron (Fe), phosphorus (P), titanium (Ti) and fluorine (F).

19. The process of claim 1, wherein prior to the introducing the intermediate liquid stream into the lithium precipitation reactor, subjecting the intermediate liquid stream to a solvent-extraction process by mixing the waste liquid stream with an extractant comprising bis-(2-ethylhexyl) phosphoric acid and an organic phase comprising kerosene to remove impurities comprising a metal selected from the group consisting of: copper (Cu), iron (Fe), aluminum (Al), and combinations thereof.

20. The process of claim 1, wherein the introducing the intermediate liquid stream into a lithium precipitation reactor comprises adding sodium carbonate (Na$_2$CO$_3$) and a second inorganic base to the lithium precipitation reactor, wherein the intermediate liquid stream has a temperature of greater than or equal to about 80° C. to less than or equal to about 90° C. for greater than or equal to about 90 minutes to generate lithium carbonate (Li$_2$CO$_3$) precipitate.

21. The process of 20, wherein the intermediate liquid stream comprises lithium sulfate (Li$_2$SO$_4$) and sodium sulfate (Na$_2$SO$_4$) and prior to the introducing, the intermediate liquid stream is subjected to a thermal shock process so that a temperature is greater than or equal to about 0° C. to less than or equal to about 30° C. followed by ionization in an electrode ionization unit to facilitate precipitation of sodium sulfate (Na$_2$SO$_4$) from the intermediate liquid stream, followed by adding sodium carbonate (Na$_2$CO$_3$) into the lithium precipitation reactor to generate lithium carbonate (Li$_2$CO$_3$) precipitate.

22. A process for recovering metals from a lithium-ion battery waste stream, the process comprising:

purifying a lithium-ion battery waste liquid stream comprising sulfuric acid (H$_2$SO$_4$), fluorine (F), copper (Cu), nickel (Ni), manganese (Mn), cobalt (Co), lithium (Li), and one or more additional impurities selected from the group consisting of: phosphate (P), aluminum (Al), iron (Fe), and titanium (Ti), in a first reactor to remove fluorine (F), copper (Cu), and the one or more additional impurities, wherein the purifying sequentially includes:

(i) precipitating copper (Cu) via a cementation reaction or a sulfidation reaction;

(ii) adding a source of calcium oxide (CaO) and an oxidant to the waste liquid stream having a pH of greater than or equal to about 1 to less than or equal to about 2 to generate calcium fluoride (CaF$_2$) that precipitates out of the waste liquid stream; and (iii) after the (i) precipitating copper (Cu) and the (ii) adding the source of calcium oxide (CaO) and the oxidant, adding an inorganic base to increase pH of the waste liquid stream to generate one or more metal precipitate compounds selected from the group consisting of: aluminum hydroxide (Al(OH)$_3$), titanium hydroxide (Ti(OH)$_4$), iron phosphate (FePO$_4$), and one or more iron hydroxides (Fe(OH)$_3$ and Fe(OH)$_2$);

passing the waste liquid stream exiting the first reactor through a filter to generate a purified filtrate liquid stream and a second retentate separating nickel (Ni), manganese (Mn), and cobalt (Co) from the purified filtrate liquid stream by passing the purified filtrate liquid stream into one or more of:

(i) a second reactor for conducting a co-precipitation process by increasing pH; or (ii) one or more chromatographic columns;

to generate an intermediate liquid stream comprising lithium (Li) and one or more recovered products comprising one or more of nickel (Ni), manganese (Mn), and cobalt (Co) that are removed from the intermediate liquid stream; and introducing the intermediate liquid stream into a lithium precipitation reactor to precipitate at least one compound comprising lithium (Li), wherein the separating recovers greater than or equal to about 80% by mass of each of nickel (Ni), manganese (Mn), and cobalt (Co) from the purified filtrate liquid stream, the one or more recovered products have a purity level of greater than or equal to about 98% and comprise less than or equal to about 2% by mass of a total cumulative amount of impurities comprising aluminum (Al), copper (Cu), iron (Fe), phosphorus (P), titanium (Ti) and fluorine (F).

23. A process for recovering metals from a lithium-ion battery waste stream, the process comprising:

purifying a lithium-ion battery waste liquid stream comprising sulfuric acid (H$_2$SO$_4$), fluorine (F), copper (Cu), nickel (Ni), manganese (Mn), cobalt (Co), lithium (Li), and one or more additional impurities selected from the group consisting of: phosphate (P), aluminum (Al), iron (Fe), and titanium (Ti), in a first reactor to remove fluorine (F), copper (Cu), and the one or more additional impurities, wherein the purifying includes:

(i) removing copper (Cu) from the waste liquid stream;

(ii) adding a source of calcium oxide and an oxidant to generate calcium fluoride (CaF$_2$) that precipitates out of the waste liquid stream; and (iii) adding a first inorganic base to increase pH of the waste liquid stream to generate one or more metal precipitate compounds selected from the group consisting of: aluminum hydroxide (Al(OH)$_3$), titanium hydroxide (Ti(OH)$_4$), iron phosphate (FePO$_4$), and one or more iron hydroxides (Fe(OH)$_3$ and Fe(OH)$_2$);

passing the waste liquid stream exiting the first reactor through a filter to generate a purified filtrate liquid stream and a second retentate;

separating nickel (Ni), manganese (Mn), and cobalt (Co) from the purified filtrate liquid stream by passing the purified filtrate liquid stream through at least one chromatographic column to generate an intermediate liquid stream comprising lithium (Li) and one or more recovered products comprising one or more of nickel (Ni), manganese (Mn), and cobalt (Co) that are removed from the intermediate liquid stream, where the separating further comprises:

passing the purified filtrate liquid stream in a first direction in the at least one chromatographic column comprising a chelating resin to conduct a chromatographic separation process at a pH of less than or equal to about 4.5 that generates a raffinate stream comprising at least one manganese (Mn)-containing species and at least one lithium (Li)-containing species that exits the at least one chromatographic column, while nickel (Ni) ions and cobalt (Co) ions are retained on the chelating resin in the at least one chromatographic column;

regenerating the at least one chromatographic column by passing a regeneration liquid having a pH of less than or equal to about 1.5 in the at least one chromatographic column to form an extract stream comprising the nickel (Ni) ions and cobalt (Co) ions;

precipitating nickel hydroxide (Ni(OH)$_2$) and cobalt hydroxide (Co(OH)$_2$) from the extract stream; and introducing the intermediate liquid stream into a lithium precipitation reactor to precipitate at least one compound comprising lithium (Li).

24. The process of claim 23, further comprising forming a precursor of LiNiCoAlO$_2$ electroactive material by combining nickel hydroxide (Ni(OH)$_2$) and cobalt hydroxide (Co(OH)$_2$) with aluminum hydroxide (Al(OH)$_3$) and at least one compound comprising lithium (Li).

25. The process of claim 24, further comprising adjusting the pH of the purified filtrate liquid stream to be greater than or equal to about 4 to less than or equal to about 5 by adding sodium hydroxide (NaOH) as it enters the at least one chromatographic column, wherein the process further comprises precipitating manganese hydroxide (Mn(OH)$_2$) by adjusting pH to be greater than or equal to about 8 to less than or equal to about 10 thus forming the intermediate liquid stream and further separating the manganese hydroxide (Mn(OH)$_2$) from the intermediate liquid stream; or precipitating manganese dioxide (MnO$_2$) by conducting one or more of: adding sodium permanganate or potassium permanganate to the raffinate stream, and subjecting the raffinate stream to ozonation.

26. The process of claim 23, wherein a stationary phase in the at least one chromatographic column comprises a macroporous styrene divinylbenzene having functional groups comprising iminodiacetic acid.

27. The process of claim 23, wherein the at least one chromatographic column comprises a first chromatographic column and a second chromatographic column, the separating occurs by passing the purified filtrate liquid stream in a first direction in a first chromatographic column comprising a first chelating resin to conduct a chromatographic separation process at a pH of less than or equal to about 1.5 that generates a first raffinate stream comprising at least one manganese (Mn)-containing species, at least one cobalt (Co)-containing species, and at least one lithium (Li)-containing species that exits the first chromatographic column, while nickel (Ni) ions are retained on the first chelating resin in the first chromatographic column;

passing the first raffinate stream in a first direction in a second chromatographic column comprising a second chelating resin to conduct a chromatographic separation process at a pH of less than or equal to about 2.5 that generates a second raffinate stream comprising at least one manganese (Mn)-containing species and at least one lithium (Li)-containing species that exits the second chromatographic column, while cobalt (Co) ions are retained on the second chelating resin in the second chromatographic column;

regenerating the first chromatographic column by passing a first regeneration liquid having a pH of less than or equal to about 1.5 in the first chromatographic column to form a first extract stream comprising the nickel (Ni) ions;

precipitating nickel hydroxide (Ni(OH)$_2$) from the first extract stream;

regenerating the second chromatographic column by passing a second regeneration liquid having a pH of less than or equal to about 2.5 in the second chromatographic column to form a second extract stream comprising the cobalt (Co) ions; and precipitating cobalt hydroxide (Co(OH)$_2$) from the second extract stream.

28. The process of claim 27, further comprising forming a precursor of LiNiCoAlO$_2$ electroactive material by combining nickel hydroxide (Ni(OH)$_2$) and cobalt hydroxide (Co(OH)$_2$) with aluminum hydroxide (Al(OH)$_3$) and the at least one compound comprising lithium (Li).

29. The process of claim 28, further comprising precipitating manganese hydroxide (Mn(OH)$_2$) from the second raffinate stream by adjusting pH to be greater than or equal to about 8 to less than or equal to about 10 thus forming the intermediate liquid stream and separating the manganese hydroxide (Mn(OH)$_2$).

30. The process of claim 27, wherein the at least one compound comprising lithium (Li) comprises lithium carbonate (Li$_2$CO$_3$) that is combined with manganese hydroxide (Mn(OH)$_2$) to form lithium manganese oxide (LMO) electroactive material.

\* \* \* \* \*